US012358723B2

(12) United States Patent
Lert et al.

(10) Patent No.: US 12,358,723 B2
(45) Date of Patent: *Jul. 15, 2025

(54) STORAGE AND RETRIEVAL SYSTEM

(71) Applicant: SYMBOTIC LLC, Wilmington, MA (US)

(72) Inventors: John Lert, Wakefield, MA (US); Stephen C Toebes, Chelmsford, MA (US); Robert Sullivan, Wilmington, MA (US); Foster Hinshaw, Cambridge, MA (US); Nathan Ulrich, Lee, NH (US)

(73) Assignee: Symbotic LLC, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,107

(22) Filed: Mar. 26, 2024

(65) Prior Publication Data

US 2024/0228165 A1 Jul. 11, 2024

Related U.S. Application Data

(63) Continuation of application No. 17/476,232, filed on Sep. 15, 2021, now Pat. No. 11,939,158, which is a
(Continued)

(51) Int. Cl.
*B65G 1/04* (2006.01)
*B65G 1/06* (2006.01)
*B65G 1/137* (2006.01)
*B65G 1/10* (2006.01)
*B65G 1/127* (2006.01)
(Continued)

(52) U.S. Cl.
CPC ........... *B65G 1/0492* (2013.01); *B65G 1/065* (2013.01); *B65G 1/1373* (2013.01); *B65G 1/1378* (2013.01); *B65G 1/045* (2013.01); *B65G 1/10* (2013.01); *B65G 1/127* (2013.01); *B65G 1/137* (2013.01); *B65G 1/1371* (2013.01);
(Continued)

(58) Field of Classification Search
CPC ........................... B65G 1/1378; B65G 1/0492
USPC ................................ 414/275, 279, 281, 284
See application file for complete search history.

(56) References Cited

U.S. PATENT DOCUMENTS 1,845,962 A 2/1932 Dorr
1,887,667 A 11/1932 Wheeler
(Continued)

*Primary Examiner* — Jonathan Snelting
(74) *Attorney, Agent, or Firm* — Perman & Green, LLP

(57) ABSTRACT

A storage and retrieval system including a vertical array of storage levels, each storage level having, picking aisles, storage locations, disposed within the picking aisles, and at least one transfer deck providing access to the picking aisles, a multilevel vertical conveyor system configured to transport the uncontained case units to and from the vertical array of storage levels, each storage level being configured to receive uncontained case units from the multilevel vertical conveyor system, at least one autonomous transport located on each storage level for transporting the uncontained case units between respective storage locations and the multilevel vertical conveyor system, and a controller configured to create a primary access path through the transfer decks and picking aisles to a predetermined one of the storage locations and at least one secondary access path to the predetermined one of the storage locations when the primary path is impassable.

16 Claims, 32 Drawing Sheets

Related U.S. Application Data continuation of application No. 16/364,711, filed on Mar. 26, 2019, now Pat. No. 11,124,361, which is a continuation of application No. 14/816,804, filed on Aug. 3, 2015, now Pat. No. 10,239,691, which is a continuation of application No. 12/757,220, filed on Apr. 9, 2010, now Pat. No. 9,096,375.

(60) Provisional application No. 61/168,349, filed on Apr. 10, 2009.

(51) Int. Cl.
  *B65G 47/57* (2006.01)
  *G06Q 10/087* (2023.01)

(52) U.S. Cl.
  CPC .......... *B65G 47/57* (2013.01); *G06Q 10/087* (2013.01); *Y10S 901/01* (2013.01)

(56) References Cited

U.S. PATENT DOCUMENTS

| | | |
|---|---|---|
| 2,606,508 A | 8/1952 | Van Nes |
| 2,656,995 A | 10/1953 | Wolf |
| 2,673,689 A | 3/1954 | Bonanno |
| 2,792,234 A | 5/1957 | Page |
| 2,840,248 A | 6/1958 | Grove et al. |
| 2,877,575 A | 3/1959 | Stedt |
| 2,923,421 A | 2/1960 | De Senigon De Roumefort |
| 2,945,604 A | 7/1960 | Kroll et al. |
| 2,996,621 A | 8/1961 | Barret, Jr. |
| 3,016,154 A | 1/1962 | Ugolini et al. |
| 3,110,131 A | 11/1963 | Jeffress |
| 3,161,303 A | 12/1964 | Burrows |
| 3,162,459 A | 12/1964 | Marmorine et al. |
| 3,175,940 A | 3/1965 | Talmey |
| 3,269,744 A | 8/1966 | Dobson |
| 3,369,648 A | 2/1968 | Wentz |
| 3,370,492 A | 2/1968 | Treff |
| 3,455,468 A | 7/1969 | Sanford |
| 3,519,149 A | 7/1970 | Saul |
| 3,554,390 A | 1/1971 | Saul |
| 3,581,915 A | 6/1971 | Saul |
| 3,636,586 A | 1/1972 | Bollinger et al. |
| 3,677,421 A | 7/1972 | Kintner |
| 3,719,408 A | 3/1973 | Fullington et al. |
| 3,737,056 A | 6/1973 | Hathcock, Jr. |
| 3,738,506 A | 6/1973 | Cornford et al. |
| 3,744,945 A | 7/1973 | Metrailer |
| 3,746,189 A | 7/1973 | Burch et al. |
| 3,751,758 A | 8/1973 | Higbee et al. |
| 3,782,565 A | 1/1974 | Doran et al. |
| 3,802,580 A | 4/1974 | Castaldi |
| 3,845,715 A | 11/1974 | Hochstrasser |
| 3,850,111 A | 11/1974 | Hansen |
| 3,876,087 A | 4/1975 | Osta |
| 3,876,095 A | 4/1975 | Stedt |
| 3,896,955 A | 7/1975 | Collins et al. |
| 3,904,216 A | 9/1975 | Metrailer |
| 3,940,105 A | 2/1976 | Metrailer |
| 3,970,840 A | 7/1976 | De Bruine |
| 3,976,302 A | 8/1976 | Hammarstrand |
| 3,984,012 A | 10/1976 | Ennis et al. |
| 4,007,843 A | 2/1977 | Lubbers et al. |
| 4,026,365 A | 5/1977 | Andersson et al. |
| 4,037,291 A | 7/1977 | Huempfner et al. |
| 4,057,019 A | 11/1977 | Shaffer |
| 4,064,986 A | 12/1977 | Bertovich |
| 4,072,203 A | 2/1978 | Pierson |
| 4,079,955 A | 3/1978 | Thorpe et al. |
| 4,087,116 A | 5/1978 | Morimoto |
| 4,174,854 A | 11/1979 | Spicka et al. |
| 4,183,304 A | 1/1980 | Forster |
| 4,213,396 A | 7/1980 | Mehren et al. |
| 4,219,296 A | 8/1980 | Fujii et al. |
| 4,223,611 A | 9/1980 | Dawson et al. |
| 4,265,582 A | 5/1981 | Theobald |
| 4,268,207 A | 5/1981 | Pipes |
| 4,271,764 A | 6/1981 | Braun et al. |
| 4,273,234 A | 6/1981 | Bourgeois |
| 4,279,563 A | 7/1981 | Miller |
| 4,307,988 A | 12/1981 | Page et al. |
| 4,346,659 A | 8/1982 | Binder |
| 4,349,937 A | 9/1982 | Fontana |
| 4,349,938 A | 9/1982 | Fontana |
| 4,353,572 A | 10/1982 | McCain |
| 4,372,219 A | 2/1983 | Gibbs |
| 4,372,724 A | 2/1983 | Stolzer |
| 4,394,104 A | 7/1983 | Camerini et al. |
| 4,395,181 A | 7/1983 | Loomer |
| 4,406,570 A | 9/1983 | Duncan et al. |
| 4,415,975 A | 11/1983 | Burt |
| 4,428,708 A | 1/1984 | Burt |
| 4,445,440 A | 5/1984 | Geiss |
| 4,459,078 A | 7/1984 | Chiantella et al. |
| 4,470,742 A | 9/1984 | Schindler |
| 4,492,504 A | 1/1985 | Hainsworth |
| 4,505,630 A | 3/1985 | Kaschner et al. |
| 4,527,486 A | 7/1985 | Baird et al. |
| 4,538,950 A | 9/1985 | Shiomi et al. |
| 4,678,390 A | 7/1987 | Bonneton et al. |
| 4,679,149 A | 7/1987 | Merz |
| 4,715,662 A | 12/1987 | van Zanten et al. |
| 4,716,530 A | 12/1987 | Ogawa et al. |
| 4,726,725 A | 2/1988 | Baker et al. |
| 4,733,740 A | 3/1988 | Bigowsky et al. |
| 4,750,429 A | 6/1988 | Mordaunt et al. |
| 4,773,807 A | 9/1988 | Kroll et al. |
| 4,777,416 A | 10/1988 | George, II et al. |
| 4,786,229 A | 11/1988 | Henderson |
| 4,811,229 A | 3/1989 | Wilson |
| 4,812,985 A | 3/1989 | Hambrick et al. |
| 4,856,263 A | 8/1989 | Schneider et al. |
| 4,856,956 A | 8/1989 | Zur |
| 4,878,876 A | 11/1989 | Ishimoto |
| 4,883,401 A | 11/1989 | Kavieff |
| 4,887,016 A | 12/1989 | Malick |
| 4,905,783 A | 3/1990 | Bober |
| 4,909,697 A | 3/1990 | Bernard, II et al. |
| 4,936,738 A | 6/1990 | Brennen |
| 4,966,242 A | 10/1990 | Baillargeon |
| 4,966,513 A | 10/1990 | Motoda |
| 4,967,370 A | 10/1990 | Stern et al. |
| 4,987,992 A | 1/1991 | Pfleger |
| 4,993,905 A | 2/1991 | Potocnjak |
| 5,002,449 A | 3/1991 | Kita et al. |
| 5,004,399 A | 4/1991 | Sullivan et al. |
| 5,015,145 A | 5/1991 | Angell et al. |
| 5,069,592 A | 12/1991 | Galperin |
| 5,096,355 A | 3/1992 | Schroder |
| 5,134,353 A | 7/1992 | Kita et al. |
| 5,134,940 A | 8/1992 | Fujita et al. |
| 5,135,344 A | 8/1992 | Kita et al. |
| 5,140,787 A | 8/1992 | Corcoran |
| 5,149,654 A | 9/1992 | Gross et al. |
| 5,156,639 A | 10/1992 | Bostrom |
| 5,168,815 A | 12/1992 | Comer et al. |
| 5,174,454 A | 12/1992 | Parkander |
| 5,179,329 A | 1/1993 | Nishikawa et al. |
| 5,187,664 A | 2/1993 | Yardley et al. |
| 5,199,840 A | 4/1993 | Castaldi et al. |
| 5,213,463 A | 5/1993 | Rothlisberger et al. |
| 5,218,909 A | 6/1993 | Ng |
| 5,219,264 A | 6/1993 | McClure et al. |
| 5,220,263 A | 6/1993 | Onishi et al. |
| 5,226,782 A | 7/1993 | Rigling |
| 5,238,100 A | 8/1993 | Rose et al. |
| 5,265,944 A | 11/1993 | Gloceri |
| 5,271,703 A | 12/1993 | Lindqvist et al. |
| 5,273,392 A | 12/1993 | Bernard, II et al. |
| 5,281,901 A | 1/1994 | Yardley et al. |
| 5,286,157 A | 2/1994 | Vainio et al. |
| 5,307,888 A | 5/1994 | Urvoy |
| 5,323,098 A | 6/1994 | Hamaguchi et al. |

(56) References Cited

U.S. PATENT DOCUMENTS

| | | |
|---|---|---|
| 5,327,354 A | 7/1994 | Tsujimoto |
| 5,328,316 A | 7/1994 | Hoffmann |
| 5,333,982 A | 8/1994 | Tanizawa et al. |
| 5,333,983 A | 8/1994 | Hatouchi et al. |
| 5,337,880 A | 8/1994 | Claycomb et al. |
| 5,350,270 A | 9/1994 | Stallard et al. |
| 5,362,197 A | 11/1994 | Rigling |
| 5,370,492 A | 12/1994 | Gleyze et al. |
| 5,377,851 A | 1/1995 | Asano et al. |
| 5,379,229 A | 1/1995 | Parson et al. |
| 5,380,139 A | 1/1995 | Pohjonen et al. |
| 5,388,955 A | 2/1995 | Schroder |
| 5,395,206 A | 3/1995 | Cerny, Jr. |
| 5,397,212 A | 3/1995 | Watanabe et al. |
| 5,403,147 A | 4/1995 | Tanaka |
| 5,405,232 A | 4/1995 | Lloyd et al. |
| 5,418,732 A | 5/1995 | McFadin |
| 5,421,685 A | 6/1995 | Elmer et al. |
| 5,421,697 A | 6/1995 | Ostwald |
| 5,425,612 A | 6/1995 | Ebstein |
| 5,434,490 A | 7/1995 | Ishida et al. |
| 5,445,485 A | 8/1995 | Poulet |
| 5,450,797 A | 9/1995 | Becker et al. |
| 5,460,476 A | 10/1995 | Gazza |
| 5,472,309 A | 12/1995 | Bernard, II et al. |
| 5,501,295 A | 3/1996 | Muller et al. |
| 5,509,538 A | 4/1996 | Spindler et al. |
| 5,525,884 A | 6/1996 | Sugiura et al. |
| 5,529,165 A | 6/1996 | Shupert |
| 5,559,696 A | 9/1996 | Borenstein |
| 5,564,880 A | 10/1996 | Lederer |
| 5,582,497 A | 12/1996 | Noguchi |
| 5,588,796 A | 12/1996 | Ricco et al. |
| 5,601,395 A | 2/1997 | Lichti, Sr. et al. |
| 5,611,422 A | 3/1997 | Harkonen |
| 5,615,992 A | 4/1997 | Proske et al. |
| 5,626,362 A | 5/1997 | Mottola |
| 5,632,350 A | 5/1997 | Gauvin |
| 5,650,703 A | 7/1997 | Yardley et al. |
| 5,664,688 A | 9/1997 | Kitanaka et al. |
| 5,664,929 A | 9/1997 | Esaki et al. |
| 5,667,230 A | 9/1997 | Riley et al. |
| 5,668,724 A | 9/1997 | Ehret et al. |
| 5,707,199 A | 1/1998 | Faller |
| 5,709,291 A | 1/1998 | Nishino et al. |
| 5,718,322 A | 2/1998 | Mulhern |
| 5,718,551 A | 2/1998 | Ebstein |
| 5,725,063 A | 3/1998 | Ceragioli et al. |
| 5,743,562 A | 4/1998 | Mottola |
| 5,764,014 A | 6/1998 | Jakeway et al. |
| 5,798,920 A | 8/1998 | Crucius et al. |
| 5,801,506 A | 9/1998 | Netzler |
| 5,806,870 A | 9/1998 | Hull et al. |
| 5,810,540 A | 9/1998 | Castaldi |
| 5,829,096 A | 11/1998 | Perry |
| 5,833,431 A | 11/1998 | Rosse, II et al. |
| 5,839,872 A | 11/1998 | Goto et al. |
| 5,847,537 A | 12/1998 | Parmley, Sr. |
| 5,857,413 A | 1/1999 | Ward |
| 5,866,469 A | 2/1999 | Hays |
| 5,918,951 A | 7/1999 | Rudd, III |
| 5,927,926 A | 7/1999 | Yagi et al. |
| 5,928,058 A | 7/1999 | Francis et al. |
| 5,938,710 A | 8/1999 | Lanza et al. |
| 5,974,348 A | 10/1999 | Rocks |
| 5,988,306 A | 11/1999 | Ooishi |
| 6,000,502 A | 12/1999 | Leasor et al. |
| 6,021,367 A | 2/2000 | Pilutti et al. |
| 6,024,381 A | 2/2000 | Mottola |
| 6,036,427 A | 3/2000 | Kita et al. |
| 6,038,501 A | 3/2000 | Kawakami |
| 6,061,607 A | 5/2000 | Bradley et al. |
| 6,062,942 A | 5/2000 | Ogihara |
| 6,116,842 A | 9/2000 | Harris et al. |
| 6,149,366 A | 11/2000 | Deandrea |
| 6,158,566 A | 12/2000 | Pollock |
| 6,213,704 B1 | 4/2001 | White et al. |
| 6,220,676 B1 | 4/2001 | Rudd, III |
| 6,272,406 B2 | 8/2001 | Alofs et al. |
| 6,289,260 B1 | 9/2001 | Bradley et al. |
| 6,295,922 B1 | 10/2001 | Salamone et al. |
| 6,324,994 B1 | 12/2001 | Glenn |
| 6,325,586 B1 | 12/2001 | Loy |
| 6,341,269 B1 | 1/2002 | Dulaney et al. |
| 6,345,217 B1 | 2/2002 | Zetler et al. |
| 6,352,035 B1 | 3/2002 | Kashiwase et al. |
| 6,354,430 B1 | 3/2002 | Oe |
| 6,360,673 B1 | 3/2002 | Herrin et al. |
| 6,377,867 B1 | 4/2002 | Bradley et al. |
| 6,389,981 B1 | 5/2002 | Strothmann et al. |
| 6,390,756 B1 | 5/2002 | Isaacs et al. |
| 6,391,226 B1 | 5/2002 | Chauvette et al. |
| 6,394,260 B1 | 5/2002 | Barth et al. |
| 6,397,990 B1 | 6/2002 | Brien et al. |
| 6,425,723 B1 | 7/2002 | Okada et al. |
| 6,439,131 B1 | 8/2002 | Higgins |
| 6,439,955 B1 | 8/2002 | Feketo |
| 6,463,360 B1 | 10/2002 | Terada et al. |
| 6,496,755 B2 | 12/2002 | Wallach et al. |
| 6,503,043 B1 | 1/2003 | Smith et al. |
| 6,508,102 B1 | 1/2003 | Margolis et al. |
| 6,563,128 B2 | 5/2003 | Lublin et al. |
| 6,597,143 B2 | 7/2003 | Song et al. |
| 6,600,418 B2 | 7/2003 | Francis et al. |
| 6,601,435 B2 | 8/2003 | Hong |
| 6,629,502 B2 | 10/2003 | Matsukawa |
| 6,631,321 B1 | 10/2003 | Ciprian |
| 6,645,355 B2 | 11/2003 | Hanson et al. |
| 6,652,213 B1 | 11/2003 | Mitchell et al. |
| 6,655,297 B2 | 12/2003 | Kawato et al. |
| 6,663,334 B2 | 12/2003 | Warhurst et al. |
| 6,692,211 B2 | 2/2004 | Yuyama et al. |
| 6,695,328 B2 | 2/2004 | Cope |
| 6,721,638 B2 | 4/2004 | Zeitler |
| 6,748,292 B2 | 6/2004 | Mountz |
| 6,763,767 B2 | 7/2004 | Jackson et al. |
| 6,764,373 B1 | 7/2004 | Osawa et al. |
| 6,808,058 B2 | 10/2004 | Shiohara |
| 6,836,701 B2 | 12/2004 | McKee |
| 6,851,921 B2 | 2/2005 | Haag |
| 6,859,682 B2 | 2/2005 | Naka et al. |
| 6,861,154 B2 | 3/2005 | Olson et al. |
| 6,864,489 B2 | 3/2005 | Chen et al. |
| 6,880,202 B2 | 4/2005 | Thompson et al. |
| 6,928,336 B2 | 8/2005 | Peshkin et al. |
| 6,929,440 B1 | 8/2005 | Grond |
| 6,948,899 B2 | 9/2005 | Lee |
| 6,950,722 B2 | 9/2005 | Mountz |
| 6,988,451 B2 | 1/2006 | Marcotte et al. |
| 6,997,665 B2 | 2/2006 | Bouche et al. |
| 7,002,698 B2 | 2/2006 | Hanson et al. |
| 7,002,772 B2 | 2/2006 | Yardy |
| 7,003,375 B2 | 2/2006 | Inui |
| 7,008,164 B2 | 3/2006 | Rokkaku |
| 7,011,487 B2 | 3/2006 | Kafka et al. |
| 7,017,228 B2 | 3/2006 | Silverstein et al. |
| 7,039,501 B2 | 5/2006 | Freeman et al. |
| 7,054,716 B2 | 5/2006 | McKee et al. |
| 7,058,866 B2 | 6/2006 | Flanagan et al. |
| 7,066,291 B2 | 6/2006 | Martins et al. |
| 7,069,124 B1 | 6/2006 | Whittaker et al. |
| 7,074,151 B2 | 7/2006 | Thompson |
| 7,085,097 B2 | 8/2006 | Starr et al. |
| 7,100,294 B1 | 9/2006 | Goldsobel et al. |
| 7,101,139 B1 | 9/2006 | Benedict |
| 7,102,848 B2 | 9/2006 | Kumpon et al. |
| 7,110,855 B2 | 9/2006 | Leishman |
| 7,119,982 B2 | 10/2006 | Starr et al. |
| 7,128,196 B2 | 10/2006 | Oldford et al. |
| 7,128,521 B2 | 10/2006 | Hansl |
| 7,133,746 B2 | 11/2006 | Abramson et al. |
| 7,135,992 B2 | 11/2006 | Karlsson et al. |
| 7,137,593 B2 | 11/2006 | Baatz |
| 7,145,478 B2 | 12/2006 | Goncalves et al. |

(56) References Cited

U.S. PATENT DOCUMENTS

| | | |
|---|---|---|
| 7,145,747 B2 | 12/2006 | Brace et al. |
| 7,155,308 B2 | 12/2006 | Jones |
| 7,184,855 B2 | 2/2007 | Stingel et al. |
| 7,192,034 B2 | 3/2007 | Radke et al. |
| 7,221,998 B2 | 5/2007 | Brust et al. |
| 7,266,422 B1 | 9/2007 | DeMotte et al. |
| 7,284,652 B2 | 10/2007 | Zeitler et al. |
| 7,319,320 B2 | 1/2008 | Kawashima et al. |
| 7,329,081 B2 | 2/2008 | Baker et al. |
| 7,332,890 B2 | 2/2008 | Cohen et al. |
| 7,376,487 B2 | 5/2008 | Kumhyr |
| 7,381,022 B1 | 6/2008 | King |
| 7,386,379 B2 | 6/2008 | Naik et al. |
| 7,397,213 B2 | 7/2008 | Im et al. |
| 7,402,018 B2 | 7/2008 | Mountz et al. |
| 7,421,268 B2 | 9/2008 | Lee et al. |
| 7,426,970 B2 | 9/2008 | Olsen |
| 7,433,759 B2 | 10/2008 | Nangoy |
| 7,456,596 B2 | 11/2008 | Goodall et al. |
| 7,460,462 B2 | 12/2008 | Mejia et al. |
| 7,495,561 B2 | 2/2009 | Bodin et al. |
| 7,499,155 B2 | 3/2009 | Cappelletti |
| 7,506,404 B2 | 3/2009 | Block et al. |
| 7,520,376 B2 | 4/2009 | Bar |
| 7,532,947 B2 | 5/2009 | Waddington et al. |
| 7,536,283 B2 | 5/2009 | Potter et al. |
| 7,539,557 B2 | 5/2009 | Yamauchi |
| 7,568,572 B2 | 8/2009 | Zeitler et al. |
| 7,575,406 B2 | 8/2009 | Hofmeister et al. |
| 7,584,812 B2 | 9/2009 | Radke et al. |
| 7,587,260 B2 | 9/2009 | Bruemmer et al. |
| 7,591,630 B2 | 9/2009 | Lert, Jr. |
| 7,615,957 B2 | 11/2009 | Kim et al. |
| 7,620,477 B2 | 11/2009 | Bruemmer |
| 7,636,982 B2 | 12/2009 | Jones et al. |
| 7,641,014 B2 | 1/2010 | Hu |
| 7,648,002 B2 | 1/2010 | Easton et al. |
| 7,653,457 B2 | 1/2010 | Bloom |
| 7,661,920 B2 | 2/2010 | Kantola et al. |
| 7,668,621 B2 | 2/2010 | Bruemmer |
| 7,671,293 B2 | 3/2010 | Fry et al. |
| 7,682,122 B2 | 3/2010 | Maynard et al. |
| 7,686,560 B2 | 3/2010 | Laurin et al. |
| 7,689,318 B2 | 3/2010 | Draper |
| 7,693,757 B2 | 4/2010 | Zimmerman |
| 7,695,235 B1 | 4/2010 | Rallis |
| 7,706,917 B1 | 4/2010 | Chiappetta et al. |
| 7,725,253 B2 | 5/2010 | Foxlin |
| 7,729,801 B2 | 6/2010 | Abramson |
| 7,730,781 B2 | 6/2010 | Zhang et al. |
| 7,751,928 B1 | 7/2010 | Antony et al. |
| 7,769,513 B2 | 8/2010 | Breed et al. |
| 7,771,152 B2 | 8/2010 | Waltersbacher |
| 7,783,383 B2 | 8/2010 | Eliuk et al. |
| 7,792,350 B2 | 9/2010 | Kiley et al. |
| 7,793,742 B2 | 9/2010 | Donaldson et al. |
| 7,801,644 B2 | 9/2010 | Bruemmer et al. |
| 7,826,919 B2 | 11/2010 | D'Andrea et al. |
| 7,826,920 B2 | 11/2010 | Stevens et al. |
| 7,826,926 B2 | 11/2010 | Myeong et al. |
| 7,856,290 B2 | 12/2010 | Kumhyr |
| 7,861,844 B2 | 1/2011 | Hayduchok et al. |
| 7,866,671 B2 | 1/2011 | Madler |
| 7,873,469 B2 | 1/2011 | D'Andrea et al. |
| 7,885,750 B2 | 2/2011 | Lu |
| 7,894,940 B2 | 2/2011 | Kumhyr |
| 7,909,562 B2 | 3/2011 | Mead |
| 7,926,145 B2 | 4/2011 | Liao |
| 7,931,431 B2 | 4/2011 | Benedict et al. |
| 7,941,244 B2 | 5/2011 | Somin et al. |
| 7,944,368 B2 | 5/2011 | Carter et al. |
| 7,959,395 B2 | 6/2011 | Hofmeister et al. |
| 7,960,973 B2 | 6/2011 | Zeller et al. |
| 7,963,384 B2 | 6/2011 | Lafontaine |
| 7,965,871 B2 | 6/2011 | Ihara et al. |
| 7,967,354 B2 | 6/2011 | Faulkner et al. |
| 7,972,102 B2 | 7/2011 | Ward et al. |
| 7,974,738 B2 | 7/2011 | Bruemmer et al. |
| 7,988,398 B2 | 8/2011 | Hofmeister et al. |
| 7,991,505 B2 | 8/2011 | Lert et al. |
| 8,000,835 B2 | 8/2011 | Friz et al. |
| 8,001,837 B2 | 8/2011 | Larson et al. |
| 8,006,824 B2 | 8/2011 | Wada et al. |
| 8,007,221 B1 | 8/2011 | More et al. |
| 8,024,064 B1 | 9/2011 | Sanghavi et al. |
| 8,024,066 B2 | 9/2011 | Reverte et al. |
| 8,028,822 B2 | 10/2011 | Braunstein |
| 8,031,086 B2 | 10/2011 | Thacher et al. |
| 8,041,456 B1 | 10/2011 | Blackwell et al. |
| 8,042,627 B2 | 10/2011 | Yang et al. |
| 8,046,103 B2 | 10/2011 | Abramson et al. |
| 8,046,160 B2 | 10/2011 | Carter et al. |
| 8,047,756 B2 | 11/2011 | Tuffs et al. |
| 8,060,257 B2 | 11/2011 | Close et al. |
| 8,136,650 B2 | 3/2012 | Frich et al. |
| 8,280,548 B2 | 10/2012 | Zuber et al. |
| 8,364,309 B1 | 1/2013 | Bailey |
| 8,378,825 B2 | 2/2013 | Dahms et al. |
| 8,425,173 B2 | 4/2013 | Lert et al. |
| 8,480,347 B2 | 7/2013 | Schafer |
| 8,515,575 B2 | 8/2013 | Pfeiffer |
| 8,594,835 B2 | 11/2013 | Lert et al. |
| 8,740,538 B2 | 6/2014 | Lert et al. |
| 9,020,639 B2 | 4/2015 | Bewley et al. |
| 9,037,286 B2 | 5/2015 | Lert |
| 10,556,743 B2 | 2/2020 | Sullivan et al. |
| 11,254,501 B2 | 2/2022 | Sullivan et al. |
| 11,939,158 B2 * | 3/2024 | Lert ............... B65G 1/065 |
| 2002/0037208 A1 | 3/2002 | Patrito |
| 2002/0076307 A1 | 6/2002 | Fallin et al. |
| 2002/0124389 A1 | 9/2002 | Matson |
| 2003/0033217 A1 | 2/2003 | Cutlip |
| 2003/0074125 A1 | 4/2003 | Walenty et al. |
| 2003/0200129 A1 | 10/2003 | Klaubauf et al. |
| 2004/0065523 A1 | 4/2004 | Lichti et al. |
| 2004/0088081 A1 | 5/2004 | Song et al. |
| 2004/0093116 A1 | 5/2004 | Mountz |
| 2004/0136821 A1 | 7/2004 | Berger et al. |
| 2004/0167667 A1 | 8/2004 | Goncalves et al. |
| 2004/0238326 A1 | 12/2004 | Lichti |
| 2005/0029029 A1 | 2/2005 | Thorne |
| 2005/0047895 A1 | 3/2005 | Lert, Jr. |
| 2005/0166787 A1 | 8/2005 | Astrom |
| 2005/0212478 A1 | 9/2005 | Takenaka |
| 2005/0217532 A1 | 10/2005 | Conneally |
| 2006/0018996 A1 | 1/2006 | Pollock et al. |
| 2006/0058921 A1 | 3/2006 | Okamoto |
| 2006/0104712 A1 | 5/2006 | Bufano et al. |
| 2006/0216137 A1 | 9/2006 | Sakata et al. |
| 2006/0245862 A1 | 11/2006 | Hansl et al. |
| 2006/0257236 A1 | 11/2006 | Stingel, III et al. |
| 2007/0021864 A1 | 1/2007 | Mountz et al. |
| 2007/0059132 A1 | 3/2007 | Akamatsu et al. |
| 2007/0061041 A1 | 3/2007 | Zweig |
| 2007/0065258 A1 | 3/2007 | Benedict et al. |
| 2007/0065259 A1 | 3/2007 | Talley |
| 2007/0071585 A1 | 3/2007 | Henkel |
| 2007/0114975 A1 | 5/2007 | Cohen et al. |
| 2007/0134077 A1 | 6/2007 | Laurin et al. |
| 2007/0177011 A1 | 8/2007 | Lewin et al. |
| 2007/0267998 A1 | 11/2007 | Cohen et al. |
| 2007/0276535 A1 | 11/2007 | Haag |
| 2007/0290040 A1 | 12/2007 | Wurman et al. |
| 2007/0293978 A1 | 12/2007 | Wurman et al. |
| 2008/0001372 A1 | 1/2008 | Hoffman et al. |
| 2008/0025833 A1 | 1/2008 | Baker et al. |
| 2008/0044262 A1 | 2/2008 | Kim et al. |
| 2008/0065265 A1 | 3/2008 | Ozick et al. |
| 2008/0075357 A1 | 3/2008 | Yoon et al. |
| 2008/0080963 A1 | 4/2008 | Bufano et al. |
| 2008/0129445 A1 | 6/2008 | Kraimer et al. |
| 2008/0154429 A1 | 6/2008 | Lee et al. |
| 2008/0161987 A1 | 7/2008 | Breed |
| 2008/0166217 A1 | 7/2008 | Fontana |

(56) References Cited

U.S. PATENT DOCUMENTS

| | | |
|---|---|---|
| 2008/0174268 A1 | 7/2008 | Koo et al. |
| 2008/0215180 A1 | 9/2008 | Kota |
| 2008/0269960 A1 | 10/2008 | Kostmann |
| 2008/0275609 A1 | 11/2008 | Boydell |
| 2008/0281717 A1 | 11/2008 | Kortelainen |
| 2009/0033316 A1 | 2/2009 | Hosek et al. |
| 2009/0074545 A1 | 3/2009 | Lert, Jr. et al. |
| 2009/0085741 A1 | 4/2009 | Ravi et al. |
| 2009/0099879 A1 | 4/2009 | Ouimet |
| 2009/0114115 A1 | 5/2009 | Minges |
| 2009/0148259 A1 | 6/2009 | Shani |
| 2009/0185884 A1 | 7/2009 | Wurman et al. |
| 2009/0188774 A1 | 7/2009 | Tsujimoto |
| 2009/0224750 A1 | 9/2009 | Hosek et al. |
| 2009/0255213 A1 | 10/2009 | Schwartau |
| 2009/0265031 A1 | 10/2009 | Tachibana et al. |
| 2009/0284245 A1 | 11/2009 | Kirby et al. |
| 2009/0308000 A1 | 12/2009 | Corcoran |
| 2009/0315501 A1 | 12/2009 | Li et al. |
| 2010/0044124 A1 | 2/2010 | Radke et al. |
| 2010/0044977 A1 | 2/2010 | Hughes et al. |
| 2010/0086358 A1 | 4/2010 | Shani |
| 2010/0086385 A1 | 4/2010 | Shani |
| 2010/0102532 A1 | 4/2010 | Timoney et al. |
| 2010/0118149 A1 | 5/2010 | Levin et al. |
| 2010/0121481 A1 | 5/2010 | Talley et al. |
| 2010/0131182 A1 | 5/2010 | Deegan et al. |
| 2010/0135759 A1 | 6/2010 | Dillon |
| 2010/0145507 A1 | 6/2010 | Blust et al. |
| 2010/0158648 A1 | 6/2010 | Schafer |
| 2010/0183409 A1 | 7/2010 | Checketts et al. |
| 2010/0185353 A1 | 7/2010 | Barwick et al. |
| 2010/0188210 A1 | 7/2010 | Howard et al. |
| 2010/0234995 A1 | 9/2010 | Zini et al. |
| 2010/0272546 A1 | 10/2010 | Wolkerstorfer |
| 2010/0277005 A1 | 11/2010 | Karalis et al. |
| 2010/0277121 A1 | 11/2010 | Hall et al. |
| 2010/0286905 A1 | 11/2010 | Goncalves et al. |
| 2010/0295943 A1 | 11/2010 | Cha et al. |
| 2010/0305854 A1 | 12/2010 | Kammel et al. |
| 2010/0308939 A1 | 12/2010 | Kurs |
| 2010/0324815 A1 | 12/2010 | Hiruta et al. |
| 2011/0008138 A1 | 1/2011 | Yamashita |
| 2011/0038692 A1 | 2/2011 | Hofmeister et al. |
| 2011/0043373 A1 | 2/2011 | Best et al. |
| 2011/0058926 A1 | 3/2011 | Winkler |
| 2011/0068943 A1 | 3/2011 | Lane, Jr. |
| 2011/0090064 A1 | 4/2011 | Dahms et al. |
| 2011/0106295 A1 | 5/2011 | Miranda et al. |
| 2011/0106339 A1 | 5/2011 | Phillips et al. |
| 2011/0118903 A1 | 5/2011 | Kraimer et al. |
| 2011/0125323 A1 | 5/2011 | Gutmann et al. |
| 2011/0130974 A1 | 6/2011 | Yngve et al. |
| 2011/0148364 A1 | 6/2011 | Ota |
| 2011/0176895 A1 | 7/2011 | Kortelainen |
| 2011/0182703 A1 | 7/2011 | Alan |
| 2011/0185975 A1 | 8/2011 | van den Berg et al. |
| 2011/0202175 A1 | 8/2011 | Romanov et al. |
| 2011/0216185 A1 | 9/2011 | Laws et al. |
| 2011/0231016 A1 | 9/2011 | Goulding |
| 2011/0254503 A1 | 10/2011 | Widmer et al. |
| 2011/0271469 A1 | 11/2011 | Ziegler et al. |
| 2011/0285349 A1 | 11/2011 | Widmer et al. |
| 2012/0189409 A1 | 7/2012 | Toebes et al. |
| 2012/0277940 A1 | 11/2012 | Kumar et al. |
| 2012/0299260 A1 | 11/2012 | Goertzen et al. |
| 2013/0094926 A1 | 4/2013 | Olszak et al. |
| 2015/0081089 A1 | 3/2015 | Kapust et al. |

* cited by examiner

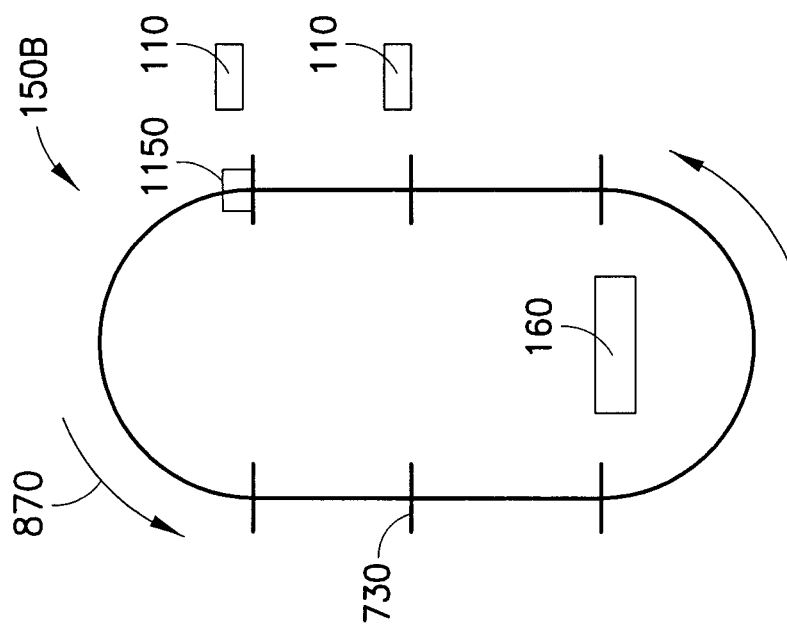
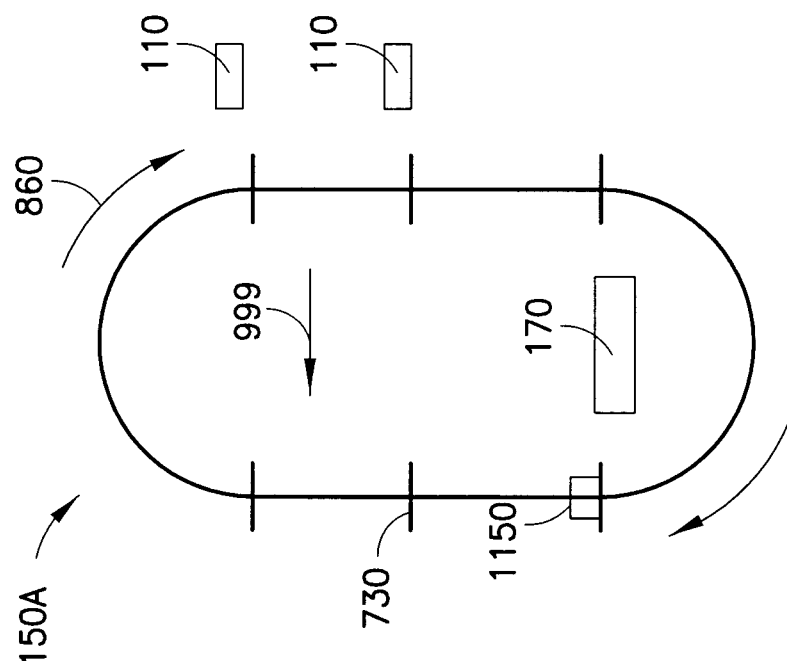

STORAGE AND RETRIEVAL SYSTEM

CROSS REFERENCE TO RELATED APPLICATIONS

This application is a continuation of U.S. patent application Ser. No. 17/476,232, filed Sep. 15, 2021, (now U.S. Pat. No. 11,939,158), which is a continuation of U.S. application Ser. No. 16/364,711, filed Mar. 26, 2019, (now U.S. Pat. No. 11,124,361), which is a continuation of U.S. patent application Ser. No. 14/816,804, filed Aug. 3, 2015, (now U.S. Pat. No. 10,239,691), which is a continuation of U.S. patent application Ser. No. 12/757,220, filed Apr. 9, 2010, (now U.S. Pat. No. 9,096,375), which is a non-provisional of and claims the benefit of U.S. Provisional Patent Application No. 61/168,349, filed Apr. 10, 2009, the disclosures of which are incorporated herein by reference in their entireties.

This application is related to U.S. patent application Ser. No. 12/757,381, entitled "STORAGE AND RETRIEVAL SYSTEM", filed Apr. 9, 2010, (now U.S. Pat. No. 8,740,538); U.S. patent application Ser. No. 12/757,337, entitled "CONTROL SYSTEM FOR STORAGE AND RETRIEVAL SYSTEMS", filed Apr. 9, 2010, (now U.S. Pat. No. 8,594,835); U.S. patent application Ser. No. 12/757,354, entitled "LIFT INTERFACE FOR STORAGE AND RETRIEVAL SYSTEMS", filed Apr. 9, 2010; and U.S. patent application Ser. No. 12/757,312, entitled "AUTONOMOUS TRANSPORTS FOR STORAGE AND RETRIEVAL SYSTEMS", filed Apr. 9, 2010, (now U.S. Pat. No. 8,425,173), the disclosures of which are incorporated by reference herein in their entireties.

BACKGROUND

1. Field

The exemplary embodiments generally relate to material handling systems and, more particularly, to automated storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the case units stored on the storage racks are contained in carriers, for example storage containers such as trays, totes or shipping cases, or on pallets. Generally, incoming pallets to the warehouse (such as from manufacturers) contain shipping containers (e.g. cases) of the same type of goods. Outgoing pallets leaving the warehouse, for example, to retailers have increasingly been made of what may be referred to as mixed pallets. As may be realized, such mixed pallets are made of shipping containers (e.g. totes or cases such as cartons, etc.) containing different types of goods. For example, one case on the mixed pallet may hold grocery products (soup can, soda cans, etc.) and another case on the same pallet may hold cosmetic or household cleaning or electronic products. Indeed some cases may hold different types of products within a single case. Conventional warehousing systems, including conventional automated warehousing systems do not lend themselves to efficient generation of mixed goods pallets. In addition, storing case units in, for example carriers or on pallets generally does not allow for the retrieval of individual case units within those carriers or pallets without transporting the carriers or pallets to a workstation for manual or automated removal of the individual case units.

It would be advantageous to have a storage and retrieval system for efficiently storing and retrieving individual case units without containing those case units in a carrier or on a pallet.

BRIEF DESCRIPTION OF THE DRAWINGS

The foregoing aspects and other features of the disclosed embodiments are explained in the following description, taken in connection with the accompanying drawings, wherein:

FIGS. 2A, 2B, 2C, 2D, 3A and 3B illustrate schematic views of a conveyor system in accordance with an exemplary embodiment;

DETAILED DESCRIPTION OF THE EXEMPLARY EMBODIMENT(S)

Figure 1:
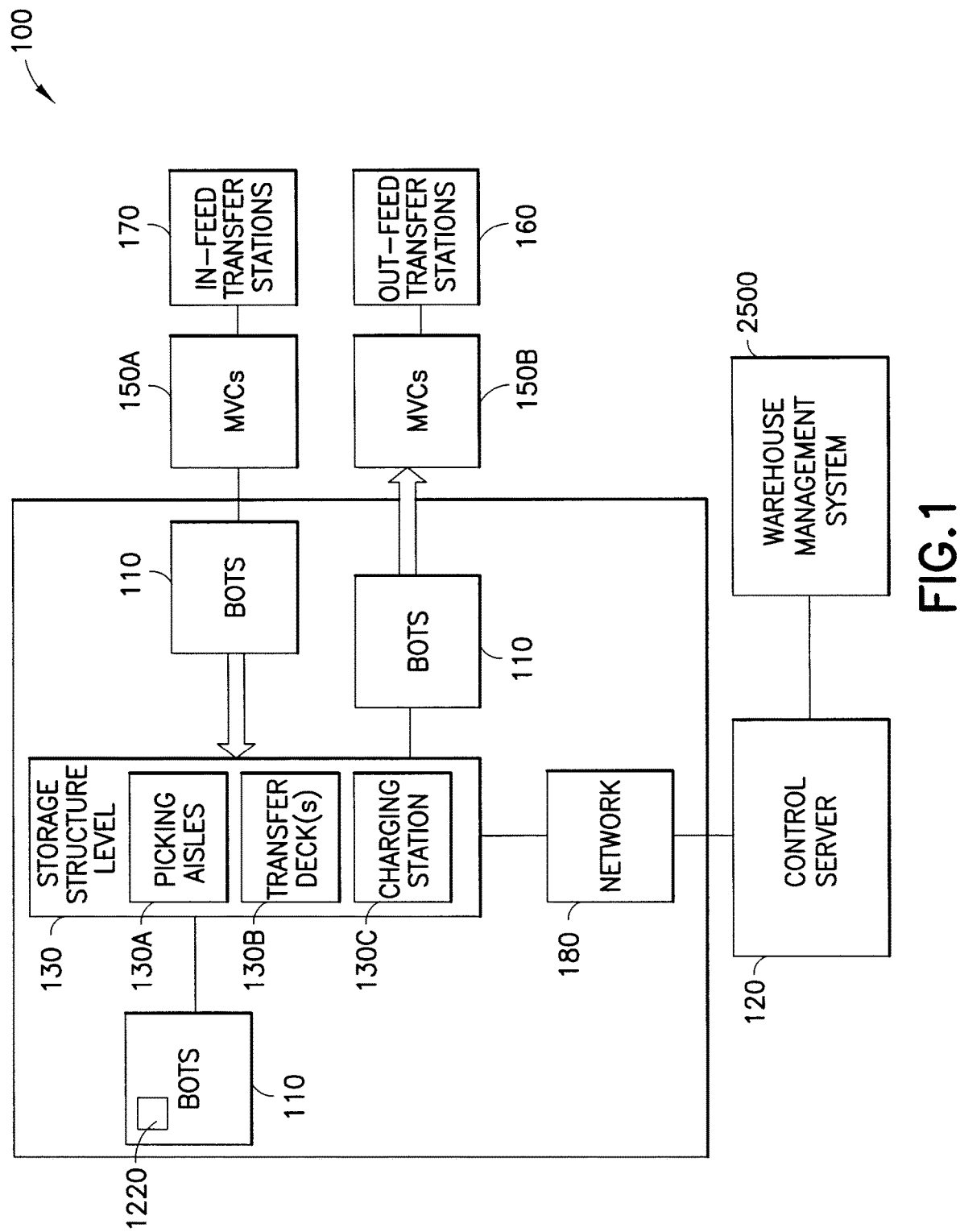
FIG. 1 schematically illustrates an exemplary storage and retrieval system in accordance with an exemplary embodiment.

FIG. 1 generally schematically illustrates a storage and retrieval system 100 in accordance with an exemplary embodiment. Although the embodiments disclosed will be described with reference to the embodiments shown in the drawings, it should be understood that the embodiments disclosed can be embodied in many alternate forms. In addition, any suitable size, shape or type of elements or materials could be used.

In accordance with one exemplary embodiment the storage and retrieval system 100 may operate in a retail distribution center or warehouse to, for example, fulfill orders received from retail stores for case units (where case units as used herein means case units not stored in trays, on totes or on pallets, e.g. uncontained). It is noted that the case units may include cases of case units (e.g. case of soup cans, boxes of cereal, etc.) or individual case units that are adapted to be taken off of or placed on a pallet. In accordance with the exemplary embodiments, shipping cases or case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. each pallet may hold different types of case units—a pallet holds a combination of soup and cereal). In alternate embodiments the storage and retrieval system described herein may be applied to any environment in which case units are stored and retrieved.

The storage and retrieval system 100 may be configured for installation in, for example, existing warehouse structures or adapted to new warehouse structures. In one exemplary embodiment, the storage and retrieval system may include in-feed and out-feed transfer stations 170, 160, multilevel vertical conveyors 150A, 150B, a storage structure 130, and a number of autonomous vehicular transport robots 110 (referred to herein as "bots"). In alternate embodiments the storage and retrieval system may also include robot or bot transfer stations 140 (FIGS. 6A-6D) that may provide an interface between the bots 110 and the multilevel vertical conveyors 150A, 150B as will be described below. The storage structure 130 may include multiple levels of storage rack modules where each level includes respective picking aisles 130A, and transfer decks 130B for transferring case units between any of the storage areas of the storage structure 130 and any shelf of any multilevel vertical conveyor 150A, 150B. The picking aisles 130A, and transfer decks 130B also allow the bots to place case units into picking stock and to retrieve ordered case units. In alternate embodiments, each level may also include respective bot transfer stations 140. The bots 110 may be configured to place case units, such as the above described retail merchandise, into picking stock in the one or more levels of the storage structure 130 and then selectively retrieve ordered case units for shipping the ordered case units to, for example, a store or other suitable location. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors are described as being dedicated inbound conveyors 150A and outbound conveyors 150B, in alternate embodiments each of the conveyors 150A, 150B may be used for both inbound and outbound transfer of case units/case units from the storage and retrieval system.

It is noted that the multilevel vertical conveyors may be substantially similar to those described in U.S. patent application Ser. No. 12/757,354, entitled "LIFT INTERFACE FOR STORAGE AND RETRIEVAL SYSTEMS,", previously incorporated by reference. For example, referring to FIGS. 2-5, it is noted that the input multilevel vertical conveyor 150A and associated in-feed transfer stations 170 will be described, however, the out-feed multilevel vertical conveyors 150B and out-feed transfer stations 160 may be substantially similar to that described below for their in-feed counterparts but for the direction of material flow out of the storage and retrieval system 100 rather than into the storage and retrieval system 100. As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s), uncontained or without containment (e.g. case unit (s) are not sealed in trays), can be transferred from a multilevel vertical conveyor 150A, 150B to each storage space on a respective level and from each storage space to any one of the multilevel vertical conveyors 150A, 150B on a respective level. The bots 110 may be configured to transfer the uncontained case units between the storage spaces and the multilevel vertical conveyors with one pick (e.g. substantially directly between the storage spaces and the multilevel vertical conveyors). By way of further example, the designated bot 110 picks the uncontained case unit(s) from a shelf of a multilevel vertical conveyor, transports the uncontained case unit(s) to a predetermined storage area of the storage structure 130 and places the uncontained case unit(s) in the predetermined storage area (and vice versa).

Generally, the multilevel vertical conveyors include payload shelves 730 (FIGS. 2A-4) attached to chains or belts that form continuously moving or circulating vertical loops (the shape of the loop shown in the FIGS. is merely exemplary and in alternate embodiments the loop may have any suitable shape including rectangular and serpentine) that move at a substantially constant rate, so that the shelves 730 use what may be referred to as the "paternoster" principle of continuous conveyance, with loading and unloading performed at any point in the loop without slowing or stopping. The multilevel vertical conveyors 150A, 150B may be controlled by a server, such as for example, control server 120, or any other suitable controller. One or more suitable computer workstations 700 may be connected to the multilevel vertical conveyors 150A, 150B and the server 120 in any suitable manner (e.g. wired or wireless connection) for providing, as an example, inventory management, multilevel vertical conveyor functionality and control, and customer order fulfillment. As may be realized, the computer workstations 700 and/or server 120 may be programmed to control the in-feed and/or out-feed conveyor systems. In alternate embodiments, the computer workstations 700 and/or server 120 may also be programmed to control the transfer stations 140. In one exemplary embodiment, one or more of the workstations 700 and control server 120 may include a control cabinet, a programmable logic controller and variable frequency drives for driving the multilevel vertical conveyors 150A, 150B. In alternate embodiments the workstations 700 and/or control server 120 may have any suitable components and configuration. In one exemplary embodiment, the workstations 700 may be configured to substantially remedy any exceptions or faults in the in-feed and/or out-feed conveyor systems substantially without operator assistance and communicate fault recovery scenarios with the control server 120 and/or vice versa.

Figure 4:
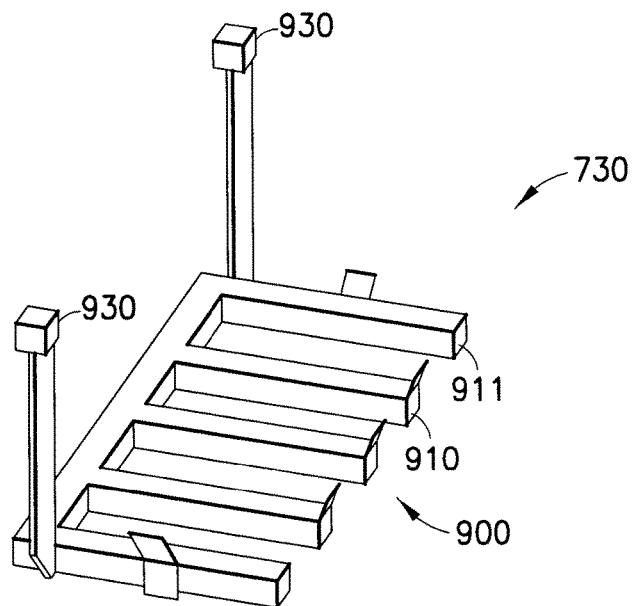
FIG. 4 illustrates a schematic view of a conveyor shelf in accordance with an exemplary embodiment.

Referring also to FIG. 4, in this exemplary embodiment, the multilevel vertical conveyors 150A may include a frame 710 configured to support driven members such as, for example, chains 720. The chains 720 may be coupled to the shelves 730, which are movably mounted to the frame 710 such that the chains 720 effect substantially continuous movement of the shelves 730 around the frame 710. In alternate embodiments, any suitable drive link, such as for example, belts or cables may be used to drive the shelves 730. Each shelf 730 may include, for example, supports 930 and a platform 900. The supports 930 may extend from the platform 900 and be configured for attaching and mounting the shelf 730 to, for example, one or more drive chains 720. The platform 900 may include, for example, any suitably shaped frame 911, which in this example is generally "U" shaped (e.g. having lateral members connected by a span member at one end), and has any suitable number of spaced apart fingers 910 extending from the frame 911. The fingers 910 may be configured for supporting the pickfaces 750, 752 (FIG. 2B) where each pickface comprises at least one uncontained case unit. In one exemplary embodiment, each of the fingers 910 may be removably fastened to a frame 911 for facilitating replacement or repair of individual fingers 910. The fingers 910, frame 911 (and supports 930) may form an integral structure or platform that defines the seating surface that contacts and supports the uncontained case units. It is noted that the shelf 730 illustrates only a representative structure and in alternate embodiments, the shelves 730 may have any suitable configuration and size for transporting pickfaces 750, 752. The spaced apart fingers 910 are configured to interface with, for example, a transfer arm or effector 1235 of the bots 110 and the in-feed transfer stations 170 for transferring the pickfaces 750, 752 between the multilevel vertical conveyor 150A and one or more of the transfer stations 170 and bots 110. In alternate embodiments, the spaced apart fingers 910 may be configured to interface with bot transfer stations 140 as described below.

The multilevel vertical conveyors 150A may also include a suitable stabilizing device(s), such as for example, driven stabilizing chains for stabilizing the shelves 730 during vertical travel. In one example, the stabilizing devices may include chain driven dogs that are engaged to the shelves in both the upward and downward directions to form, for example, a three point engagement with the shelf supports 930. The drive chains 720 for the shelves 730 and stabilizing devices may be drivingly coupled to for example, any suitable number of drive motors under the control of, for example, one or more of the computer workstations 700 and control server 120.

Figure 2A:
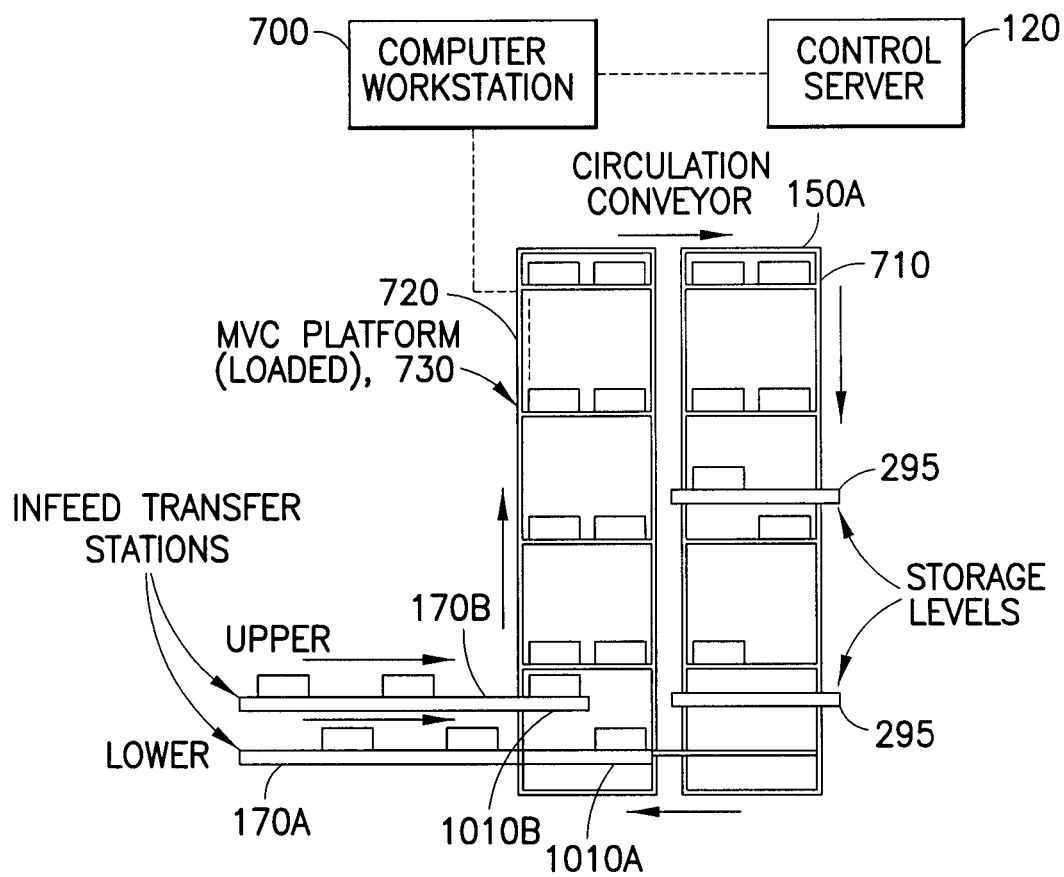
Figure 2B:
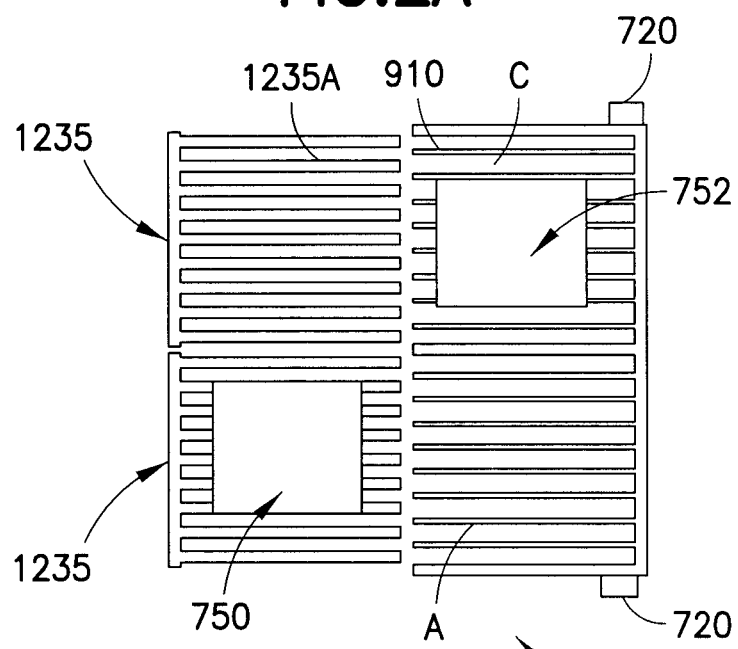
Figure 5:
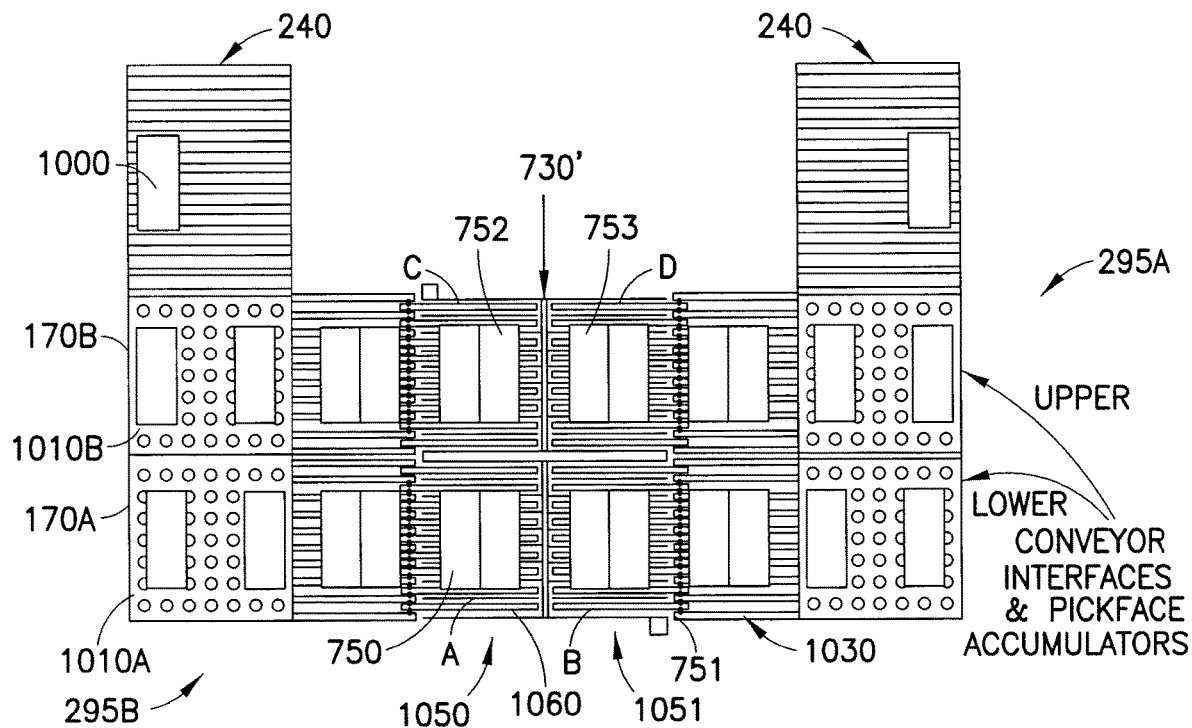
FIG. 5 schematically illustrates a conveyor system in accordance with an exemplary embodiment.

In one exemplary embodiment there may be any suitable number of shelves 730 mounted and attached to the drive chains 720. As can be seen in FIG. 2B each shelf 730 may be configured to carry, for exemplary purposes only, two or more separate pickfaces 750, 752 in corresponding positions A, C on the shelf 730 (e.g. a single vertical conveyor is functionally, equivalent to multiple individually operated conveyors arranged adjacent one another). In alternate embodiments, as can be seen in FIG. 5 the shelves 730' may be configured to carry, for exemplary purposes only, four separate pickfaces 750-753 in corresponding positions A-D. In still other alternate embodiments, each shelf may be configured to carry more or less than four separate loads. As described above, each pickface may comprise one or more uncontained case units and may correspond to the load of a single bot 110. As may be realized, the space envelope or area planform of each pickface may be different. By way of example, uncontained cases, such as those directly transported by the multilevel vertical conveyors have various different sizes (e.g. differing dimensions). Also, as noted each pickface may include one or more uncontained cases. Thus, the length and width of each pickface carried by the multilevel vertical conveyors may be different. In alternate embodiments each pickface may be broken between, for example, bots 110 where different portions of the pickface are transported by more than one bot 110 on, for example, different levels of the storage structure 130. As may be realized when a pickface is broken each portion of the broken pickface may be considered as a new pickface by the storage and retrieval system 100. For exemplary purposes only, referring to FIGS. 3A, 3B the shelves 730 of the multilevel vertical conveyors 150A, 150B may be spaced from each other by a predetermined pitch P to allow for placement or removal of loads 810, 820 from the substantially continuously moving shelves 730 as will be described below.

Referring now to FIG. 5, and as described above, the multilevel vertical conveyors, such as conveyor 150A are supplied with uncontained case units 1000 from in-feed transfer stations 170 (FIG. 1). As described above, the in-feed transfer stations 170 may include one or more of depalletizing workstations, conveyors 240, conveyor interfaces/bot load accumulators 1010A, 1010B and conveyor mechanisms 1030. As can be seen in FIG. 5, uncontained case units 1000 are moved from, for example depalletizing workstations by conveyors 240. In this example, each of the positions A-D is supplied by a respective in-feed transfer station. As may be realized, while the transfer of case units is being described with respect to shelves 730' it should be understood that transfer of case units to shelves 730 occurs in substantially the same manner. For example, position A may be supplied by in-feed transfer station 170A and position C may be supplied by in-feed transfer station 170B. Referring also to FIG. 2A the in-feed transfer stations 170A, 170B, for supplying similar sides of the shelf 730 (in this example positions A and C, which are disposed side by side, form a first side 1050 of the shelf 730 and positions B and D, which are disposed side by side, form a second side 1051 of the shelf 730), may be located one above the other in a horizontally staggered stacked arrangement (an exemplary stacked arrangement is shown in FIG. 2A). In other exemplary embodiments, the stacked arrangement may be configured so that the in-feed transfer stations are disposed vertically in-line one above the other and extend into the multilevel vertical conveyors by different amounts for supplying, for example, positions A and B or positions C and D where positions A and B (and positions C and D) are disposed one in front of the other, rather than side by side. In alternate embodiments, the in-feed transfer stations may have any suitable configuration and positional arrangement. As can be seen in FIG. 5, the first side 1050 and second side 1051 of the shelf 730 are loaded (and unloaded) in opposing directions such that each multilevel vertical conveyor 150A is located between respective transfer areas 295A, 295B where the first side 1050 interfaces with a transfer area 295B and the second side 1051 interfaces with transfer area 295A.

In this exemplary embodiment, the accumulators 1010A, 1010B are configured to form the uncontained case units 1000 into the individual bot pickfaces 750-753 prior to loading a respective position A-D on the multilevel vertical conveyor 730. In one exemplary embodiment, the computer workstation 700 and/or control server 120 may provide instructions or suitably control the accumulators 1010A, 1010B (and/or other components of the in-feed transfer stations 170) for accumulating a predetermined number of case units to form the pickfaces 750-753. The accumulators 1010A, 1010B may align the case units in any suitable manner (e.g. making one or more sides of the case units flush, etc.) and, for example, abut the case units together. The accumulators 1010A, 1010B may be configured to transfer the pickfaces 750-753 to respective conveyor mechanisms 1030 for transferring the pickfaces 750-753 to a respective shelf position A-D. In one exemplary embodiment the conveyor mechanisms 1030 may include belts or other suitable feed devices for moving the pickfaces 750-753 onto transfer platforms 1060. The transfer platforms 1060 may include spaced apart fingers for supporting the pickfaces 750-753 where the fingers 910 of the shelves 730 are configured to pass between the fingers of the transfer platforms 1060 for lifting (or placing) the pickfaces 750-753 from the transfer platforms 1060. In another exemplary embodiment, the fingers of the transfer platforms 1060 may be movable and serve to insert the pickfaces 750-753 into the path of the shelves 730 in a manner similar to that described below with respect to the bot transfer stations 140. In alternate embodiments the in-feed transfer stations 170 (and out-feed transfer stations 160) may be configured in any suitable manner for transferring case units (e.g. the pickfaces formed by the case units) onto or from respective multilevel vertical conveyors 150A, 150B.

In an alternate embodiment, the bots 110 may interface directly with the multilevel vertical conveyors 150A, 150B while in alternate embodiments the bots 110 may interface indirectly with the multilevel vertical conveyors through, for example, respective bot transfer stations 140 (which may have extendable fingers for interfacing with slatted support shelves of the multi-level vertical conveyors which may be substantially similar to those described in U.S. patent application Ser. No. 12/757,354, entitled "LIFT INTERFACE FOR STORAGE AND RETRIEVAL SYSTEMS", previously incorporated by reference). It is noted that while the interface between the bot transfer stations 140 and the multilevel vertical conveyors 150A, 150B are described it should be understood that interfacing between the bots 110 and the multilevel vertical conveyors 150A, 150B occurs in a substantially similar manner (e.g. as described in U.S. patent application Ser. No. 12/757,312, entitled "AUTONOMOUS TRANSPORTS FOR STORAGE AND RETRIEVAL SYSTEMS," (now U.S. Pat. No. 8,425,173), previously incorporated by reference herein in its entirety). For exemplary purposes only, referring now to FIGS. 2B and 6A-6D, the multilevel vertical conveyors 150A transfer pickfaces 750, 752 from, for example, the in-feed transfer stations 170 (or any other suitable device or loading system) to, for example, the bot transfer stations 140 associated with each of the levels in the storage structure 130. In other examples, the pickfaces 750, 752 may be transferred directly from the multilevel vertical conveyors 150A to the bots 110 as described below. As may be realized, the bot transfer stations 140 are disposed on respective levels of the storage structure 130 adjacent the path of travel of the shelves 730 of a respective multilevel vertical conveyor 150A. In one exemplary embodiment, there may be a bot transfer station 140 corresponding to each of the positions A and C on the shelves 730 (and positions A-D with respect to shelf 730'). For example, a first bot transfer station 140 may remove pickface 750 from position A on shelf 730 while another bot transfer station 140 may remove pickface 750 from position C on shelf 730 and so on. In other exemplary embodiments, one bot transfer station 140 may serve to remove or place case units in more than one position A, C on the shelves 730. For example, one bot transfer station 140 may be configured for removing loads 750, 752 from one or more of positions A, C of shelf 730. In alternate embodiments, referring also to FIG. 5, one bot transfer station 140 may be configured for removing pickfaces 750, 752 from one or more of positions A, C on a first side 1050 of the shelf 730' while another bot transfer station 140 may be configured to remove pickfaces 751, 753 from one or more of positions B, D on the second side 1051 of the shelf 730'. In alternate embodiments the bot transfer stations 140 may have any suitable configuration for accessing any suitable number of positions A-D of the shelves 730, 730'.

Figure 6B:
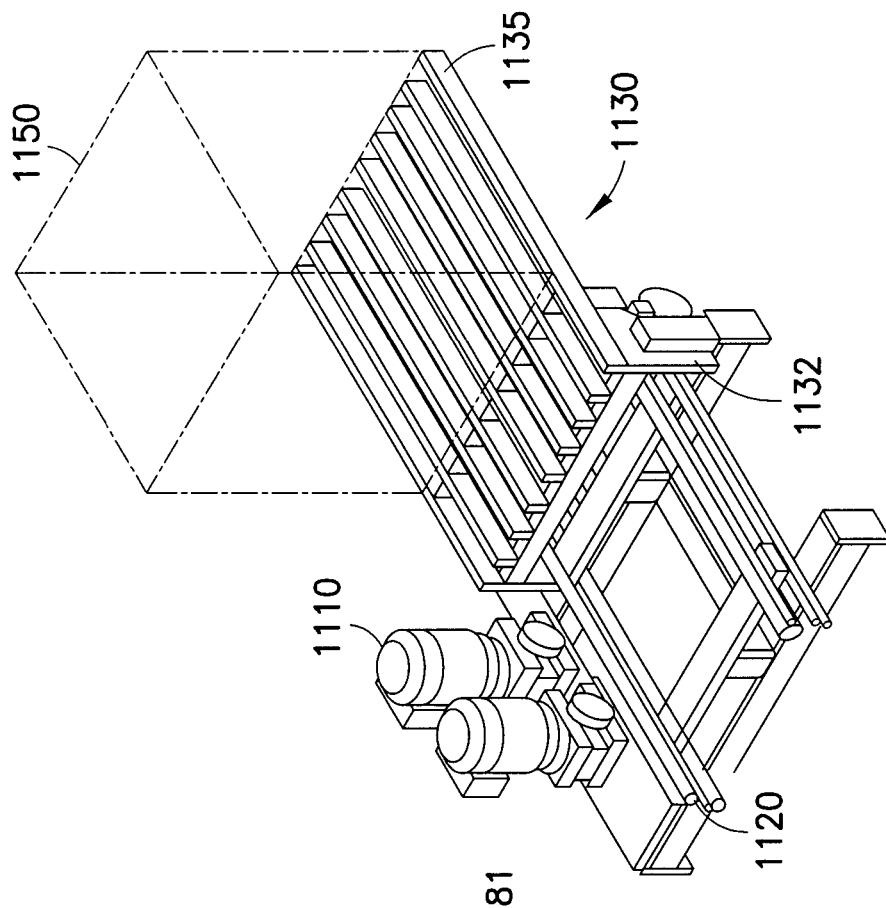
FIGS. 6A-6D schematically illustrate a transfer station in accordance with an exemplary embodiment.
Figure 6A:
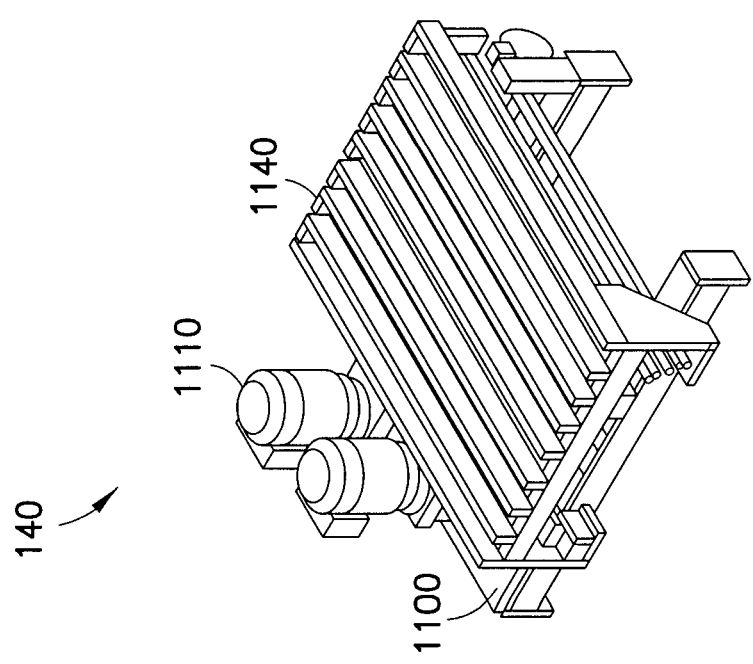

Each bot transfer station 140 may include a frame 1100, one or more drive motors 1110 and a carriage system 1130. The frame 1100 may have any suitable configuration for coupling the bot transfer station 140 to, for example, any suitable supporting feature of the storage structure 130, such as a horizontal or vertical support. The carriage system 1130 may be movably mounted to the frame 1100 through, for example, rails 1120 that are configured to allow the carriage system 1130 to move between retracted and extended positions as shown in FIGS. 6A and 6B. The carriage system 1130 may include a carriage base 1132 and fingers 1135. The fingers 1135 may be mounted to the carriage base 1132 in a spaced apart arrangement so that the fingers 1135 extend from the carriage base 1132 in a cantilevered fashion. It is noted that each finger 1135 may be removably mounted to the carriage base 1132 for facilitating replacement or repair of individual fingers 1135. In alternate embodiments the fingers and carriage base may be of unitary one-piece construction. The fingers 1135 of the bot transfer stations 140 may be configured to pass between the fingers 910 (FIG. 4) of the shelves 730 of the multilevel vertical conveyors 150A (FIG. 1) for removing pickfaces such as pickface 1150 (which may be substantially similar to pickfaces 750-753) from the shelves 730. The bot transfer station 140 may also include a load positioning device 1140 that retractably extends between, for example, the spaced apart fingers 1135 in the direction of arrow 1181 for effecting positioning of the pickface 1150 in a predetermined orientation relative to the bot transfer station 140. In still other alternate embodiments the carriage system 1130 may have any suitable configuration and/or components. The one or more drive motors 1110 may be any suitable motors mounted to the frame 1100 for causing the extension/retraction of the carriage system 1130 and the extension/retraction of the positioning device 1140 in any suitable manner such as by, for exemplary purposes only, drive belts or chains. In alternate embodiments, the carriage system and positioning device may be extended and retracted in any suitable manner.

Figure 6D:
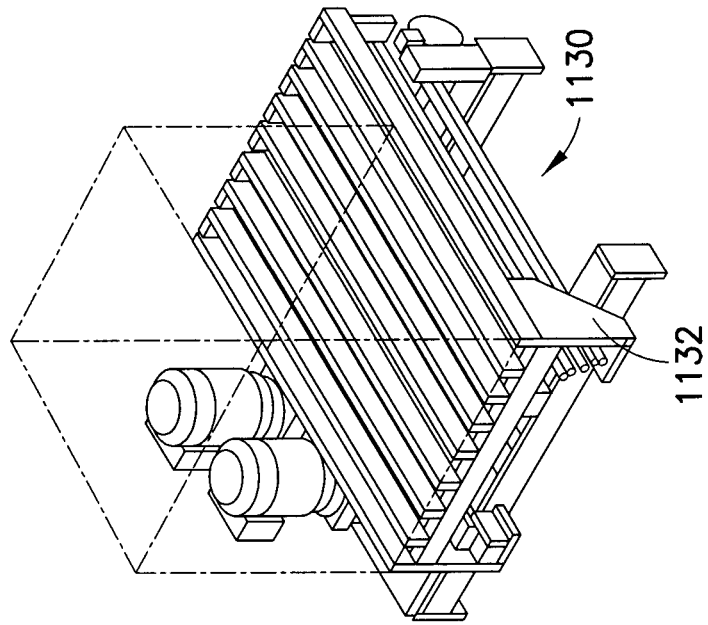
Figure 6C:
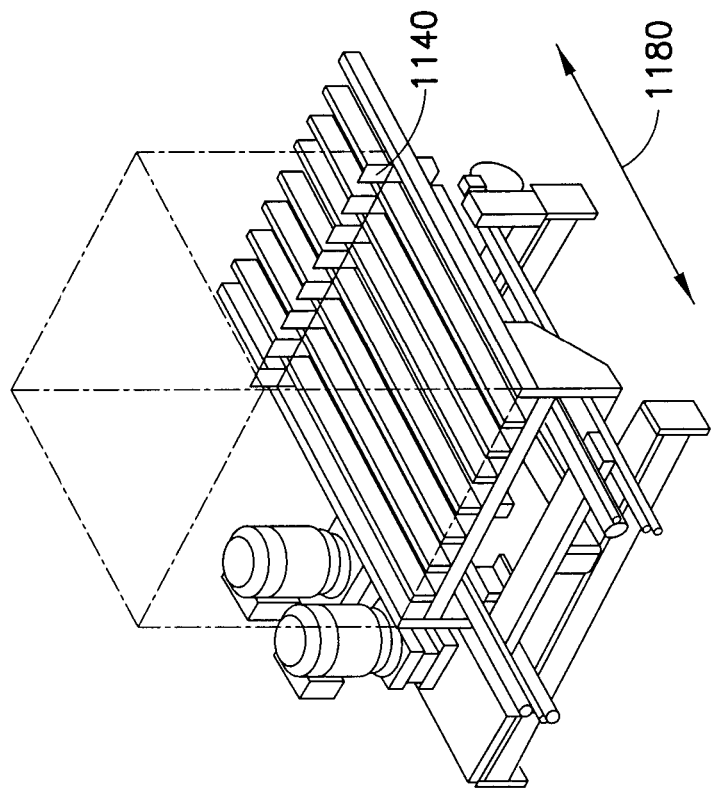

In operation, referring also to FIGS. 2C, 2D, 3A and 3B, inbound pickfaces (e.g. pickfaces, which include one or more case units, that are being transferred into the storage and retrieval system) such as pickface 1150 will circulate around the multilevel vertical conveyor 150A and be removed from a respective conveyor by, for example, a bot 110. In one example, the pickface 1150 may be loaded onto the shelves 730 during an upward travel of the multilevel vertical conveyor 150A and off loaded from the shelves 730 during downward travel of the multilevel vertical conveyor 150A. In alternate embodiments the pickfaces may be loaded or off loaded from the shelves 730 in any suitable manner. As may be realized, the position of the case units on the multilevel vertical conveyor shelf 730 defines the pickface position that the bot 110 picks from. The bot may be configured to pick any suitable load or pickface from the shelf 730 regardless of the pickface position on the shelf 730 or the size of the pickface. In one exemplary embodiment, the storage and retrieval system 100 may include a bot positioning system for positioning the bot adjacent the shelves 730 for picking a desired pickface from a predetermined one of the shelves 730 (e.g. the bot 110 is positioned so as to be aligned with the pickface). The bot positioning system may also be configured to correlate the extension of the bot transfer arm 1235 with the movement (e.g. speed and location) of the shelves 730 so that the transfer arm 1235 is extended and retracted to remove (or place) pickfaces from predetermined shelves 730 of the multilevel vertical conveyors 150A, 150B. For exemplary purposes only, the bot 110 may be instructed by, for example, the computer workstation 700 or control server 120 (FIG. 2A) to extend the transfer arm 1235 (see also FIGS. 11A-11D) into the path of travel of the pickface 1150. As the pickface 1150 is carried by the multilevel vertical conveyor 150A in the direction of arrow 860 fingers 1235A (which may be substantially similar to fingers 1135 of the bot transfer station 140) of the bot transfer arm 1235 pass through the fingers 910 of the shelf 730 for transferring the pickface 1150 from the shelf 730 to the transfer arm 1235 (e.g. the pickface 1150 is lifted from the fingers 910 via relative movement of the shelf 730 and the transfer arm 1235). As may be realized, the pitch P between shelves may be any suitable distance for allowing the transfer of pickfaces between the multilevel vertical conveyor and the bots 110 while the shelves 730 are circulating around the multilevel vertical conveyor at a substantially continuous rate. The bot transfer arm 1235 may be retracted (in a manner substantially similar to that shown in FIGS. 6C, 6D with respect to the bot transfer station 140) so that the pickface 1150 is no longer located in the path of travel of the shelves 730 of the multilevel vertical conveyor 150A. It is noted that in alternate embodiments, where the bot transfer stations 140 are used, the positioning device 1140 may be extended through the fingers 1135 and the carriage system 1130 (FIGS. 6A-6D) may be moved in the direction of arrow 1180 for abutting the pickface 1150 against the positioning device 1140 effecting positioning of the pickface 1150 in a predetermined orientation relative to, for example, the bot transfer station 140. The carriage system 1130 may be fully retracted as shown in FIG. 6D for transfer of the pickface 1150 to a bot 110.

Figure 3A:
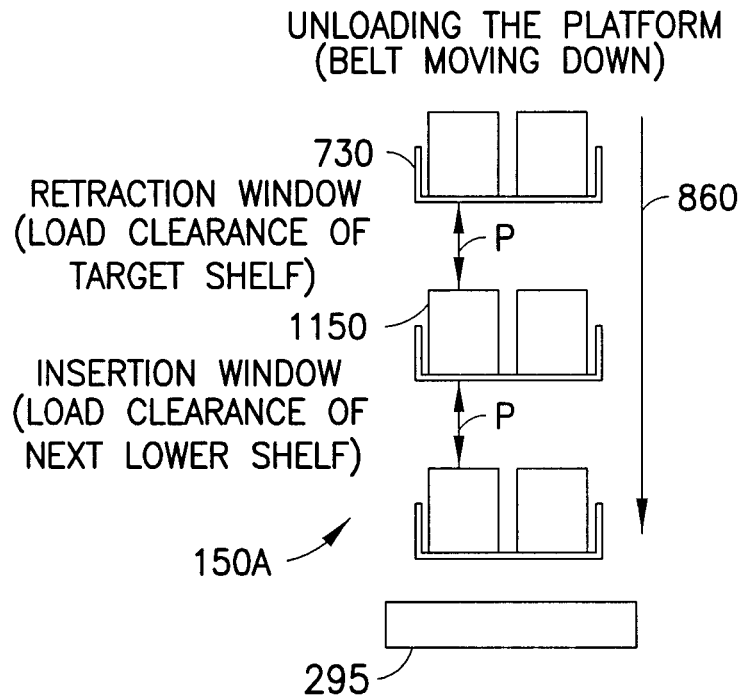
Figure 3B:
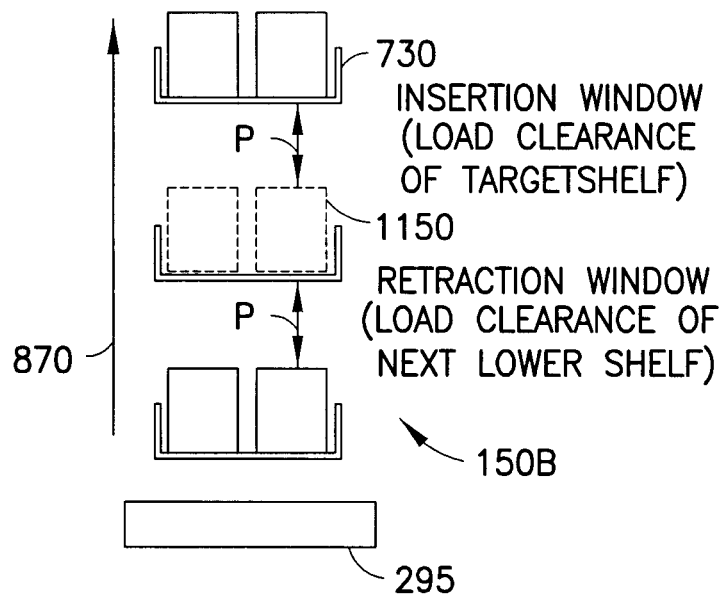

Referring to FIGS. 2D and 3B, for transferring loads in the outbound direction (e.g. moving pickfaces from or out of the storage and retrieval system) a pickface, such as pickface 1150, may be extended into the path of the shelves 730 of the multilevel vertical conveyor 150B (which is substantially similar to conveyor 150A) by the bot transfer arm 1235 through an extension of the transfer arm 1235 relative to a frame of the bot 110. The substantially continuous rate of movement of the shelves 730 in the direction of arrow 870 cause the fingers 910 of the shelf 730 to pass through the fingers 1235A of the bot transfer arm 1235 such that the movement of the shelf 730 effects lifting the pickface 1150 from the fingers 1235A. The pickface 1150 travels around the multilevel vertical conveyor 150B to an out-feed transfer station 160 (which is substantially similar to in-feed transfer station 170) where is it removed from the shelf 730 by a conveyor mechanism 1030 in a manner substantially similar to that described above.

It is noted that the respective transfer of pickfaces between the multilevel vertical conveyors 150A, 150B and the in-feed and out-feed transfer stations 170, 160 may occur in a manner substantially similar to that described above with respect to the bots 110 and bot transfer stations 140. In alternate embodiments transfer of pickfaces between the multilevel vertical conveyors 150A, 150B and the in-feed and out-feed transfer stations 170, 160 may occur in any suitable manner.

As can be seen in FIGS. 2C and 2D the shelves 730 of the multilevel vertical conveyors 150A, 150B are loaded and unloaded by the in-feed and out-feed transfer stations 170, 160 and the bots 110 from a common side of the shelf 730. For example, the shelves are loaded and unloaded in the common direction 999 (e.g. from only one side of the shelf 730). In this example, to facilitate loading the multilevel vertical conveyor from only one side of the shelf, the multilevel vertical conveyors 150A, 150B circumscribe a respective one of the in-feed and out-feed transfer stations 170, 160 so that the pickfaces 1150 travel around the in-feed and out-feed transfer stations 170, 160. This allows the in-feed and out-feed transfer stations 170, 160 to be placed on the same side of the shelves 730 as the bots 110 for transferring pickfaces (and the case units therein) to and from the multilevel vertical conveyors 150A, 150B.

The bots may be substantially similar to those described in U.S. patent application Ser. No. 12/757,312, entitled "AUTONOMOUS TRANSPORTS FOR STORAGE AND RETRIEVAL SYSTEMS,", previously incorporated by reference herein. For example, referring now to FIGS. 7-11D, the bots 110 that transfer loads between, for example, the multilevel vertical conveyors 150A, 150B and the storage shelves of a respective level of storage structure 130 will be described. It is noted that in one exemplary embodiment the bots 110 may transfer loads directly to and/or from the multilevel vertical conveyors 150A, 150B in a manner substantially similar to that described with respect to the bot transfer stations 140. In one example, the bots 110 may be configured for substantially continuous operation. For exemplary purposes only, the bots 110 may have a duty cycle of about ninety-five (95) percent. In alternate embodiments the bots may have any suitable duty cycle and operational periods.

Figure 7:
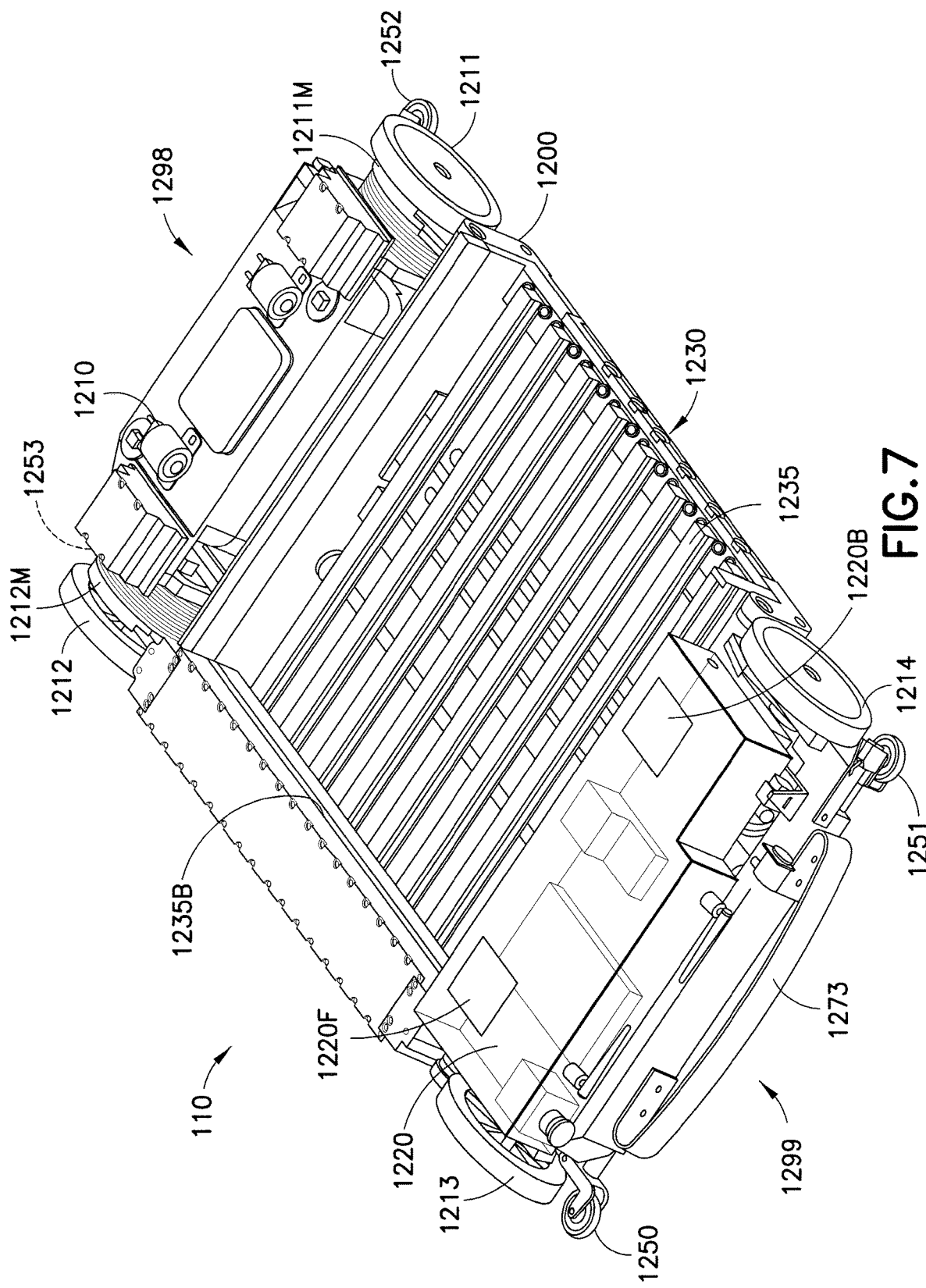
FIGS. 7 and 8A-8C illustrate a transport robot in accordance with an exemplary embodiment.

As can be seen in FIG. 7, the bots 110 generally include a frame 1200, a drive system 1210, a control system 1220, and a payload area 1230. The drive system 1210 and control system 1220 may be mounted to the frame in any suitable manner. The frame may form the payload area 1230 and be configured for movably mounting a transfer arm or effector 1235 to the bot 110.

In one exemplary embodiment, the drive system 1210 may include two drive wheels 1211, 1212 disposed at a drive end 1298 of the bot 110 and two idler wheels 1213, 1214 disposed at a driven end 1299 of the bot 110. The wheels 1211-1214 may be mounted to the frame 1200 in any suitable manner and be constructed of any suitable material, such as for example, low-rolling-resistance polyurethane. In alternate embodiments the bot 110 may have any suitable number of drive and idler wheels. In one exemplary embodiment, the wheels 1211-1214 may be substantially fixed relative to a longitudinal axis 1470 (FIG. 9B) of the bot 110 (e.g. the rotational plane of the wheels is fixed in a substantially parallel orientation relative to the longitudinal axis 1470 of the bot) to allow the bot 110 to move in substantially straight lines such as when, for example, the bot is travelling on a transfer deck 130B, 330A, 330B (e.g. FIGS. 13-15, 18-19B) or within a picking isle 130A (e.g. FIGS. 13-15, 18-19B). In alternate embodiments, the rotational plane of one or more of the drive wheels and idler wheels may be pivotal (e.g. steerable) relative to the longitudinal axis 1470 of the bot for providing steering capabilities to the bot 110 by turning the rotational planes of one or more of the idler or drive wheels relative to the longitudinal axis 1470. The wheels 1211-1214 may be substantially rigidly mounted to the frame 1200 such that the axis of rotation of each wheel is substantially stationary relative to the frame 1200. In alternate embodiments the wheels 1211-1214 may be movably mounted to the frame by, for example, any suitable suspension device, such that the axis of rotation of the wheels 1211-1214 is movable relative to the frame 1200. Movably mounting the wheels 1211-1214 to the frame 1200 may allow the bot 110 to substantially level itself on uneven surfaces while keeping the wheels 1211-1214 in contact with the surface.

Each of the drive wheels 1211, 1212 may be individually driven by a respective motor 1211M, 1212M. The drive motors 1211M, 1212M may be any suitable motors such as, for exemplary purposes only, direct current electric motors. The motors 1211M, 1212M may be powered by any suitable power source such as by, for example, a capacitor 1400 (FIG. 9B) mounted to the frame 1200. In alternate embodiments the power source may be any suitable power source such as, for example, a battery or fuel cell. In still other alternate embodiments the motors may be alternating current electric motors or internal combustion motors. In yet another alternate embodiment, the motors may be a single motor with dual independently operable drive trains/transmissions for independently driving each drive wheel. The drive motors 1211M, 1212M may be configured for bi-directional operation and may be individually operable under, for example, control of the control system 1220 for effecting steering of the bot 110 as will be described below. The motors 1211M, 1212M may be configured for driving the bot 110 at any suitable speed with any suitable acceleration when the bot is in either a forward orientation (e.g. drive end 1298 trailing the direction of travel) or a reverse orientation (e.g. drive end 1298 leading the direction of travel). In this exemplary embodiment, the motors 1211M, 1212M are configured for direct driving of their respective drive wheel 1211, 1212. In alternate embodiments, the motors 1211M, 1212M may be indirectly coupled to their respective wheels 1211, 1212 through any suitable transmission such as, for example, a drive shaft, belts and pulleys and/or a gearbox. The drive system 1210 of the bot 110 may include an electrical braking system such as for example, a regenerative braking system (e.g. to charge, for example, a capacitor 1400 (FIG. 9B) powering the bot 110 under braking). In alternate embodiments, the bot 110 may include any suitable mechanical braking system. The drive motors may be configured to provide any suitable acceleration/deceleration rates and any suitable bot travel speeds. For exemplary purposes only the motors 1211M, 1212M may be configured to provide the bot (while the bot is loaded at full capacity) a rate of acceleration/deceleration of about 3.048 m/sec$^2$, a transfer deck 130B cornering speed of about 1.524 m/sec and a transfer deck straightaway speed of about 9.144 m/sec or about 10 m/sec.

As noted above drive wheels 1211, 1212 and idler wheels 1213, 1214 are substantially fixed relative to the frame 1200 for guiding the bot 110 along substantially straight paths while the bot is travelling on, for example, the transfer decks 130B, 330A, 330B (e.g. FIGS. 13-15, 18-19B). Corrections in the straight line paths may be made through differential rotation of the drive wheels 1211, 1212 as described herein. In alternate embodiments, guide rollers 1250, 1251 may be mounted to the frame to aid in guiding the bot 110 on the transfer deck 130B such as through contact with a wall 1801, 2100 (FIG. 18-19B) of the transfer deck 130B. However, in this exemplary embodiment the fixed drive and idler wheels 1211-1214 may not provide agile steering of the bot 110 such as when, for example, the bot 110 is transitioning between the picking aisles 130A, transfer decks 130B or transfer areas 295. In one exemplary embodiment, the bot 110 may be provided with one or more retractable casters 1260, 1261 for allowing the bot 110 to make, for example, substantially right angle turns when transitioning between the picking aisles 130A, transfer decks 130B and transfer areas 295. It is noted that while two casters 1260, 1261 are shown and described, in alternate embodiments the bot 110 may have more or less than two retractable casters. The retractable casters 1260, 1261 may be mounted to the frame 1200 in any suitable manner such that when the casters 1260, 1261 are in a retracted position both the idler wheels 1213, 1214 and drive wheels 1211, 1212 are in contact with a flooring surface such as surface 1300S of the rails 1300 or a transfer deck 130B of the storage structure 130, whereas when the casters 1260, 1261 are lowered the idler wheels 1213, 1214 are lifted off the flooring surface. As the casters 1260, 1261 are extended or lowered the idler wheels 1213, 1214 are lifted off of the flooring surface so that the driven end 1299 of the bot 110 can be pivoted about a point P (FIGS. 9B, 19A, 19B) of the bot through, for example, differential rotation of the drive wheels 1211, 1212. For example, the motors 1211M, 1212M may be individually and differentially operated for causing the bot 110 to pivot about point P which is located, for example, midway between the wheels 1211, 1212 while the driven end 1299 of the bot swings about point P accordingly via the casters 1260, 1261.

In other exemplary embodiments, the idler wheels 1213, 1214 may be replaced by non-retractable casters 1260', 1261' (FIG. 9C) where the straight line motion of the bot 110 is controlled by differing rotational speeds of each of the drive wheels 1211, 1212 as described herein. The non-retractable casters 1260', 1261' may be releasably lockable casters such that the casters 1260', 1261' may be selectively locked in predetermined rotational orientations to, for example, assist in guiding the bot 110 along a travel path. For example, during straight line motion of the bot 110 on the transfer deck 130B and/or within the picking aisles 130A the non-retractable casters 1260', 1261' may be locked in an orientation such that the wheels of the casters 1260', 1261' are substantially in-line with a respective one of the drive wheels 1213, 1214 (e.g. the rotational plane of the wheels of the casters is fixed in a substantially parallel orientation relative to the longitudinal axis 1470 of the bot). The rotational plane of the wheels of the non-retractable casters 1260', 1261' may be locked and released relative to the longitudinal axis 1470 of the bot 110 in any suitable manner. For example, a controller 1701 (FIG. 12) of the bot 110 may be configured to effect the locking and releasing of the casters 1260', 1261' by for example controlling any suitable actuator and/or locking mechanism. In alternate embodiments any other suitable controller disposed on or remotely from the bot 110 may be configured to effect the locking and releasing of the casters 1260', 1261'.

Figure 8A:
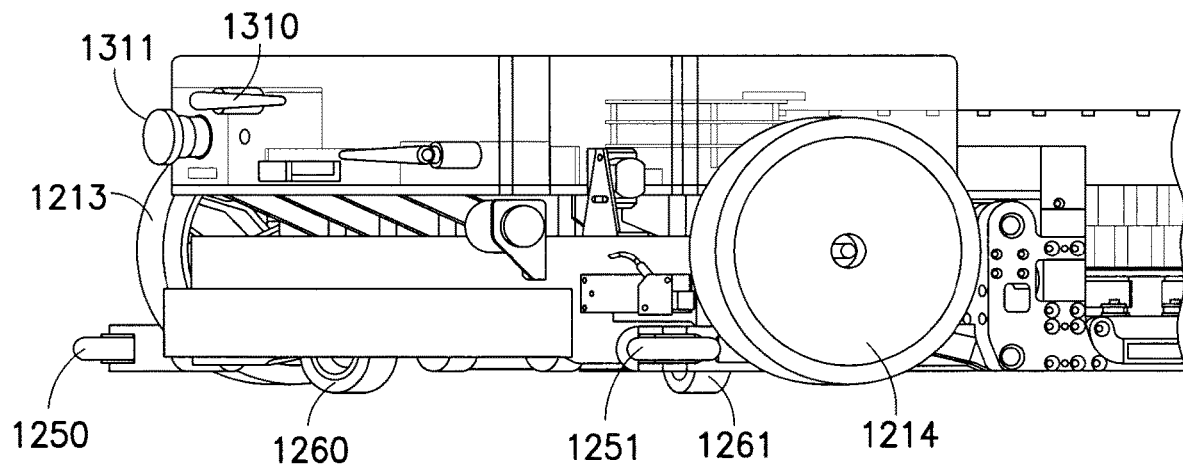
Figure 8B:
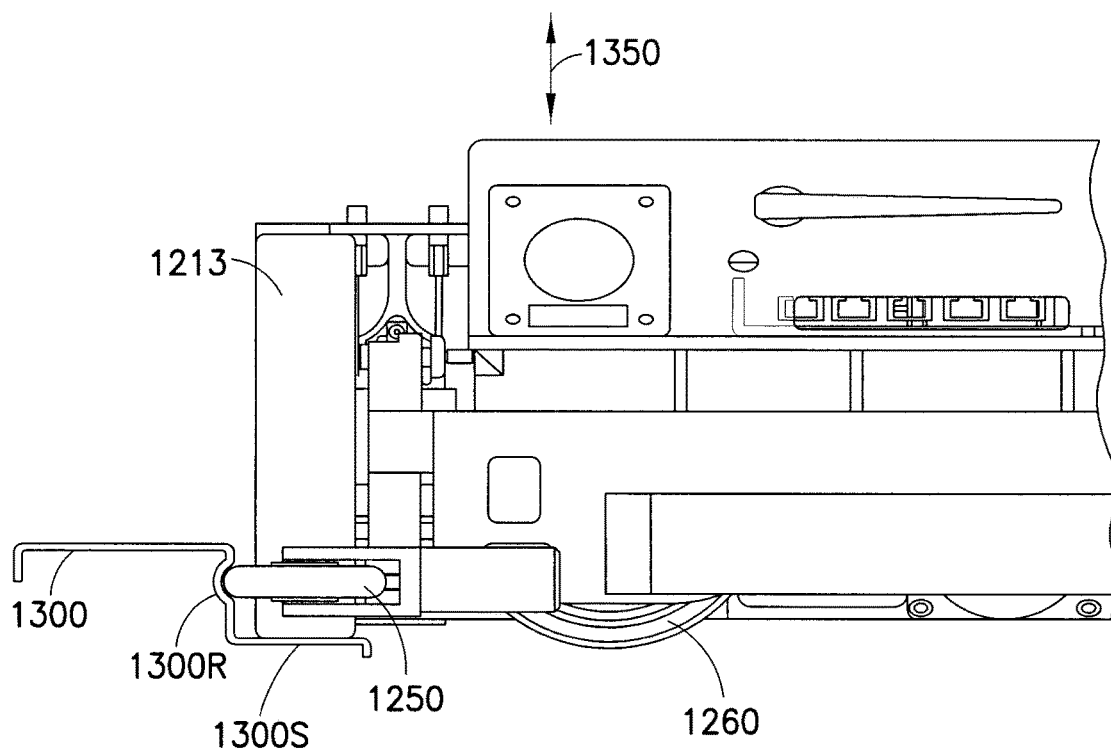
Figure 8C:
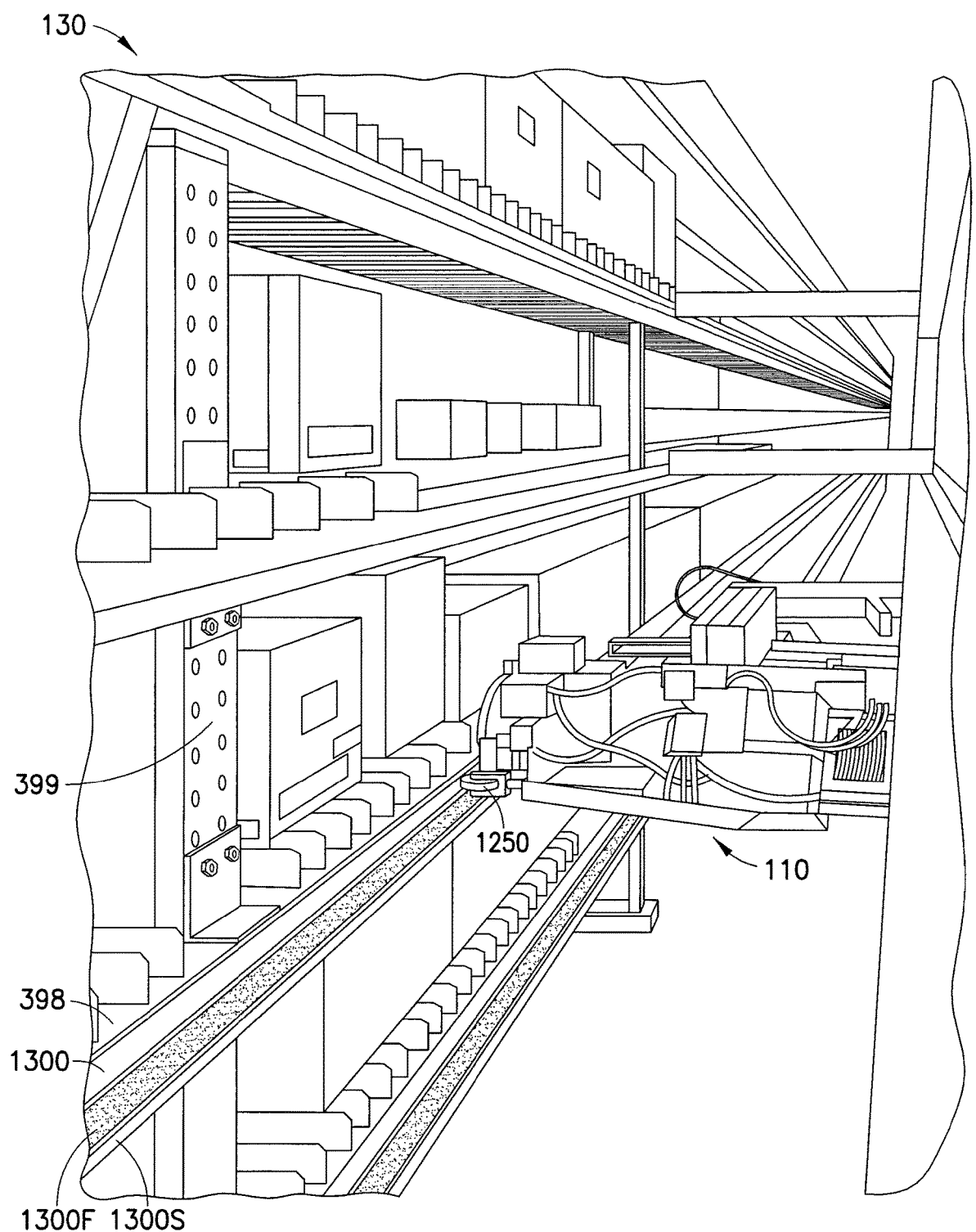

The bot 110 may also be provided with guide wheels 1250-1253. As can be best seen in FIGS. 8B and 8C, while the bot 110 is travelling in, for example, the picking aisles 130A and/or transfer areas 295 the movement of the bot 110 may be guided by a tracked or rail guidance system. The rail guidance system may include rails 1300 disposed on either side of the bot 110. The rails 1300 and guide wheels 1250-1253 may allow for high-speed travel of the bot 110 without complex steering and navigation control subsystems. The rails 1300 may be configured with a recessed portion 1300R shaped to receive the guide wheels 1250-1253 of the bot 110. In alternate embodiments the rails may have any suitable configuration such as, for example, without recessed portion 1300R. The rails 1300 may be integrally formed with or otherwise fixed to, for example, one or more of the horizontal and vertical supports 398, 399 of the storage rack structure 130. As can be seen in FIG. 8C the picking aisles may be substantially floor-less such that bot wheel supports 1300S of the guide rails 1300 extend away from the storage areas a predetermined distance to allow a sufficient surface area for the wheels 1211-1214 (or in the case of lockable casters, wheels 1260', 1261') of the bot 110 to ride along the rails 1300. In alternate embodiments the picking aisles may have any suitable floor that extends between adjacent storage areas on either side of the picking aisle. In one exemplary embodiment, the rails 1300 may include a friction member 1300F for providing traction to the drive wheels 1211, 1212 of the bot 110. The friction member 1300F may be any suitable member such as for example, a coating, an adhesive backed strip or any other suitable member that substantially creates a friction surface for interacting with the wheels of the bot 110.

While four guide wheels 1250-1253 are shown and described it should be understood that in alternate embodiments the bot 110 may have any suitable number of guide wheels. The guide wheels 1250-1253 may be mounted to, for example, the frame 1200 of the bot in any suitable manner. In one exemplary embodiment, the guide wheels 1250-1253 may be mounted to the frame 1200, through for example, spring and damper devices so as to provide relative movement between the guide wheels 1250-1253 and the frame 1200. The relative movement between the guide wheels 1250-1253 and the frame may be a dampening movement configured to, for example, cushion the bot 110 and its payload against any change in direction or irregularities (e.g. misaligned joints between track segments, etc.) in the track 1300. In alternate embodiments, the guide wheels 1250-1253 may be rigidly mounted to the frame 1200. The fitment between the guide wheels 1250-1253 and the recessed portion 1300R of the track 1300 may be configured to provide stability (e.g. anti-tipping) to the bot during, for example, cornering and/or extension of the transfer arm 1235 (e.g. to counteract any tipping moments created by a cantilevered load on the transfer arm). In alternate embodiments the bot may be stabilized in any suitable manner during cornering and/or extension of the transfer arm 1235. For example, the bot 110 may include a suitable counterweight system for counteracting any moment that is created on the bot through the extension of the transfer arm 1235.

The transfer arm 1235 may be movably mounted to the frame 1200 within, for example, the payload area 1230. It is noted that the payload area 1230 and transfer arm 1235 may be suitably sized for transporting cases in the storage and retrieval system 100. For example, the width W of the payload area 1230 and transfer arm 1235 may be substantially the same as or larger than a depth D (FIG. 11B) of the storage shelves 600. In another example, the length L of the payload area 1230 and transfer arm 1235 may be substantially the same as or larger than the largest item length transferred through the system 100 with the item length being oriented along the longitudinal axis 1470 (FIG. 9B) of the bot 110.

Figure 9A:
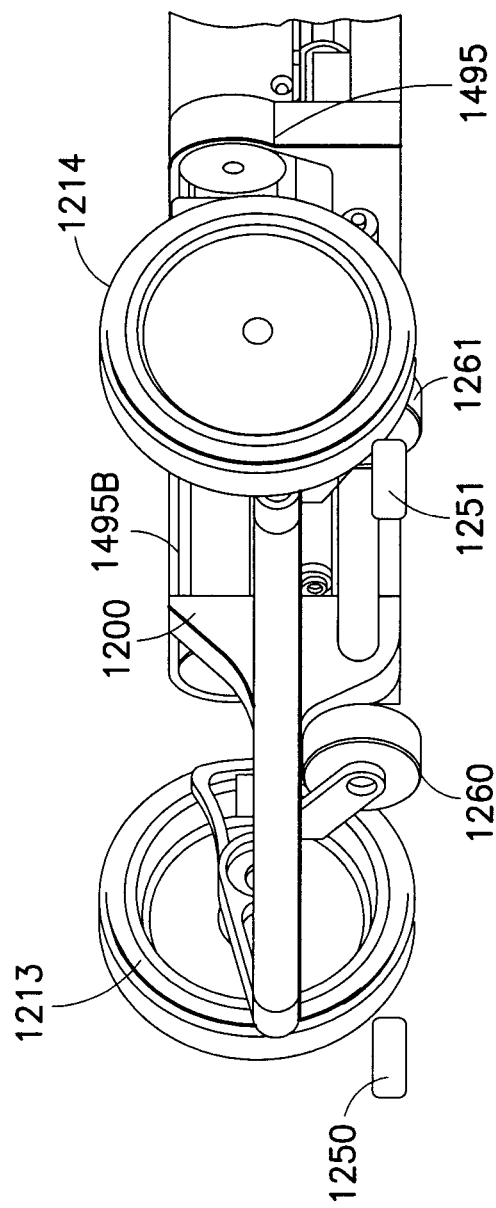
FIGS. 9A and 9B illustrate partial schematic views of the transport robot of FIGS. 7, 8A and 8B in accordance with an exemplary embodiment.
Figure 9B:
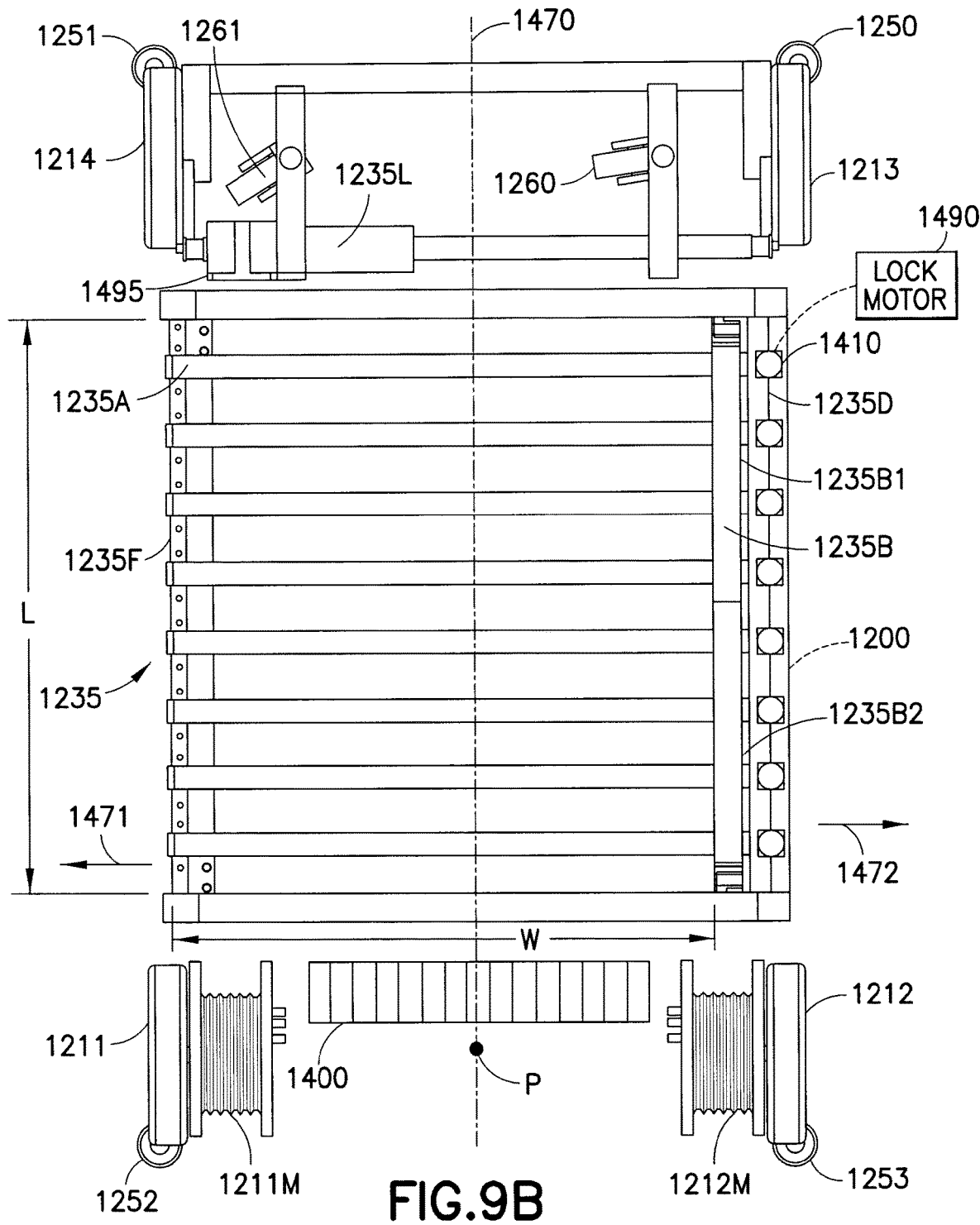
Figure 9C:
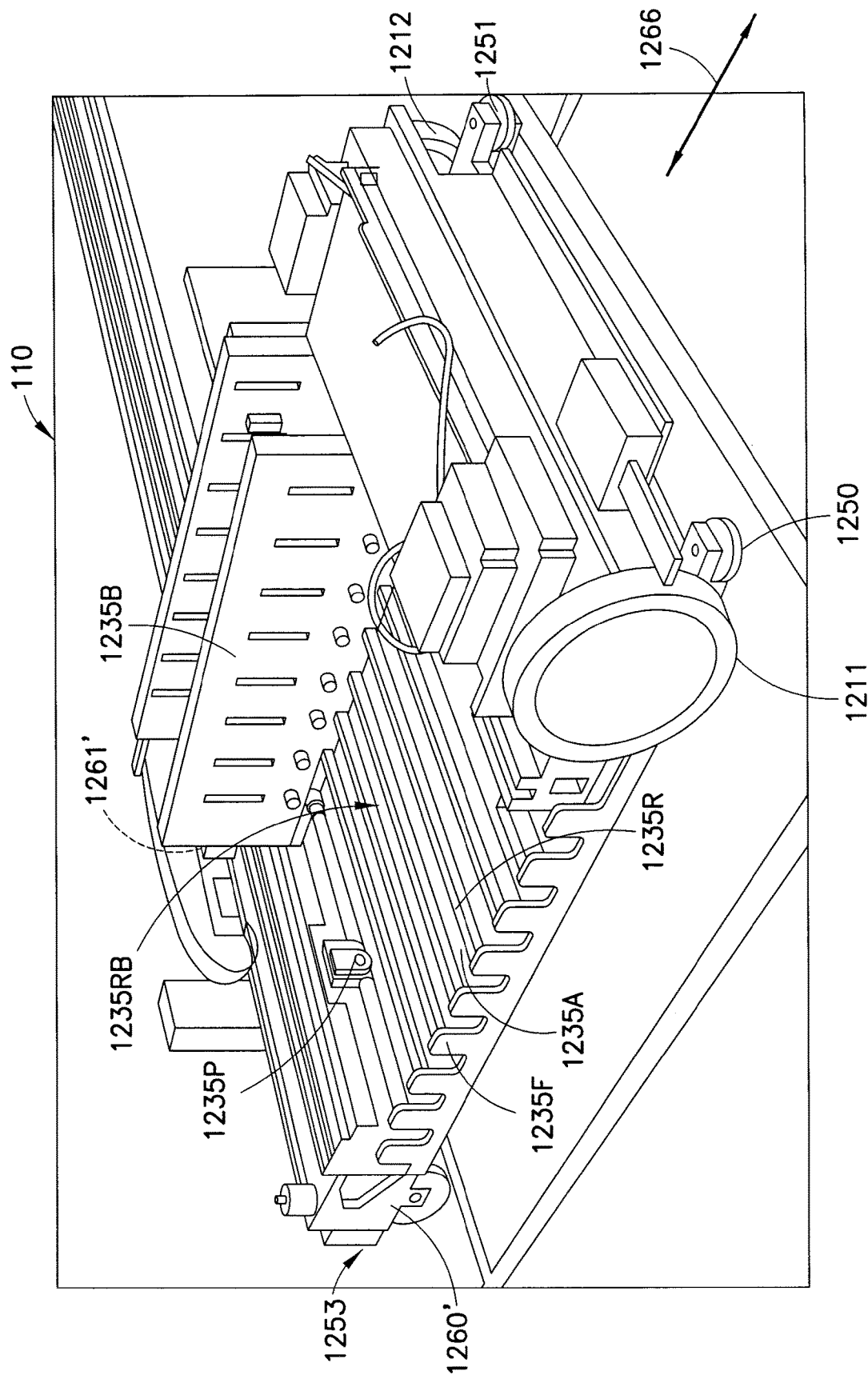
FIG. 9C illustrates a schematic view of a transport robot in accordance with an exemplary embodiment.

Referring also to FIGS. 9A and 9B, in this exemplary embodiment the transfer arm 1235 may include an array of fingers 1235A, one or more pusher bars 1235B and a fence 1235F. In alternate embodiments the transfer arm may have any suitable configuration and/or components. The transfer arm 1235 may be configured to extend and retract from the payload area 1230 for transferring loads to and from the bot 110. In one exemplary embodiment, the transfer arm 1235 may be configured to operate or extend in a unilateral manner relative to the longitudinal axis 1470 of the bot (e.g. extend from one side of the bot in direction 1471) for increasing, for example, reliability of the bot while decreasing the bots complexity and cost. It is noted that where the transfer arm 1235 is operable only to one side of the bot 110, the bot may be configured to orient itself for entering the picking aisles 130A and/or transfer areas 295 with either the drive end 1298 or the driven end 1299 facing the direction of travel so that the operable side of the bot is facing the desired location for depositing or picking a load. In alternate embodiments the bot 110 may be configured such that the transfer arm 1235 is operable or extendable in a bilateral manner relative to the longitudinal axis 1470 of the bot (e.g. extendable from both sides of the bot in directions 1471 and 1472).

In one exemplary embodiment, the fingers 1235A of the transfer arm 1235 may be configured such that the fingers 1235A are extendable and retractable individually or in one or more groups. For example, each finger may include a locking mechanism 1410 that selectively engages each finger 1235A to, for example, the frame 1200 of the bot 110 or a movable member of the transfer arm 1235 such as the pusher bar 1235B. The pusher bar 1235B (and any fingers coupled to the pusher bar), for example, may be driven by any suitable drive such as extension motor 1495. The extension motor 1495 may be connected to, for example, the pusher bar, through any suitable transmission such as, for exemplary purposes only, a belt and pulley system 1495B (FIG. 9A).

In one exemplary embodiment, the locking mechanism for coupling the fingers 1235A to, for example, the pusher bar 1235B may be, for example, a cam shaft driven by motor 1490 that is configured to cause engagement/disengagement of each finger with either the pusher bar or frame. In alternate embodiments, the locking mechanism may include individual devices, such as solenoid latches associated with corresponding ones of the fingers 1235A. It is noted that the pusher bar may include a drive for moving the pusher bar in the direction of arrows 1471, 1472 for effecting, for example, a change in orientation (e.g. alignment) of a load being carried by the bot 110, gripping a load being carried by the bot 110 or for any other suitable purpose. In one exemplary embodiment, when one or more locking mechanisms 1410 are engaged with, for example, the pusher bar 1235B the respective fingers 1235A extend and retract in the direction of arrows 1471, 1472 substantially in unison with movement of the pusher bar 1235B while the fingers 1235A whose locking mechanisms 1410 are engaged with, for example, the frame 1200 remain substantially stationary relative to the frame 1200.

In another exemplary embodiment, the transfer arm 1235 may include a drive bar 1235D or other suitable drive member. The drive bar 1235D may be configured so that it does not directly contact a load carried on the bot 110. The drive bar 1235D may be driven by a suitable drive so that the drive bar 1235D travels in the direction of arrows 1471, 1472 in a manner substantially similar to that described above with respect to the pusher bar 1235B. In this exemplary embodiment, the locking mechanisms 1410 may be configured to latch on to the drive bar 1235D so that the respective fingers 1235A may be extended and retracted independent of the pusher bar and vice versa. In alternate embodiments the pusher bar 1235B may include a locking mechanism substantially similar to locking mechanism 1410 for selectively locking the pusher bar to either the drive bar 1235D or the frame 1200 where the drive bar is configured to cause movement of the pusher bar 1235B when the pusher bar 1235B is engaged with the drive bar 1235D.

In one exemplary embodiment, the pusher bar 1235B may be a one-piece bar that spans across all of the fingers 1235A. In other exemplary embodiments, the pusher bar 1235B may be a segmented bar having any suitable number of segments 1235B1, 1235B2. Each segment 1235B1, 1235B2 may correspond to the groups of one or more fingers 1235A such that only the portion of the pusher bar 1235B corresponding to the finger(s) 1235A that are to be extended/retracted is moved in the direction of arrows 1471, 1472 while the remaining segments of the pusher bar 1235B remain stationary so as to avoid movement of a load located on the stationary fingers 1235A.

The fingers 1235A of the transfer arm 1235 may be spaced apart from each other by a predetermined distance so that the fingers 1235A are configured to pass through or between corresponding support legs 620L1, 620L2 of the storage shelves 600 (FIG. 5A) and corresponding support fingers of the shelves on the multilevel vertical conveyors 150A, 150B. In alternate embodiments, the fingers 1235A may also be configured to pass through item support fingers of the bot transfer stations 140. The spacing between the fingers 1235A and a length of the fingers of the transfer arm 1235 allows an entire length and width of the loads being transferred to and from the bot 110 to be supported by the transfer arm 1235.

The transfer arm 1235 may include any suitable lifting device(s) 1235L configured to move the transfer arm 1235 in a direction substantially perpendicular to a plane of extension/retraction of the transfer arm 1235.

Figure 10A:
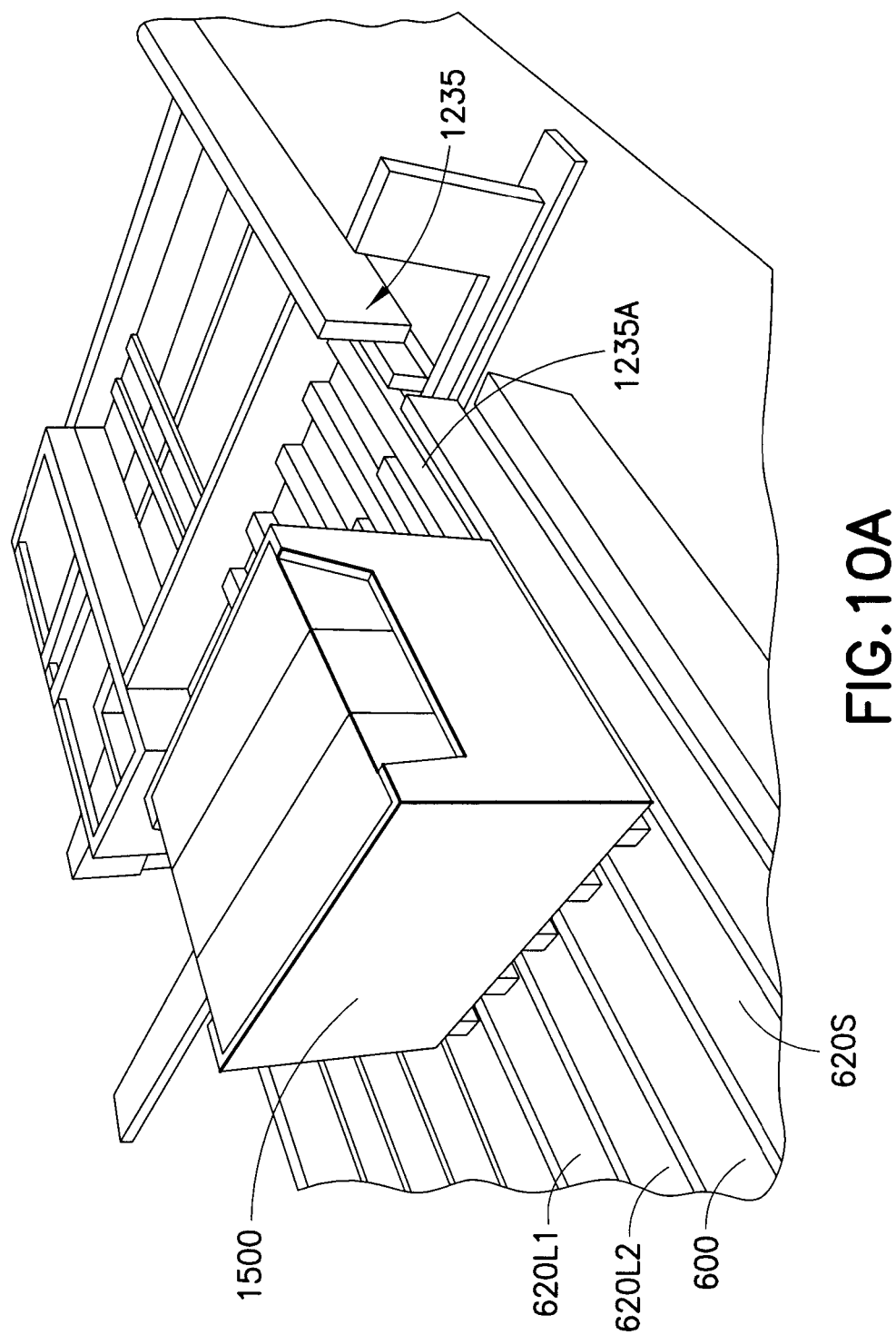
FIGS. 10A-10C and 11A-11D illustrate a portion of a transfer arm of the transport robot of FIGS. 7, 8A and 8B in accordance with an exemplary embodiment.
Figure 10B:
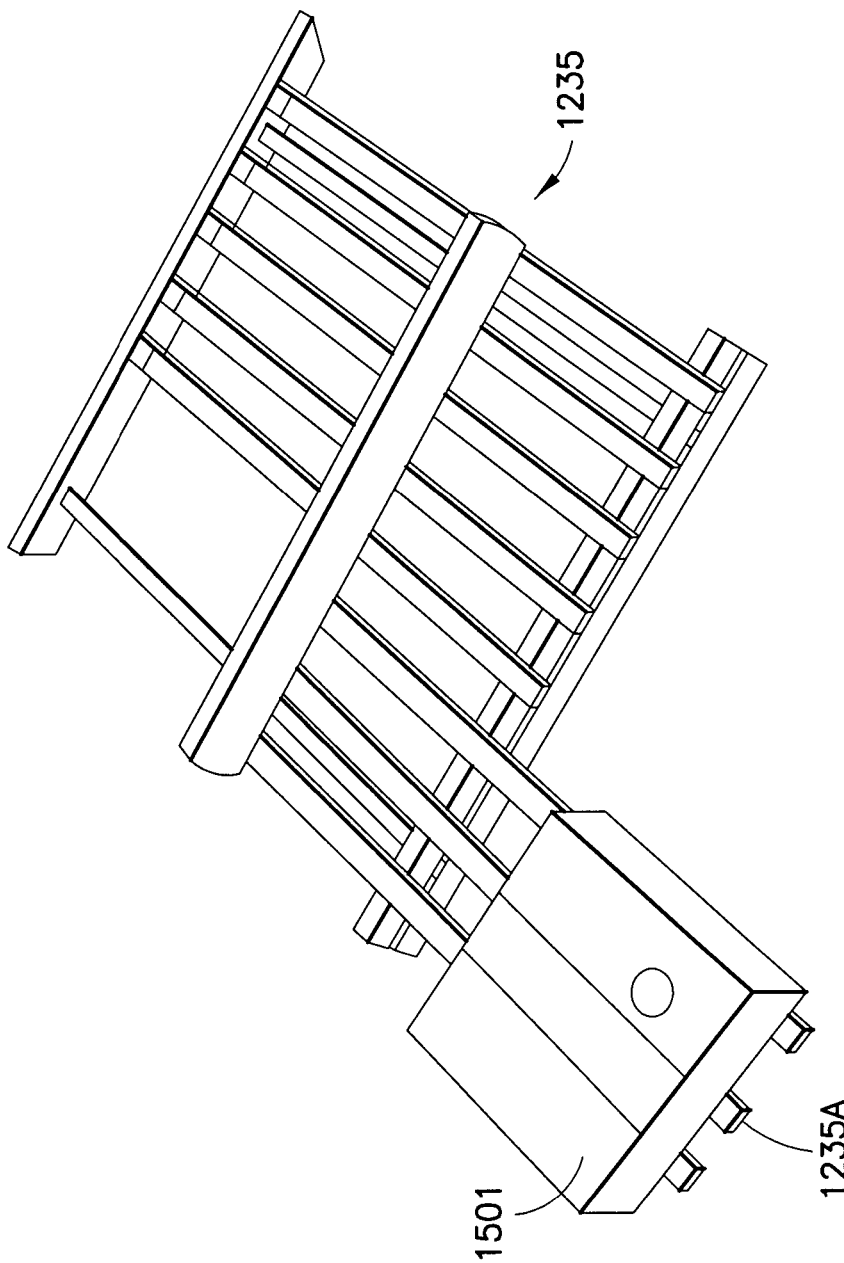
Figure 10C:
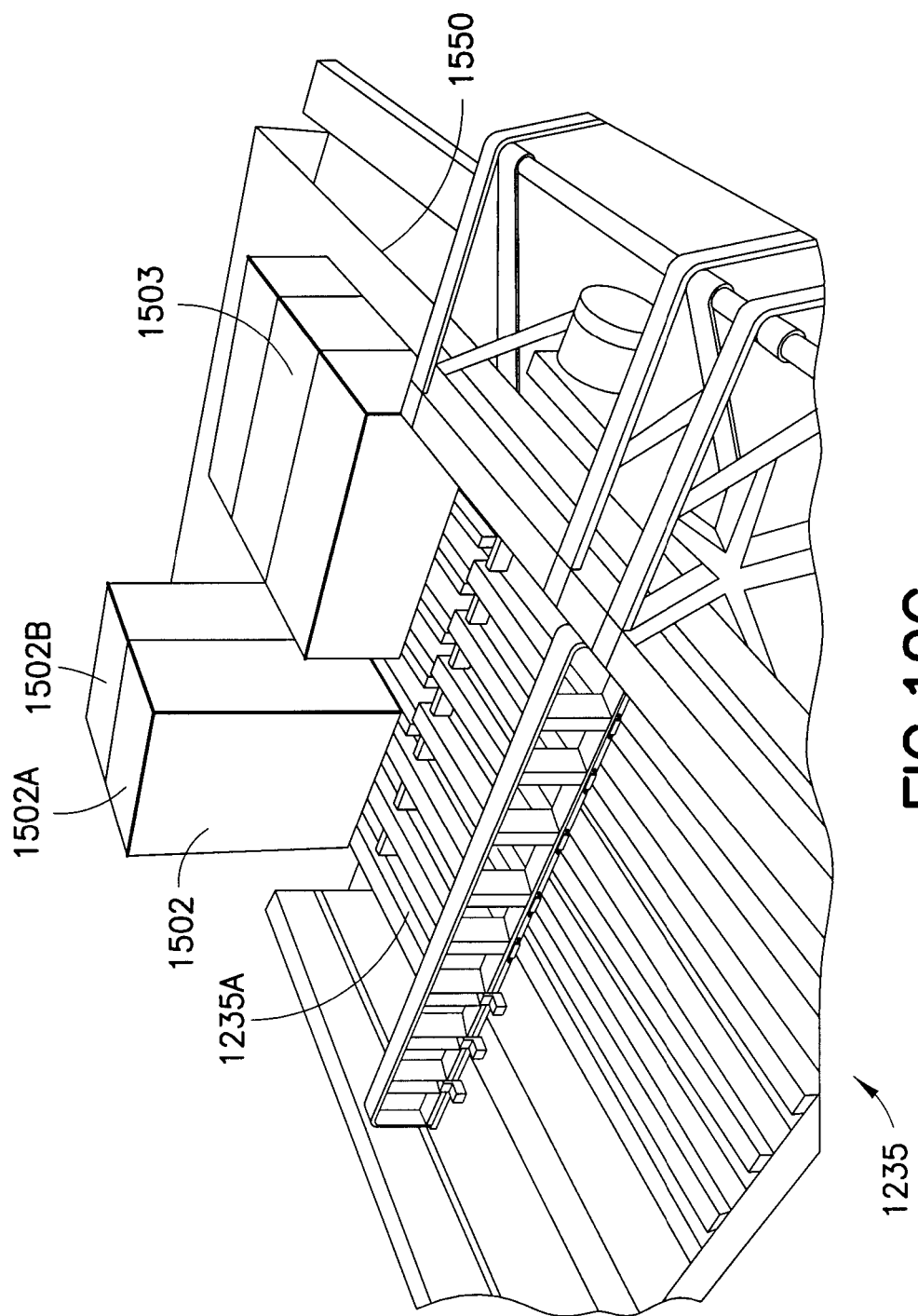

Referring also to FIGS. 10A-10C, in one example, a load (substantially similar to pickfaces 750-753) is acquired from, for example, a storage shelf 600 by extending the fingers 1235A of the transfer arm 1235 into the spaces 620S between support legs 620L1, 620L2 of the storage shelf 600 and under one or more target case units 1500 located on the shelf 600. The transfer arm lift device 1235L is suitably configured to lift the transfer arm 1235 for lifting the one or more target case units 1500 off of the shelf 600. The fingers 1235A are retracted so that the one or more target case units are disposed over the payload area 1230 of the bot 110. The lift device 1235L lowers the transfer arm 1235 so the one or more target case units are lowered into the payload area 1230 of the bot 110. In alternate embodiments, the storage shelves 600 may be configured with a lift motor for raising and lowering the target case units where the transfer arm 1235 of the bot 110 does not include a lift device 1235L. FIG. 10B illustrates an extension of three of the fingers 1235A for transferring a case unit 1501. FIG. 10C shows a shelf 1550 having two case units 1502, 1503 located side by side. In FIG. 10C, three fingers 1235A of the transfer arm 1235 are extended for acquiring only case unit 1502 from the shelf 1550. As can be seen in FIG. 10C, it is noted that the pickfaces carried by the bots 110 may include cases of individual case units (e.g. case unit 1502 includes two separate boxes and case unit 1503 includes three separate boxes). It is also noted that in one exemplary embodiment the extension of the transfer arm 1235 may be controlled for retrieving a predetermined number of case units from an array of case units. For example, the fingers 1235A in FIG. 10C may be extended so that only item 1502A is retrieved while item 1502B remains on the shelf 1550. In another example, the fingers 1235A may be extended only part way into a shelf 600 (e.g. an amount less than the depth D of the shelf 600) so that a first item located at, for example, the front of the shelf (e.g. adjacent the picking aisle) is picked while a second item located at the back of the shelf, behind the first item, remains on the shelf.

Figure 11A:
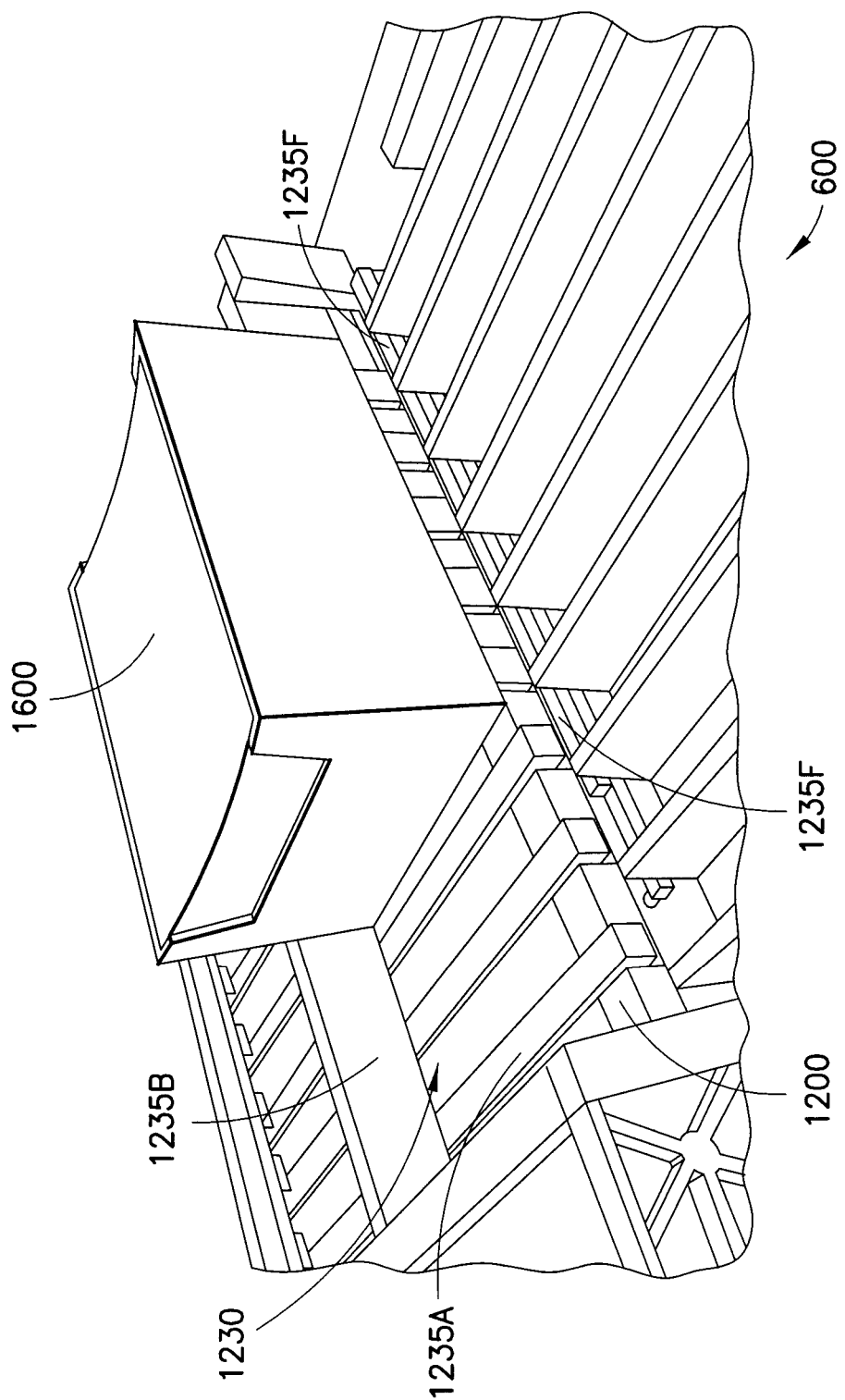
Figure 11B:
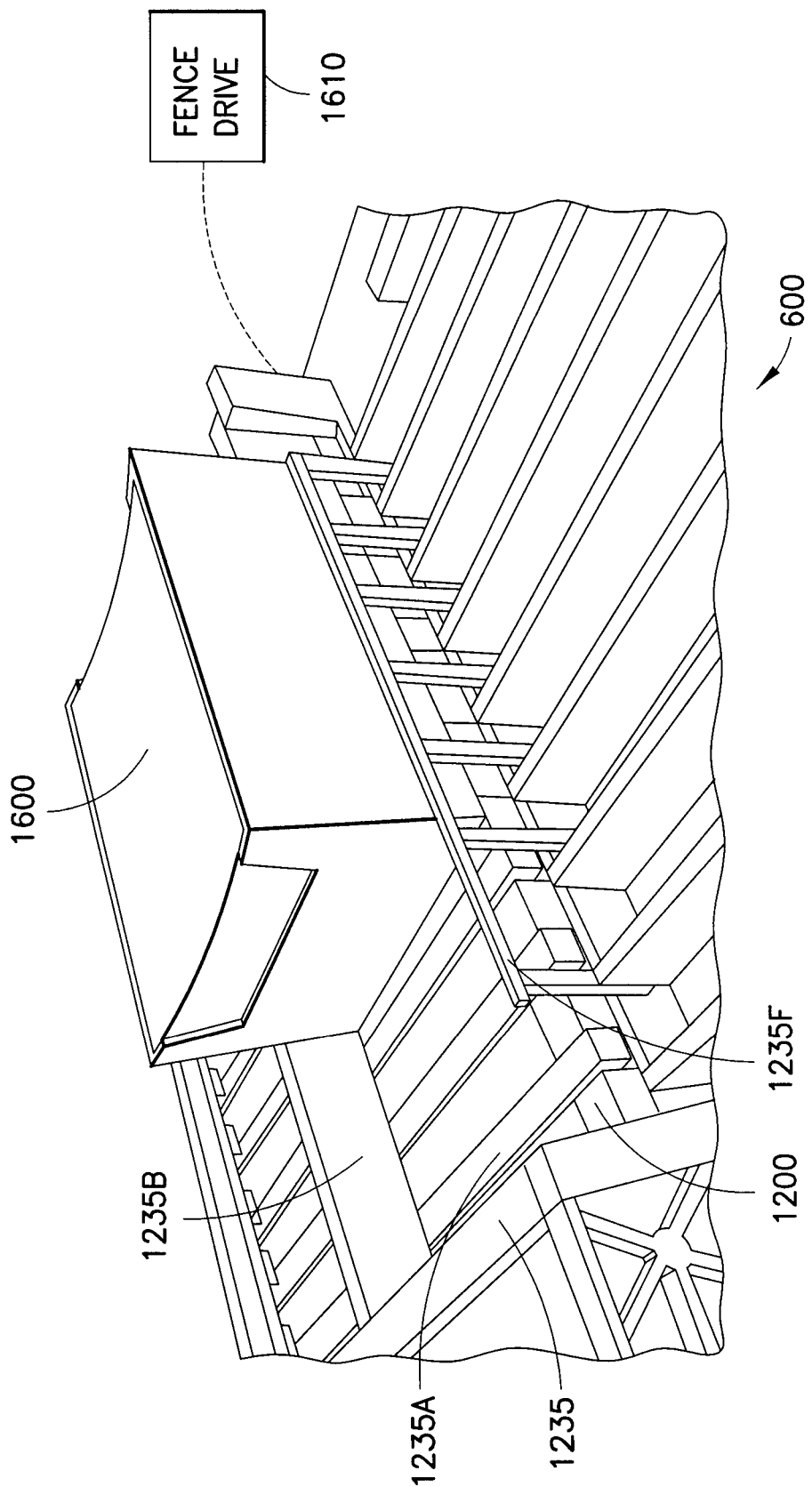
Figure 11C:
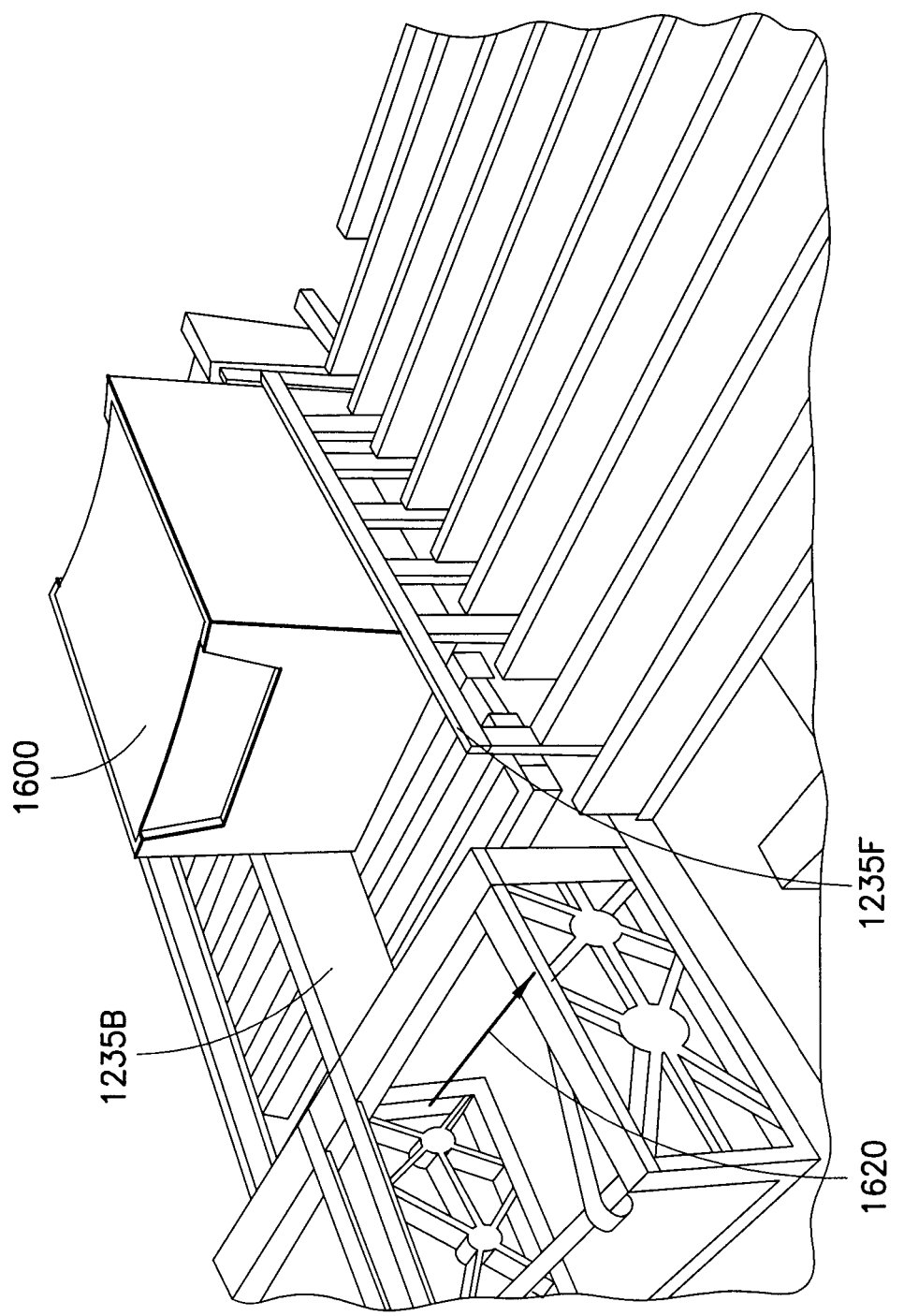
Figure 11D:
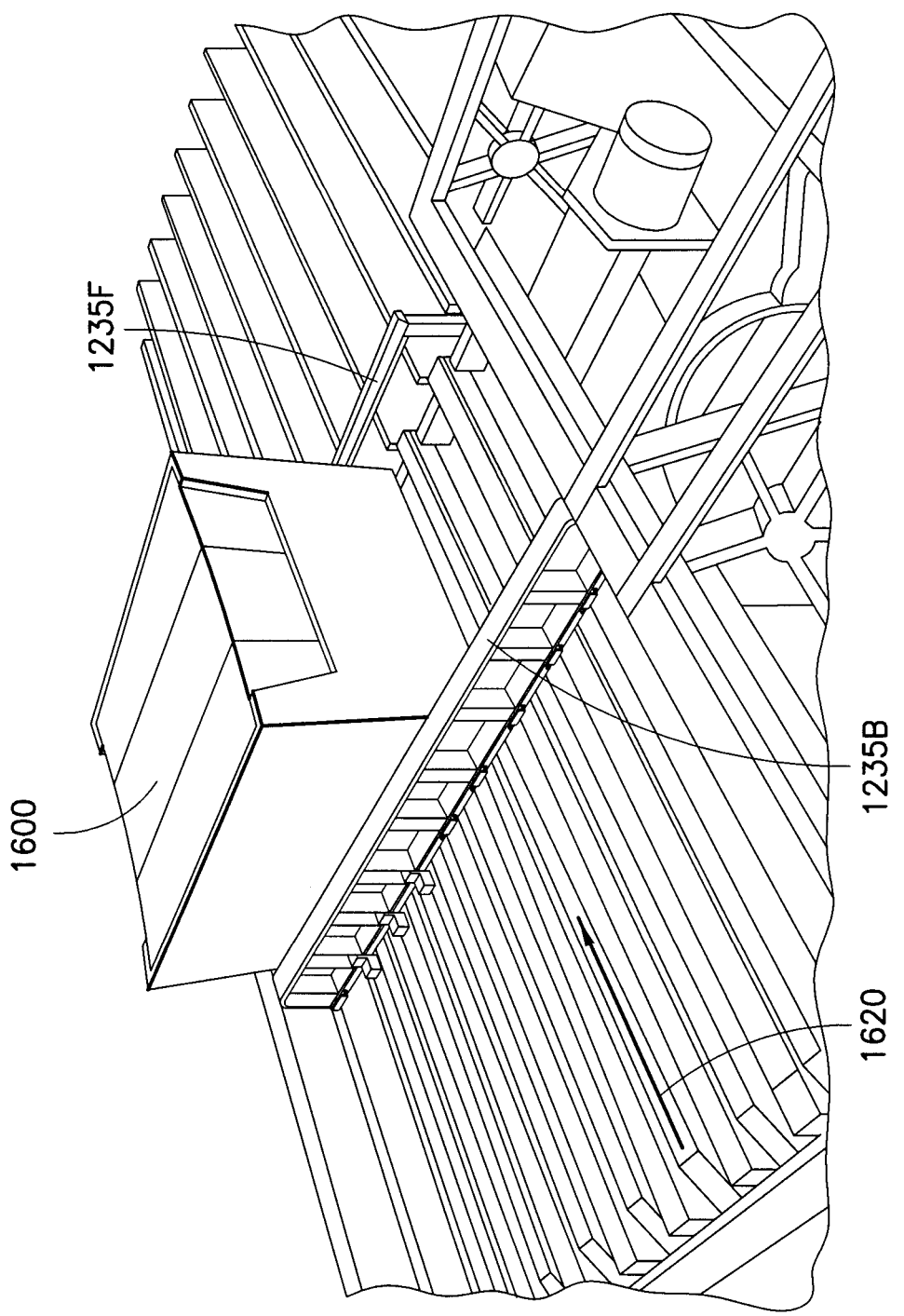

As noted above the bot 110 may include a retractable fence 1235F. Referring to FIGS. 11A-11D, the fence 1235F may be movably mounted to the frame 1200 of the bot 110 in any suitable manner so that the loads, such as case unit 1600, pass over the retracted fence 1235F as the loads are transferred to and from the bot payload area 1230 as can be seen in FIG. 11A. Once the case unit 1600 is located in the payload area 1230, the fence 1235F may be raised or extended by any suitable drive motor 1610 so that the fence 1235F extends above the fingers 1235A of the bot 110 for substantially preventing the case unit 1600 from moving out of the payload area 1230 as can be seen in FIG. 11B. The bot 110 may be configured to grip the case unit 1600 to, for example, secure the load during transport. For example, the pusher bar 1235B may move in the direction of arrow 1620 towards the fence 1235F such that the case unit 1600 is sandwiched or gripped between the pusher bar 1235B and the fence 1235F as can be seen in FIGS. 11C and 11D. As may be realized, the bot 110 may include suitable sensors for detecting a pressure exerted on the case unit 1600 by the pusher bar 1235B and/or fence 1235F so as to prevent damaging the case unit 1600. In alternate embodiments, the case unit 1600 may be gripped by the bot 110 in any suitable manner.

Referring again to FIGS. 9B and 9C, the bot 110 may include a roller bed 1235RB disposed in the payload area 1230. The roller bed 1235RB may include one or more rollers 1235R disposed transversely to the longitudinal axis 1470 of the bot 110. The rollers 1235R may be disposed within the payload area 1230 such that the rollers 1235R and the fingers 1235A are alternately located so that the fingers 1235A may pass between the rollers 1235R for transferring case units to and from the payload area 1230 as described above. One or more pushers 1235P may be disposed in the payload area 1230 such that a contact member of the one or more pushers 1235P extends and retracts in a direction substantially perpendicular to the axis of rotation of the rollers 1235R. The one or more pushers 1235P may be configured to push the case unit 1600 back and forth within the payload area 1230 in the direction of arrow 1266 (e.g. substantially parallel to the longitudinal axis 1470 of the bot 110) along the rollers 1235R for adjusting a position of the case unit 1600 longitudinally within the payload area 1230. In alternate embodiments, the rollers 1235R may be driven rollers such that a controller of, for example, the bot drives the rollers for moving the case unit 1600 such that the load is positioned at a predetermined location within the payload area 1230. In still other alternate embodiments the load may be moved to the predetermined location within the payload area in any suitable manner. The longitudinal adjustment of the case unit 1600 within the payload area 1230 may allow for positioning of the loads 1600 for transferring the loads from the payload area to, for example, a storage location or other suitable location such as the multilevel vertical conveyors 150A, 150B or in alternate embodiments the bot transfer stations 140.

Figure 12:
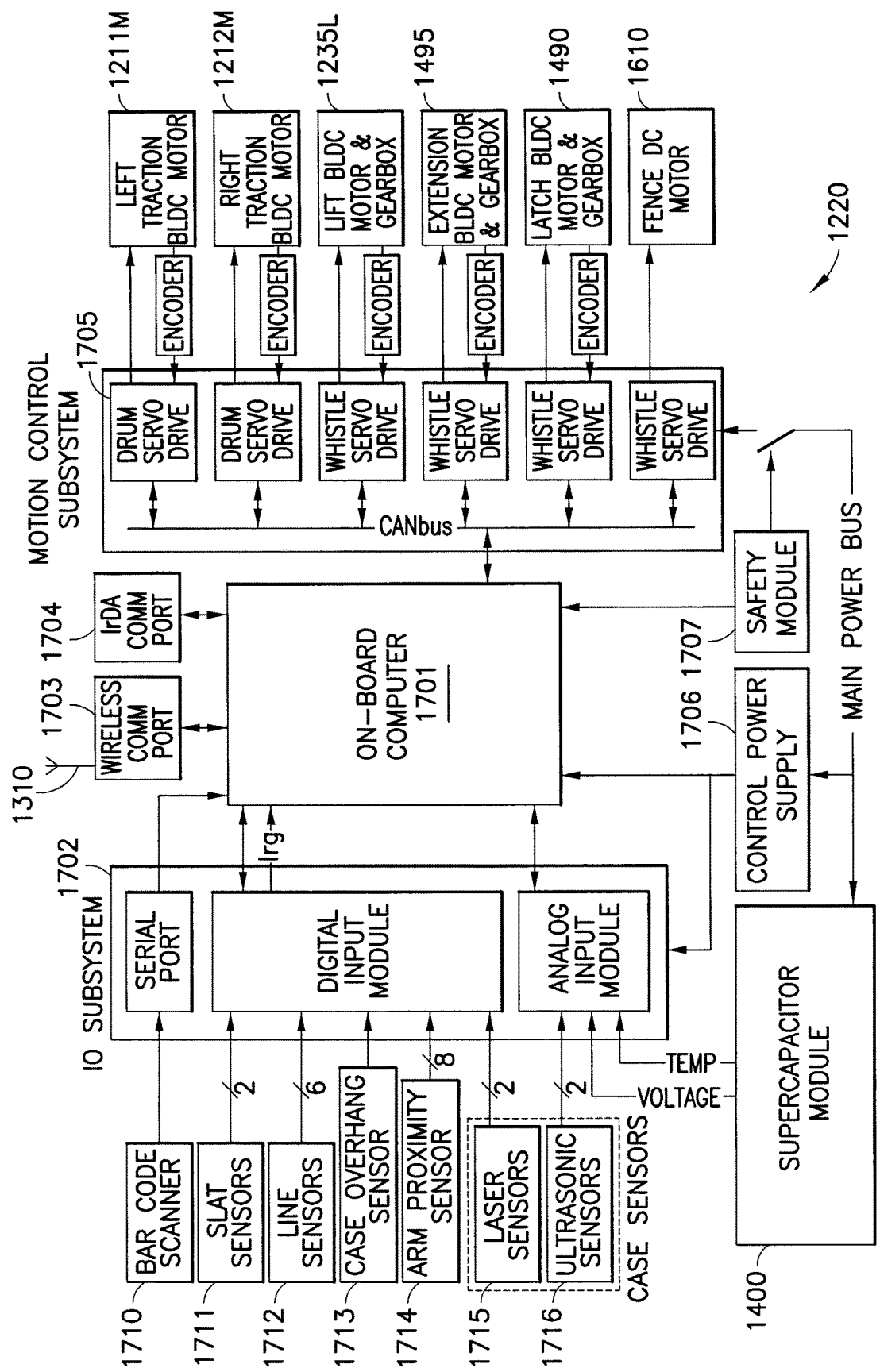
FIG. 12 schematically illustrates a control system of the transport robot of FIGS. 2, 3A and 3B in accordance with an exemplary embodiment.

Referring now to FIG. 12, the control system 1220 of the bot is shown. The control system 1220 may be configured to provide communications, supervisory control, bot localization, bot navigation and motion control, case sensing, case transfer and bot power management. In alternate embodiments the control system 1220 may be configured to provide any suitable services to the bot 110. The control system 1220 may include any suitable programs or firmware configured for performing the bot operations described herein. The control system 1220 may be configured to allow for remote (e.g. over a network) debugging of the bot. In one example, the firmware of the bot may support a firmware version number that can be communicated over, for example, the network 180 so the firmware may be suitably updated. The control system 1220 may allow for assigning a unique bot identification number to a respective bot 110 where the identification number is communicated over the network 180 (FIG. 1) to, for example, track a status, position or any other suitable information pertaining to the bot 110. In one example, the bot identification number may be stored in a location of the control system 1220 such that the bot identification number is persistent across a power failure but is also changeable.

In one exemplary embodiment, the control system 1220 may be divided into a front end 1220F (FIG. 7) and back end 1220B (FIG. 7) having any suitable subsystems 1702, 1705. The control system 1220 may include an on-board computer 1701 having, for example, a processor, volatile and non-volatile memory, communication ports and hardware interface ports for communicating with the on-board control subsystems 1702, 1705. The subsystems may include a motion control subsystem 1705 and an input/output subsystem 1702. In alternate embodiments, the bot control system 1220 may include any suitable number of portions/subsystems.

The front end 1220F may be configured for any suitable communications (e.g., synchronous or asynchronous communications regarding bot commands, status reports, etc.) with the control server 120. The bot front end 1220F may be configured as a pair of state machines where a first one of the state machines handles communication between the front end 1220F and the control server 120 and a second one of the state machines handles communication between the front end 1220F and the back end 1220B. In alternate embodiments the front end 1220F may have any suitable configuration. The back end 1220B may be configured to effect the functions of the bot described above (e.g. lowering the casters, extending the fingers, driving the motors, etc.) based on, for example, the primitives received from the front end 1220F. In one example, the back end 122B may monitor and update bot parameters including, but not limited to, bot position and velocity and send those parameters to the, bot front end 1220F. The front end 122 OF may use the parameters (and/or any other suitable information) to track the bots 110 movements and determine the progress of the bot task(s). The front end 1220F may send updates to, for example, the bot proxy 2680 so that the control server 120 can track the bot movements and task progress and/or any other suitable bot activities.

The motion control subsystem 1705 may be part of the back end 1220B and configured to effect operation of, for example, the drive motors 1211M, 1212M, 1235L, 1495, 1490, 1610 of the bot 110 as described herein. The motion control subsystem 1705 may operatively connected to the computer 1701 for receiving control instructions for the operation of, for example, servo drives (or any other suitable motor controller) resident in the motion control subsystem 1705 and subsequently their respective drive motors 1211M, 1212M, 1235L, 1495, 1490, 1610. The motion control subsystem 1704 may also include suitable feedback devices, such as for example, encoders, for gathering information pertaining to the drive motor operation for monitoring, for example, movement the transfer arm 1235 and its components (e.g. when the fingers 1235A are latched to the pusher bar, a location of the pusher bar, extension of the fence, etc.) or the bot 110 itself. For example, an encoder for the drive motors 1211M, 1212M may provide wheel odometry information, and encoders for lift motor 1235L and extension motor 1495 may provide information pertaining to a height of the transfer arm 1235 and a distance of extension of the fingers 1235A. The motion control subsystem 1705 may be configured to communicate the drive motor information to the computer 1701 for any suitable purpose including but not limited to adjusting a power level provided to a motor.

The input/output subsystem 1702 may also be part of the back end 1220B and configured to provide an interface between the computer 1701 and one or more sensors 1710-1716 of the bot 110. The sensors may be configured to provide the bot with, for example, awareness of its environment and external objects, as well as the monitor and control of internal subsystems. For example, the sensors may provide guidance information, payload information or any other suitable information for use in operation of the bot 110. For exemplary purposes only, the sensors may include a bar code scanner 1710, slat sensors 1711, line sensors 1712, case overhang sensors 1713, arm proximity sensors 1714, laser sensors 1715 and ultrasonic sensors 1716 as described in U.S. patent application Ser. No. 12/757,312, entitled "AUTONOMOUS TRANSPORTS FOR STORAGE AND RETRIEVAL SYSTEMS," (now U.S. Pat. No. 8,425,173), previously incorporated herein by reference.

It is noted that the computer 1701 and its subsystems 1702, 1705 may be connected to a power bus for obtaining power from, for example, the capacitor 1400 through any suitable power supply controller 1706. It is noted that the computer 1701 may be configured to monitor the voltage of the capacitor 1400 to determine its state of charge (e.g. its energy content). In one exemplary embodiment, the capacitor may be charged through charging stations located at, for example, one or more transfer stations 140 or at any other suitable location of the storage structure 130 so that the bot is recharged when transferring payloads and remains in substantially continuous use. The charging stations may be configured to charge the capacitor 1400 within the time it takes to transfer the payload of the bot 110. For exemplary purposes only, charging of the capacitor 1400 may take about 15 seconds. In alternate embodiments, charging the capacitor may take more or less than about 15 seconds. During charging of the capacitor 1400 the voltage measurement may be used by the computer 1701 to determine when the capacitor is full and to terminate the charging process. The computer 1701 may be configured to monitor a temperature of the capacitor 1400 for detecting fault conditions of the capacitor 1400.

The computer 1701 may also be connected to a safety module 1707 which includes, for example, an emergency stop device 1311 (FIG. 8A) which when activated effects a disconnection of power to, for example, the motion control subsystem 1705 (or any other suitable subsystem(s) of the bot) for immobilizing or otherwise disabling the bot 110. It is noted that the computer 1701 may remain powered during and after activation of the emergency stop device 1311. The safety module 1707 may also be configured to monitor the servo drives of the motion control subsystem 1705 such that when a loss of communication between the computer and one or more of the servo drives is detected, the safety module 1707 causes the bot to be immobilized in any suitable manner. For example, upon detection of a loss of communication between the computer 1701 and one or more servo drives the safety module 1707 may set the velocity of the drive motors 1211M, 1212M to zero for stopping movement of the bot 110.

The communication ports of the control system 1220 may be configured for any suitable communications devices such as, for example, a wireless radio frequency communication device 1703 (including one or more antennae 1310) and any suitable optical communication device 1704 such as, for example, an infrared communication device. The wireless radio frequency communication device 1703 may be configured to allow communication between the bot 110 and, for example, the control server 120 and/or other different bots 110 over any suitable wireless protocol. For exemplary purposes only, the wireless protocol for communicating with the control server 120 may be the wireless 802.11 network protocol (or any other suitable wireless protocol). Communications within the bot control system 1220 may be through any suitable communication bus such as, for example, a control network area bus. It is noted that the control server 120 and the bot control system 1220 may be configured to anticipate momentary network communication disruptions. For example, the bot may be configured to maintain operation as long as, for example, the bot 110 can communicate with the control server 120 when the bot 110 transits a predetermined track segment and/or other suitable way point. The optical communication device 1704 may be configured to communicate with, for example, the bot transfer stations for allowing initiation and termination of charging the capacitor 1400. The bot 110 may be configured to communicate with other bots 110 in the storage and retrieval system 100 to form a peer-to-peer collision avoidance system so that bots can travel throughout the storage and retrieval system 100 at predetermined distances from each other in a manner substantially similar to that described in U.S. patent application Ser. No. 12/757,337, entitled "CONTROL SYSTEM FOR STORAGE AND RETRIEVAL SYSTEMS," (now U.S. Pat. No. 8,594,835), previously incorporated by reference herein.

Referring again to FIG. 1, and as described above, the storage structure 130 may include multiple levels of storage rack modules where each level includes an array of storage spaces (arrayed on the multiple levels and in multiple rows on each level), picking aisles 130A formed between the rows of storage spaces, and transfer decks 130B. The picking aisles 130A and transfer decks 130B being arranged for allowing the bots 110 to traverse respective levels of the storage structure 130 for placing case units into the picking stock and to retrieve the ordered case units. The bots 110 may be configured to place case units, such as the above-described retail merchandise, into picking stock in the one or more levels of the storage structure 130 and then selectively retrieve ordered case units for shipping the ordered case units to, for example, a store or other suitable location. As may be realized, the storage and retrieval system may be configured to allow random accessibility to the storage spaces as will be described in greater detail below. For example, all storage spaces in the storage structure 130 may be treated substantially equally when determining which storage spaces are to be used when picking and placing case units from/to the storage structure 130 such that any storage space of sufficient size can be used to store case units. The storage structure 130 of the exemplary embodiments may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning).

The storage structure 130 may also include charging stations 130C for replenishing, for example, a battery pack of the bots 110. In one exemplary embodiment, the charging stations 130C may be located at, for example, the transfer areas 295 so that the bots 110 can substantially simultaneously transfer case units, for example, to and from a multilevel vertical conveyor 150A, 150B while being charged.

Figure 21:
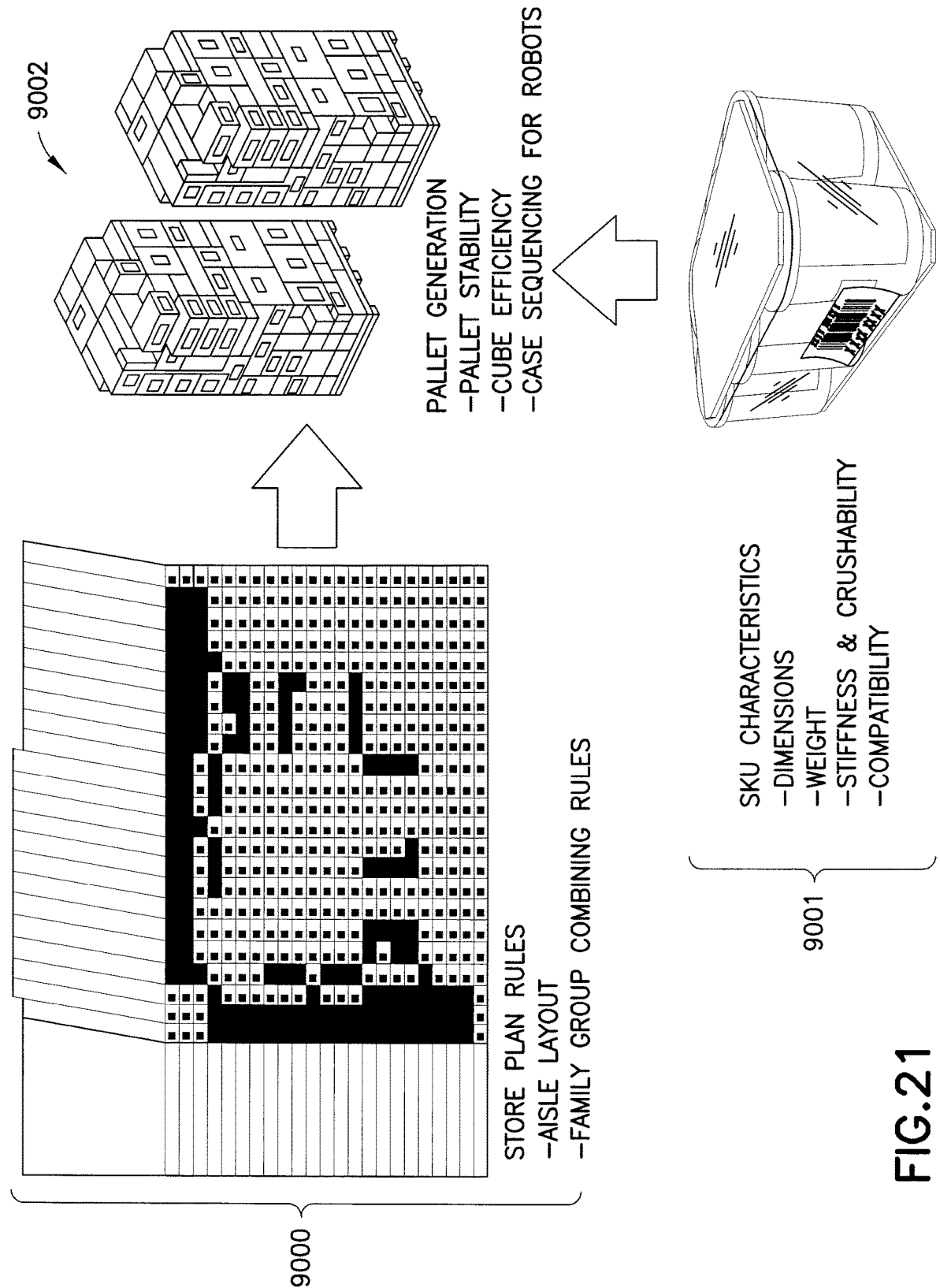
FIG. 21 is a schematic illustration of a method in accordance with an exemplary embodiment.

The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in one exemplary embodiment, the system control server 120 may be configured to manage and coordinate the overall operation of the storage and retrieval system 100 and interface with, for example, a warehouse management system, which in turn manages the warehouse facility as a whole. The control server 120 may be substantially similar to that described in, for example, U.S. patent application Ser. No. 12/757,337, entitled "CONTROL SYSTEM FOR STORAGE AND RETRIEVAL SYSTEMS," (now U.S. Pat. No. 8,594,835), previously incorporated by reference herein in its entirety. For example, the control server 120 may include a collection of substantially concurrently running programs that are configured to manage the storage and retrieval system 100 including, for exemplary purposes only, controlling, scheduling, and monitoring the activities of all active system components, managing inventory and pickfaces, and interfacing with a warehouse management system 2500. It is noted that a "pickface" as used herein may be one or more merchandise case units placed one behind the other in a storage space or area of a storage shelf to be used in pick transactions for filling customer orders. In one example, all case units forming a given pickface are of the same stock keeping unit (SKU) and originally from the same pallet. In alternate embodiments, each pickface may include any suitable case units. Each pickface may correspond to all or part of a bot load (e.g. the load carried by each bot 110 to and from the storage areas). Conversely, the bot load may be established based on a pickface determination. As may be realized the determination of the pickfaces may be variable within the storage and retrieval system such that the size and locations of the pickface are dynamically changeable. It is also noted that interfacing with the warehouse management system allows the control server 120 to receive and execute pallet orders and to submit and execute replenishment orders as will be described below. The active system components may be the physical entities that act upon the case units to be stored and retrieved. The active system components may include, as a non-limiting example, the bots, in-feed and out-feed stations, multilevel vertical conveyors, the network and user interface terminals. In alternate embodiments, the active system components may also include transfer stations. The control server 120 may be configured to order the removal of case units from the storage and retrieval system for any suitable purpose, in addition to order fulfillment, such as, for example, when case units are damaged, recalled or an expiration date of the case units has expired. In one exemplary embodiment, the control server 120 may be configured to give preference to case units that are closer to their expiration date when fulfilling orders so those case units are removed from the storage and retrieval system before similar case units (e.g. with the same SKU) having later expiration dates. In the exemplary embodiments, the distribution (e.g. sortation) of case units in the storage and retrieval system is such that the case units in the can be provided for delivery to a palletizing station in any suitable order at any desired rate using only two sortation sequences. The control server 120 may also be configured to incorporate, for example, store plan rules when fulfilling orders so that the cases are provided by the bots 110 to respective multilevel vertical conveyors 150B in a first predetermined sequence (e.g. a first sortation of case units) and then removed from the respective multilevel vertical conveyors 150B in a second predetermined sequence (e.g. a second sortation of case units) so that the case units may be placed on pallets or other suitable shipping containers/devices) in a predetermined order. For example, in the first sortation of case units the bots 110 may pick respective case units (e.g. case unit) in any order. The bots 110 may traverse the picking aisles and transfer deck (e.g. circulate around the transfer deck) with the picked item until a predetermined time when the item is to be delivered to a predetermined multilevel vertical conveyor 150B. In the second sortation of case units, once the case units are on the multilevel vertical conveyor 150B the case units may circulate around the conveyor until a predetermined time when the item are to be delivered to the out-feed transfer station 160. Referring to FIG. 21, it is noted that the order of case units delivered to the pallets may correspond to, for example, store plan rules 9000. The store plan rules 9000 may incorporate, for example, an aisle layout in the customer's store or a family group of case units corresponding to, for example, a particular location in the store where the pallet will be unloaded or a type of goods. The order of case units delivered to the pallets may also correspond characteristics 9001 of the case units such as, for example, compatibility with other case units, dimensions, weight and a durability of the case units. For example, crushable case units may be delivered to the pallet after heavier more durable case units are delivered to the pallet. The first and second sortations of the case units allow for the building of mixed pallets 9002 as described below.

The control server 120 in combination with the structural/mechanical architecture of the storage and retrieval system enables maximum load balancing. As described herein, the storage spaces/storage locations are decoupled from the transport of the case units through the storage and retrieval system. For example, the storage volume (e.g. the distribution of case units in storage) is independent of and does not affect throughput of the case units through the storage and retrieval system. The storage array space may be substantially uniformly distributed with respect to output. The horizontal sortation (at each level) and high speed bots 110 and the vertical sortation by the multilevel vertical conveyors 150B substantially creates a storage array space that is substantially uniformly distributed relative to an output location from the storage array (e.g. an out-feed transfer station 160 of a multilevel vertical conveyor 150B). The substantially uniformly distributed storage space array also allows case units to be output at a desired substantially constant rate from each out-feed transfer station 160 such that the case units are provided in any desired order. To effect the maximum load balancing, the control architecture of the control server 120 may be such that the control server 120 does not relate the storage spaces within the storage structure 130 (e.g. the storage array) to the multilevel vertical conveyors 150B based on a geographical location of the storage spaces (which would result in a virtual partitioning of the storage spaces) relative to the multilevel vertical conveyors 150B (e.g. the closest storage spaces to the multilevel vertical conveyor are not allocated to cases moving from/to that multilevel vertical conveyor). Rather, the control server 120 may map the storage spaces uniformly to each multilevel vertical conveyor 150B and then select bots 110, storage locations and output multilevel vertical conveyor 150B shelf placement so that case units from any location in the storage structure come out from any desired multilevel vertical conveyor output (e.g. at the out-feed transfer stations) at a predetermined substantially constant rate in a desired order.

Figure 22:
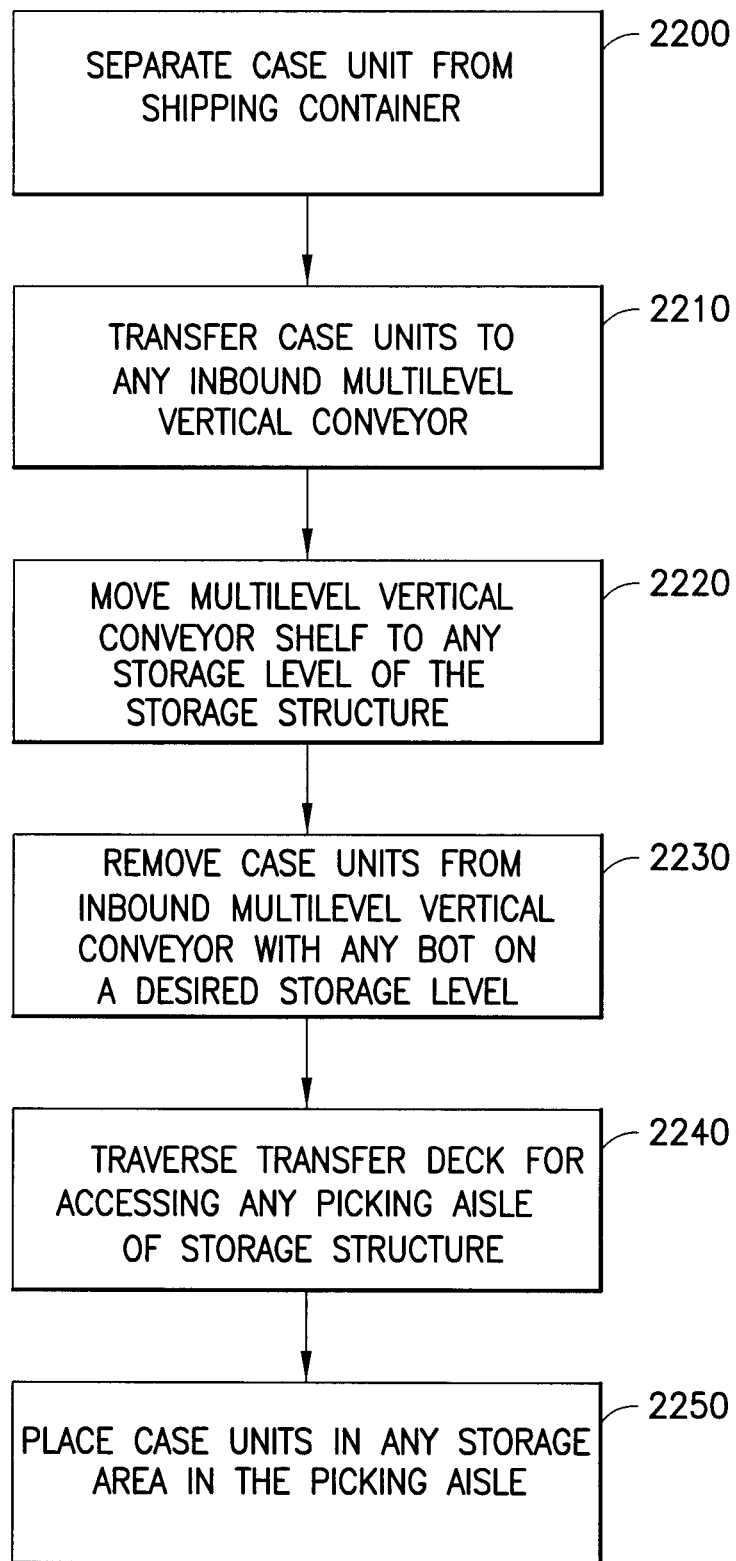
FIGS. 22 and 23 are flow diagrams of exemplary methods in accordance with the exemplary embodiments.

Referring also to FIG. 22, as an exemplary operation of an order fulfillment process of the storage and retrieval system 100, case units for replenishing the picking stock are input at, for example, depalletizing workstations 210 (FIG. 13) so that case units bundled together on pallets (or other suitable container-like transport supports) are separated and individually carried on, for example, conveyors 240 (FIG. 13) or other suitable transfer mechanisms (e.g. manned or automated carts, etc.) to the in-feed transfer stations 170 (FIG. 22, Block 2200). The in-feed transfer stations 170 load the individual case units onto respective multilevel vertical conveyors 150A, which carry the case units to a predetermined level of the storage structure 130 (FIG. 22, Block 2210). Bots 110 located on the predetermined level of the storage structure 130 interface with the multilevel vertical conveyor 150A for removing the individual case units from the multilevel vertical conveyor 150A and transporting the case units to predetermined storage areas within the storage structure 130. In alternate embodiments, the bots 110 assigned to the predetermined level interface with the bot transfer stations 140 for transferring the case units from the bot transfer stations 140 to a predetermined storage module of the storage structure 130. It is noted that each multilevel vertical conveyor 150A is capable of providing case units to any storage area within the storage structure 130. For example, a shelf 730 (FIG. 3A) of any one of the multilevel vertical conveyors 150A of the storage and retrieval system 100 may be moved to any one of the storage levels of the storage structure 130 (FIG. 22, Block 2220). Any bot 110 on a desired storage level may pick one or more case units (e.g. a pickface) from the shelf 730 (FIG. 3A) of the multilevel vertical conveyor 150A (FIG. 22, Block 2230). The bot 110 may traverse the transfer deck 130B (FIGS. 1 and 13-15) for accessing any one of the picking aisles 130A on a respective level of the storage structure 130 (FIG. 22, Block 2240). In a desired one of the picking aisles the bot can access any one of the storage areas of that picking aisle for placing the case units in any desired storage area regardless of the position of the storage area relative to the multilevel vertical conveyor 150A used to place the case units in the storage structure 130 (FIG. 22, Block 2250). Thus, any desired multilevel vertical conveyor 150A is capable of providing cases to a storage space located anywhere in the storage and retrieval system, regardless of the storage level or placement of the storage area on that level.

Figure 20A:
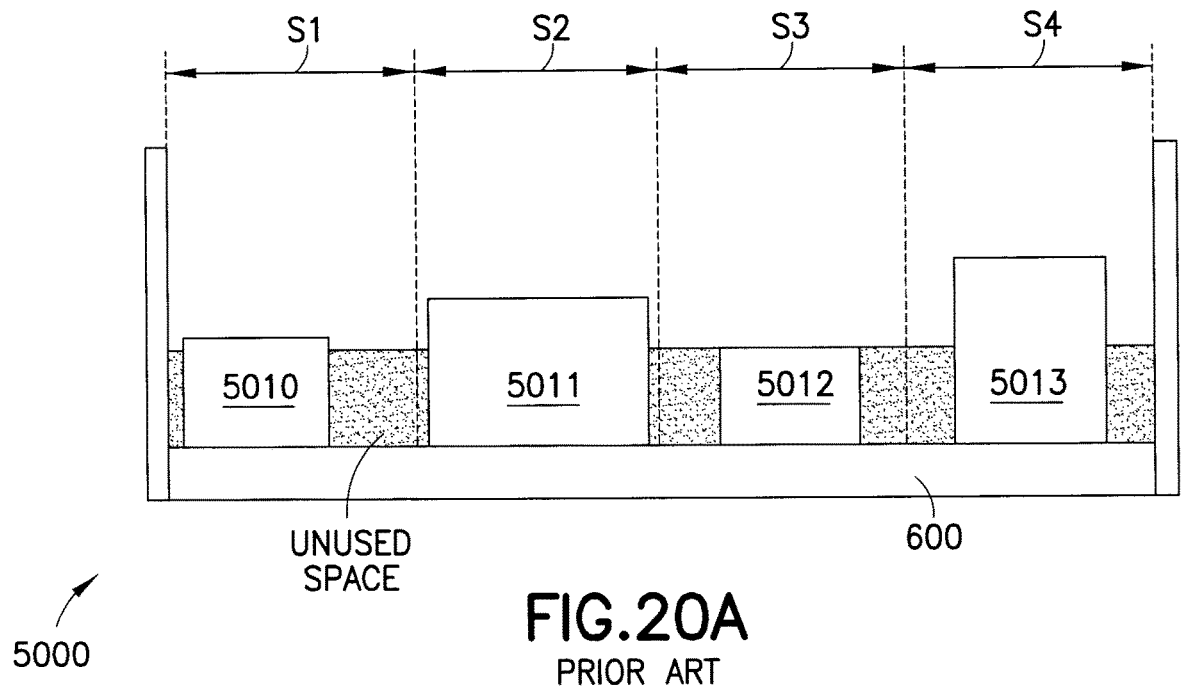
FIG. 20A illustrates a conventional organization of item storage in a storage bay.
Figure 20B:
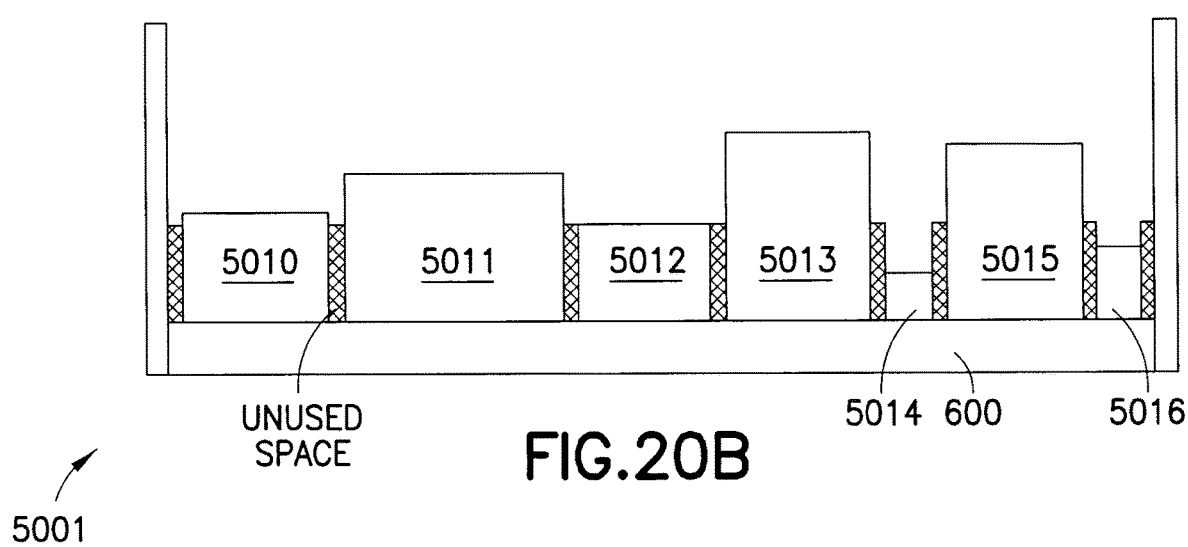
FIG. 20B illustrates an organization of case units in a storage bay in accordance with an exemplary embodiment.
Figure 20C:
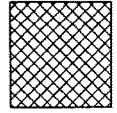
FIG. 20C illustrates a comparison of unused storage space between the item storage of FIG. 20A and the item storage of FIG. 20B.
Figure 20C:

As may be realized case units of the same type may be stored in different locations within the storage structure 130 so that at least one of that type of item may be retrieved when other ones of that type of item are inaccessible. The storage and retrieval system may also be configured to provide multiple access paths or routes to each storage location (e.g. pickface) so that bots may reach each storage location using, for example, a secondary path if a primary path to the storage location is obstructed. It is noted that the control server 120 and one or more sensors on the bots 110 may allow for the assignment and reservation of a pickface for putting away an inbound item such as during replenishment of the storage and retrieval system 100. In one exemplary embodiment, when a storage slot/space becomes available in the storage structure 130, the control server 120 may assign a fictitious item (e.g. an empty case) to the empty storage slot. If there are adjacent empty slots in the storage structure the empty cases of the adjacent storage slots may be combined to fill the empty space on the storage shelf. As may be realized, the size of the slots may be variable such as when dynamically allocating shelf space. For example, referring also to FIGS. 20A-20C, instead of placing case units 5011 and 5012 in predetermined storage areas on the storage shelf 5001, the storage slots may be dynamically allocated such that the cases 5011, 5012 are replaced by three cases having the size of case unit 5010. For example, FIG. 20A illustrates a storage bay 5000 divided into storage slots S1-S4 as is done in conventional storage systems. The size of the storage slots S1-S4 may be a fixed size dependent on a size of the largest item (e.g. item 5011) to be stored on the shelf 600 of the storage bay 5000. As can be seen in FIG. 20A, when case units 5010, 5012, 5013 of varying dimensions, which are smaller than item 5011, are placed in a respective storage slot S1, S2, S4 a significant portion of the storage bay capacity, as indicated by the shaded boxes, remains unused. In accordance with an exemplary embodiment, FIG. 20B illustrates a storage bay 5001 having dimensions substantially similar to storage bay 5000. In FIG. 20B the case units 5010-5016 are placed on the shelf 600 using dynamic allocation such that the empty storage slots are substantially continuously resized as uncontained case units are placed on the storage shelves (e.g. the storage slots do not have a predetermined size and/or location on the storage shelves). As can be seen in FIG. 20B, dynamically allocating the storage space allows placement of case units 5014-5016 on shelf 600 in addition to case units 5010-5013 (which are the same case units placed in storage bay 5000 described above) such that the unused storage space, as indicated by the hatched boxes, is less than the unused storage space using the fixed slots of FIG. 20A. FIG. 20C illustrates a side by side comparison of the unused storage space for the fixed slots and dynamic allocation storage described above. It is noted that the unused storage space of bay 5001 using dynamic allocation may be decreased even further by decreasing the amount of space between the case units 5010-5016 which may allow for placement of additional case units on the shelf 600. As may be realized, as case units are placed within the storage structure the open storage spaces may be analyzed, by for example the control server 120, after each item placement and dynamically re-allocated according to a changed size of the open storage space so that additional case units having a size corresponding to (or less than) a size of the re-allocated storage space may be placed in the re-allocated storage space. In alternate embodiments, the storage slots may also be allocated so that case units that are frequently picked together are located next to each other. When a predetermined pickface is reserved for an item that is being delivered, at least a portion of the empty case sitting in the location where the item is to be placed is replaced by a fictitious item having the features (e.g. size, etc.) of the item being delivered to prevent other inbound case units from being assigned to the predetermined pickface. If the item, is smaller than the empty case that it is replacing the empty case may be resized or replaced with a smaller empty case to fill the unused portion of the storage shelf. Another item may then be placed within the storage slot corresponding to the resized smaller empty case and so on.

Figure 23:
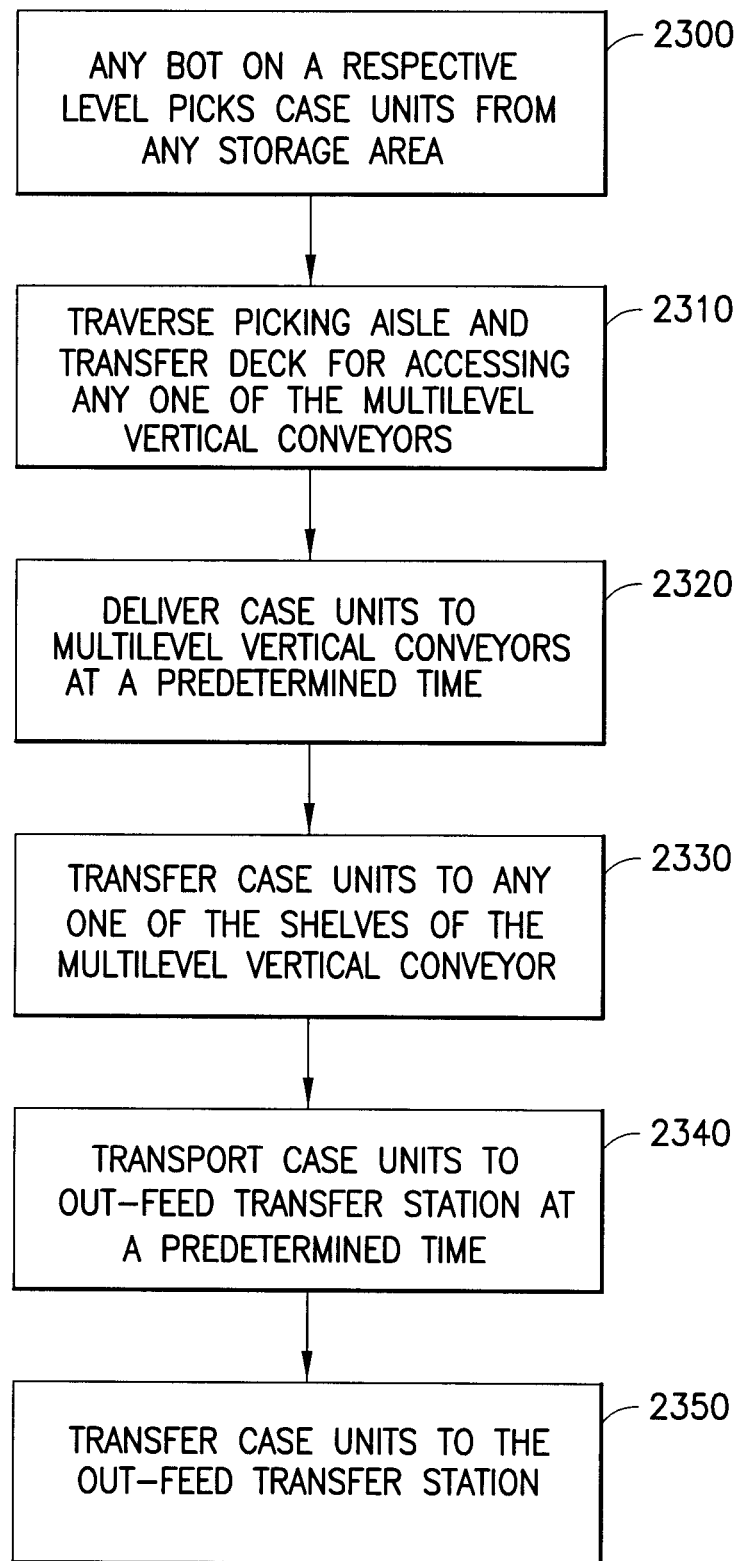

When an order for individual case units is made any bots 110 on the storage level of the requested case units retrieves the corresponding case units from a designated storage area of the storage structure 130 (FIG. 23, Block 2300). The bot 110 traverses the picking aisle 130A in which the case units were stored and the transfer aisle 130B for accessing any desired shelf 730 (FIG. 3B) of any one of the multilevel vertical conveyors 150B (FIG. 23, Block 2310). It is noted that the case units that comprise the order may be picked by the bots in any order. For example, a first bot 110 may traverse, for example, the transfer deck 130B for any suitable amount of time to, for example, allow other bots to pick respective case units of the order and deliver those case units to the multilevel vertical conveyor 150B if the case units of the other bots are to be delivered to the multilevel vertical conveyor before the case units of the first bot 110. As described herein, the case units may be delivered to the multilevel vertical conveyor at a predetermined time according to, for example, a predetermined sequence in a first sortation of the case units (FIG. 23, Block 2320). The bot 110 transfers the case units to the desired shelf of the multilevel vertical conveyor as described above (FIG. 23, Block 2330). In alternate embodiments, the bots may provide the case units to bot transfer stations 140 located on a level of the storage structure 130 from which the ordered case units were picked. The multilevel vertical conveyor 150B transports the individual ordered case units to the out-feed transfer stations 160 at a predetermined time according to, for example, a predetermined sequence in a second sortation of the case units (FIG. 23, Block 2340). It is noted that the multilevel vertical conveyors 150B are configured to allow the case units to continuously revolve around the conveyor loop so that the case units can be moved to, for example, an out-feed transfer station at any suitable time for fulfilling an order. For example, a first case unit is placed on a first shelf of the multilevel vertical conveyor 150B and a second case unit is placed on a second shelf of the multilevel vertical conveyor 150B where the first shelf is located in front of the second shelf in a sequence of shelves of the multilevel vertical conveyor 150B and the second case unit is to be provided to the out-feed transfer station 160 before the first case unit. The first shelf (holding the first case unit) may be allowed to pass the out-feed transfer station without unloading the first case unit to allow the second case unit to be removed from the second shelf. Thus, the case units may be placed on the shelves of the multilevel vertical conveyor 150B in any order. The out-feed transfer station 160 removes the case units from a desired shelf of the multilevel vertical conveyor at a desired time (FIG. 23, Block 2350) so that the individual case units are transported to palletizing workstations 220 (FIG. 13) by conveyors 230 (FIG. 13) where the individual case units are placed on outbound pallets (or other suitable container-like transport supports) in, for example, a predetermined sequence (as described above) to form mixed pallets 9002 (FIG. 21) for shipping to a customer. The out-feed transfer stations 160 and the palletizing workstations 220 may be referred to collectively as an order assembly station. Other examples, of material handling systems in which case units are transferred to an outbound container can be found in U.S. patent application Ser. No. 10/928,289 filed on Aug. 28, 2004, (now U.S. Pat. No. 7,591,630), and U.S. patent application Ser. No. 12/002,309 filed on Dec. 14, 2007, (now U.S. Pat. No. 7,991,505), the disclosures of which are incorporated by reference herein in their entirety. As may be realized, the storage and retrieval system described herein allows for ordering mixed case units of any suitable quantity without having to pick and transport, for example, entire trays, totes or pallets of case units to and from the storage structure 130.

Figure 13:
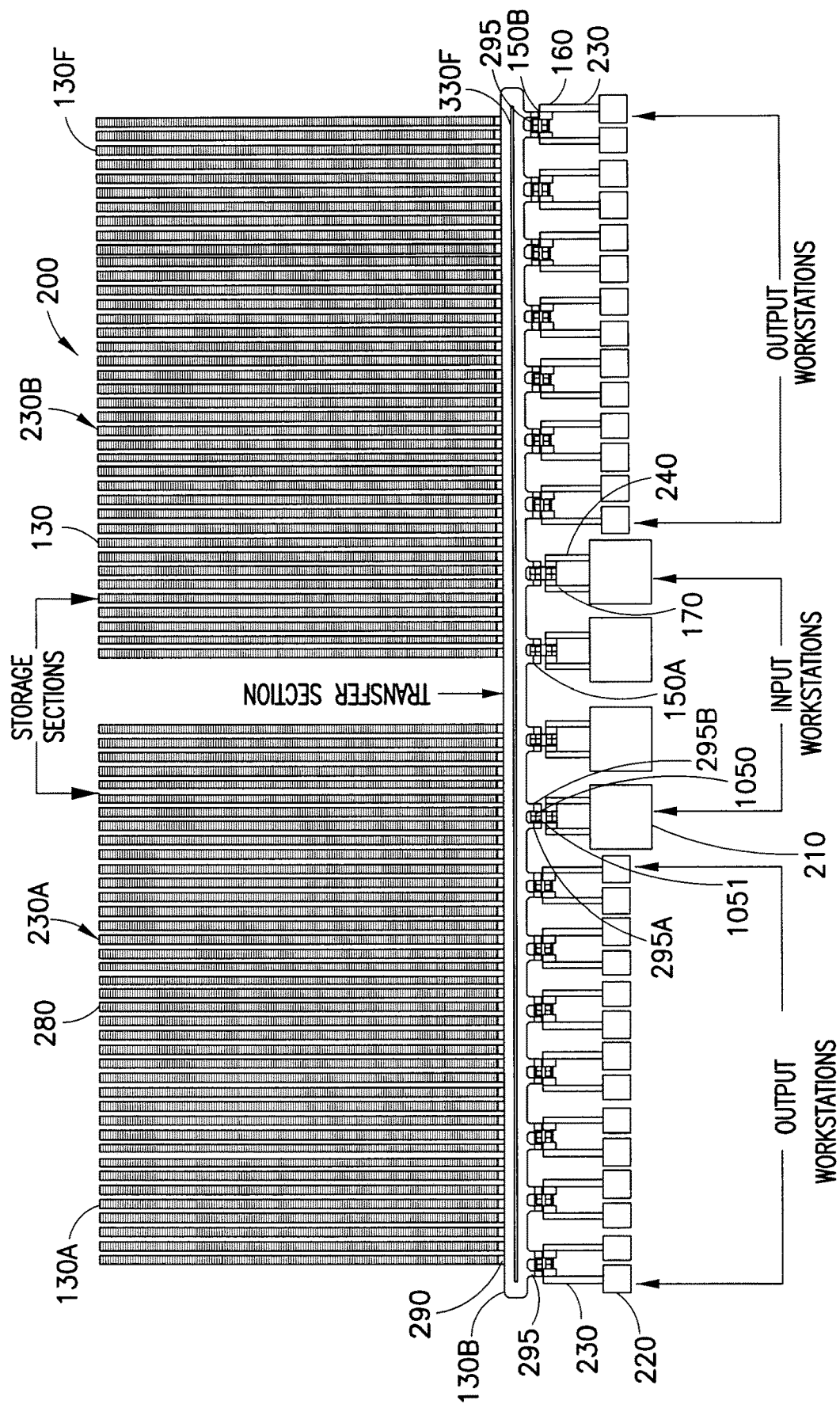
FIG. 13-15 illustrate schematic plan views of storage and retrieval systems having different configurations in accordance with the exemplary embodiments.
Figure 14:
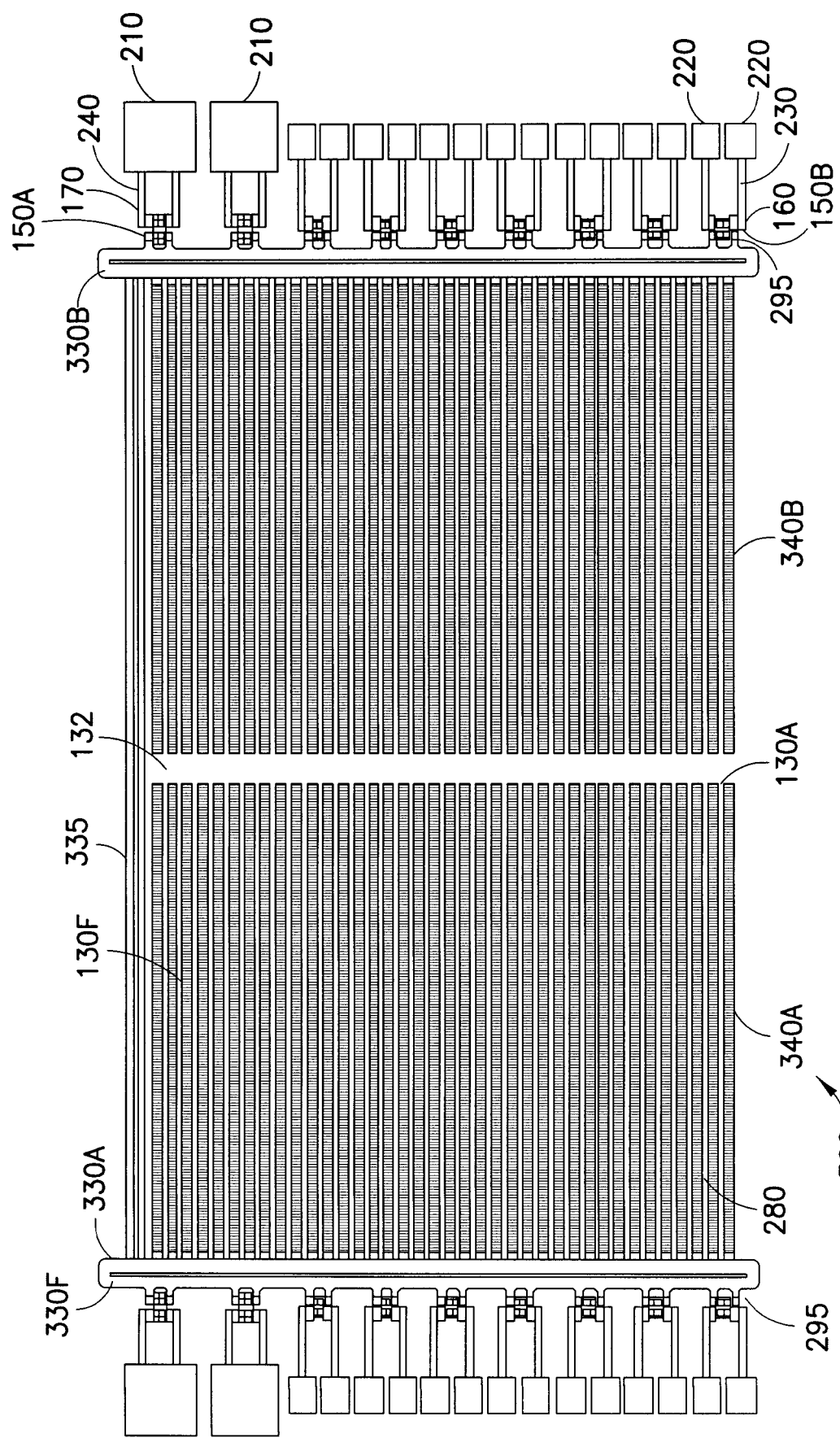
Figure 15:
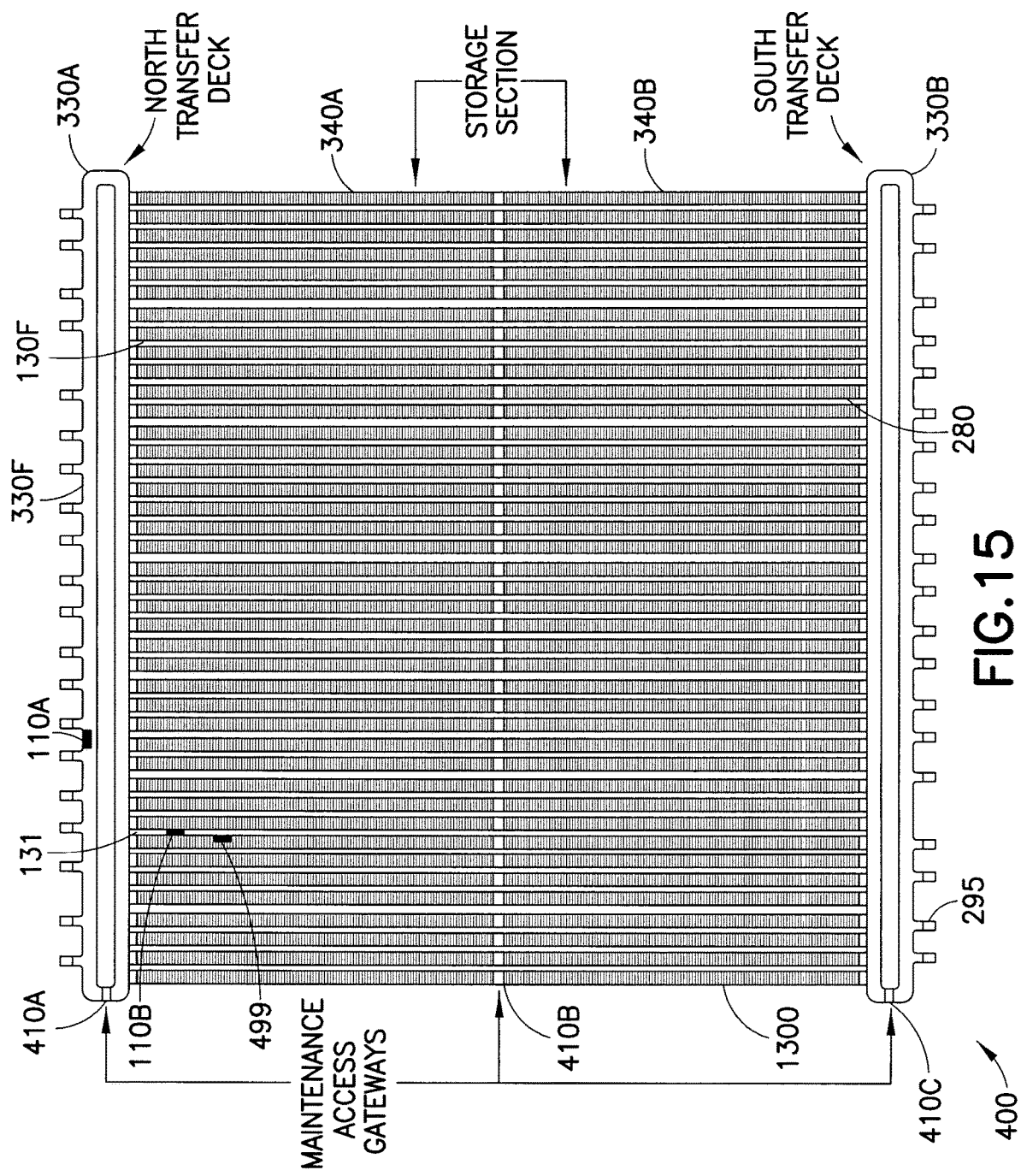

Referring now to FIGS. 13-15, exemplary configurations of the storage and retrieval system 100 are shown. As can be seen in FIG. 13, the storage and retrieval system 200 is configured as a single-ended picking structure in which only one side of the system 200 has a transfer section or deck 130B. The single-ended picking structure may be used in, for example, a building or other structure having loading docks disposed only on one side of the building. As can be seen in FIG. 13, the transfer deck 130B and picking aisles 130A allow bots 110 to traverse an entirety of a level of the storage structure 130 on which that bot 110 is located for transporting case units between any suitable storage locations/picking aisles 130A and any suitable multilevel vertical conveyors 150A, 150B. In this exemplary embodiment, the storage and retrieval system 200 includes a first and second storage section 230A, 230B located side by side so that the picking aisles of each section are substantially parallel with each other and facing the same direction (e.g. towards transfer deck 130B).

FIG. 14 illustrates a storage and retrieval system 300 having a double sided picking structure for use in, for example, buildings or other structures having loading docks on two sides of the building. In FIG. 14 the storage and retrieval system 300 includes two storage sections 340A, 340B that are arranged so that the picking aisles 130A in each of the storage sections 340A, 340B are parallel with each other but facing opposing directions such that substantially continuous picking aisles are formed between the opposing transfer decks 330A, 330B. As may be realized, an express travel lane 335 may be located between the opposing transfer decks 330A, 330B for allowing bots 110 to transit between the transfer decks 330A, 330B at greater speeds than those allowed within the picking aisles 130A. As may also be realized the bots 110 on each level of the picking structure of FIG. 14 may traverse the entirety of its respective level such that the bot 110 may serve to transport case units throughout the two storage sections 340A, 340B and to and from respective input and output workstations.

FIG. 15 illustrates a storage and retrieval system 400 substantially similar to storage and retrieval system 300. However, the storage and retrieval system 400 illustrates maintenance access gateways 410A, 410B, 410C for allowing, as an example, humans and/or service equipment to enter the storage and retrieval system for performing maintenance and/or repairs to the storage and retrieval system 400. The storage and retrieval systems may also be configured with suitable features for disabling one or more bots 110, conveyors or any other suitable features of the storage and retrieval systems in one or more areas of the storage and retrieval system 100 when maintenance is being performed within the storage and retrieval system 100. In one example, the control server 120 may be configured to disable/enable features of the storage and retrieval system.

The storage and retrieval systems, such as those described above with respect to FIGS. 13-15 may be configured to allow substantially unimpeded access to substantially all areas of the storage and retrieval system in the event of, for example, a stoppage in the system so that the system continues operation with substantially no or minimized loss in throughput. A stoppage in the system may include, but is not limited to, a disabled bot 110 within a picking aisle or on a transfer deck, a disabled multilevel vertical conveyor 150A, 150B and/or a disabled in-feed or out-feed transfer station 160, 170. As may be realized the storage and retrieval system 200, 300, 400 may be configured to allow substantially redundant access to each of the storage locations within the picking aisles 130A. For example, a loss of an input multilevel vertical conveyor 150A may result in substantially no loss of storage space or throughput as there are multiple input multilevel vertical conveyors 150A that can transport case units to each level/storage space within the storage structure 130. As another example, the loss of a bot out of a picking aisle may result in substantially no loss of storage space or throughput as there are multiple bots 110 on each level capable of transferring case units between any one of the storage spaces and any one of the multilevel vertical conveyors 150A, 150B. In still another example, the loss of a bot 110 within a picking aisle may result in substantially no loss of storage space or throughput as only a portion of a picking aisle is blocked and the storage and retrieval system may be configured to provide multiple paths of travel to each of the storage spaces or types of case units within the storage spaces. In yet another example, a loss of an output multilevel vertical conveyor 150B may result in substantially no loss of storage space or throughput as there are multiple output multilevel vertical conveyors 150B that can transport case units from each level/storage space within the storage structure 130. In the exemplary embodiments, transport of the case units (e.g. via the multilevel vertical conveyors and bots) is substantially independent of storage capacity and case unit distribution and vice versa (e.g. the storage capacity and case unit distribution is substantially independent of transport of the case units) such that there is substantially no single point of failure in either storage capacity or throughput of case units through the storage and retrieval system.

The control server 120 may be configured to communicate with the bots 110, multilevel vertical conveyors 150A, 150B, in-feed or out-feed transfer stations 160, 170 and other suitable features/components of the storage and retrieval system in any suitable manner. The bots 110, multilevel vertical conveyors 150A, 150B and transfer stations 160, 170 may each have respective controllers that communicate with the control server 120 for conveying and/or receiving, for example, a respective operational status, location (in the case of the bots 110) or any other suitable information. The control server may record the information sent by the bots 110, multilevel vertical conveyors 150A, 150B and transfer stations 160, 170 for use in, for example, planning order fulfillment or replenishment tasks.

As may be realized any suitable controller of the storage and retrieval system such as for example, control server 120, may be configured to create any suitable number of alternate pathways for retrieving one or more case units from their respective storage locations when a pathway providing access to those case units is restricted or blocked. For example, the control server 120 may include suitable programming, memory and other structure for analyzing the information sent by the bots 110, multilevel vertical conveyors 150A, 150B and transfer stations 160, 170 for planning a bot's 110 primary or preferred route to a predetermined item within the storage structure. The preferred route may be the fastest and/or most direct route that the bot 110 can take to retrieve the item. In alternate embodiments the preferred route may be any suitable route. The control server 120 may also be configured to analyze the information sent by the bots 110, multilevel vertical conveyors 150A, 150B and transfer stations 160, 170 for determining if there are any obstructions along the preferred route. If there are obstructions along the preferred route the control server may determine one or more secondary or alternate routes for retrieving the item so that the obstruction is avoided and the item can be retrieved without any substantial delay in, for example, fulfilling an order. It should be realized that the bot route planning may also occur on the bot 110 itself by, for example, any suitable controller system, such as control system 1220 (FIG. 1) onboard the bot 110. As an example, the bot control system 1220 may be configured to communicate with the control server 120 for accessing the information from other bots 110, the multilevel vertical conveyors 150A, 150B and the transfer stations 160, 170 for determining the preferred and/or alternate routes for accessing an item in a manner substantially similar to that described above. It is noted that the bot control system 1220 may include any suitable programming, memory and/or other structure to effect the determination of the preferred and/or alternate routes.

Referring to FIG. 15 as a non-limiting example, in an order fulfillment process the bot 110A, which is traversing transfer deck 330A, may be instructed to retrieve an item 499 from picking aisle 131. However, there may be a disabled bot 110B blocking aisle 131 such that the bot 110A cannot take a preferred (e.g. the most direct and/or fastest) path to the item 499. In this example, the control server may instruct the bot 110A to traverse an alternate route such as through any unreserved picking aisle (e.g. an aisle without a bot in it or an aisle that is otherwise unobstructed) so that the bot 110A can travel along transfer deck 330B. The bot 110A can enter the end of the picking aisle 131 opposite the blockage from transfer deck 330B so as to avoid the disabled bot 110B for accessing the item 499. In other exemplary embodiment, as can be seen in FIG. 14, the storage and retrieval system may include one or more bypass aisles 132 that run substantially transverse to the picking aisles to allow the bots 110 to more between picking aisles 130A in lieu of traversing the transfer decks 330A, 330B. The bypass aisles 132 may be substantially similar to travel lanes of the transfer decks 330A, 330B, as described herein, and may allow bidirectional or unidirectional travel of the bots through the bypass aisle. The bypass aisle may provide one or more lanes of bot travel where each lane has a floor and suitable guides for guiding the bot along the bypass aisle in a manner similar to that described herein with respect to the transfer decks 330A, 330B. In alternate embodiments, the bypass aisles may have any suitable configuration for allowing the bots 110 to traverse between the picking aisles 130A. It is noted that while the bypass aisle 132 is shown with respect to a storage and retrieval system having transfer decks 330A, 330B disposed on opposite ends of the storage structure, in other exemplary embodiments storage and retrieval systems having only one transfer deck, such as shown in FIG. 13, may also include one or more bypass aisles 132. As may also be realized, if one of the in-feed or out-feed transfer stations 160, 170 become disabled order fulfillment or replenishment tasks may be directed, by for example control server 120, to other ones of the in-feed and out-feed transfer stations 160, 170 without substantial disruption of the storage and retrieval system.

The storage and retrieval systems shown in FIGS. 1 and 13-15 have exemplary configurations only and in alternate embodiments the storage and retrieval systems may have any suitable configuration and components for storing and retrieving case units as described herein. For example, in alternate embodiments the storage and retrieval system may have any suitable number of storage sections, any suitable number of transfer decks and corresponding input and output workstations. As an example, a storage and retrieval system in accordance with the exemplary embodiments may include transfer decks and corresponding input and output stations located on three or four sides of the storage sections for serving, for example, loading docks disposed on various sides of a building.

Figure 16:
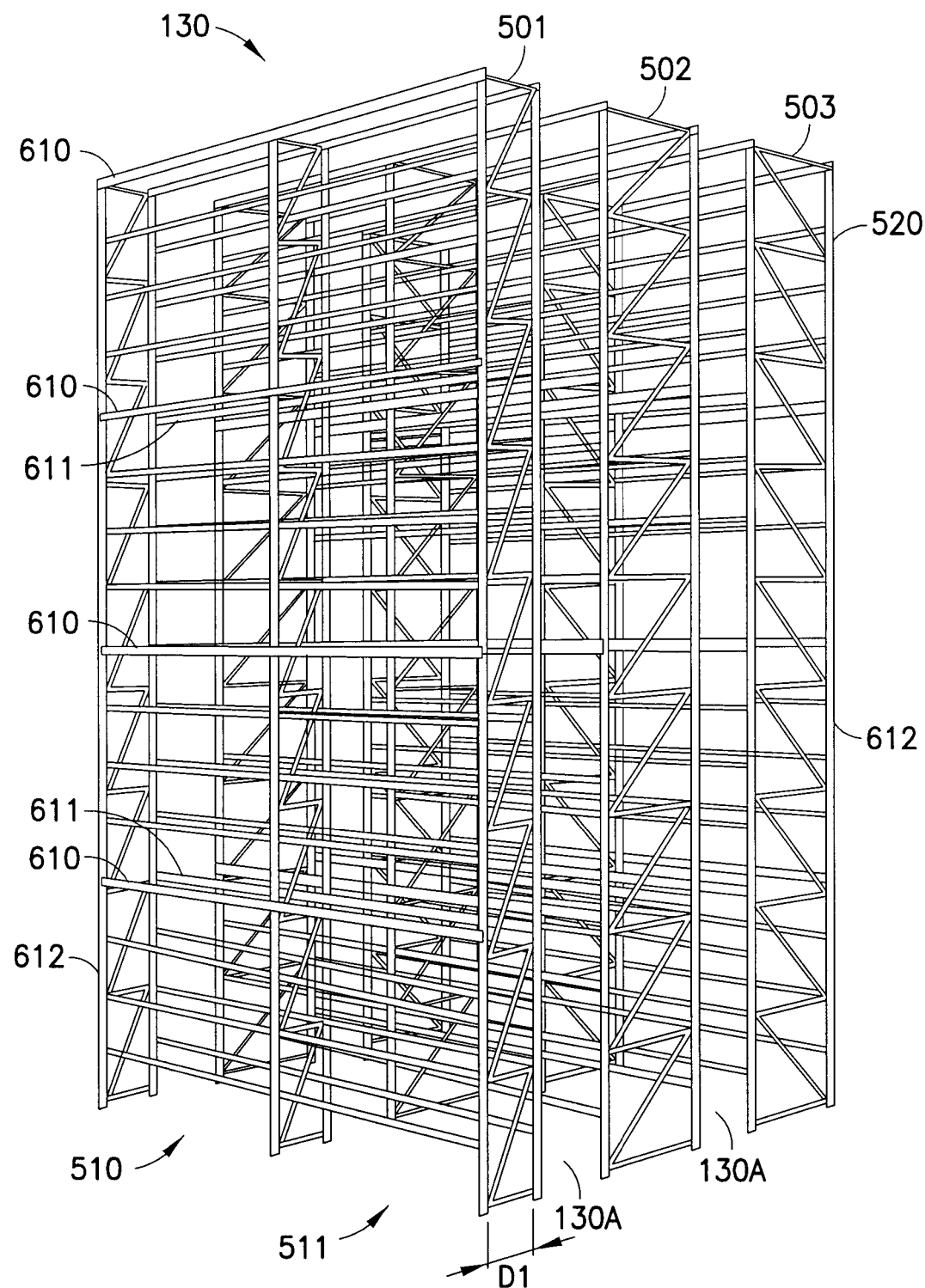
FIG. 16 illustrates a structural portion of a storage and retrieval system in accordance with an exemplary embodiment.
Figure 17A:
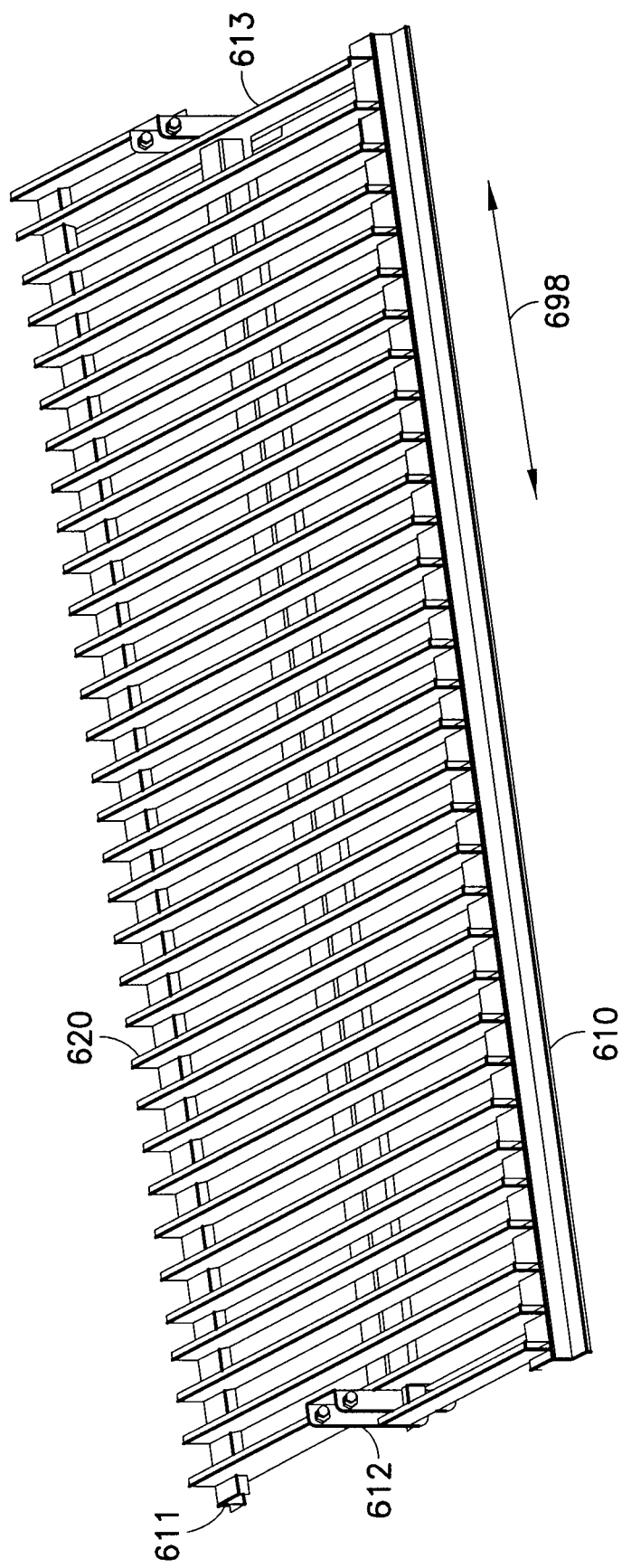
FIGS. 17A and 17B illustrate storage shelves in accordance with an exemplary embodiment.
Figure 17B:
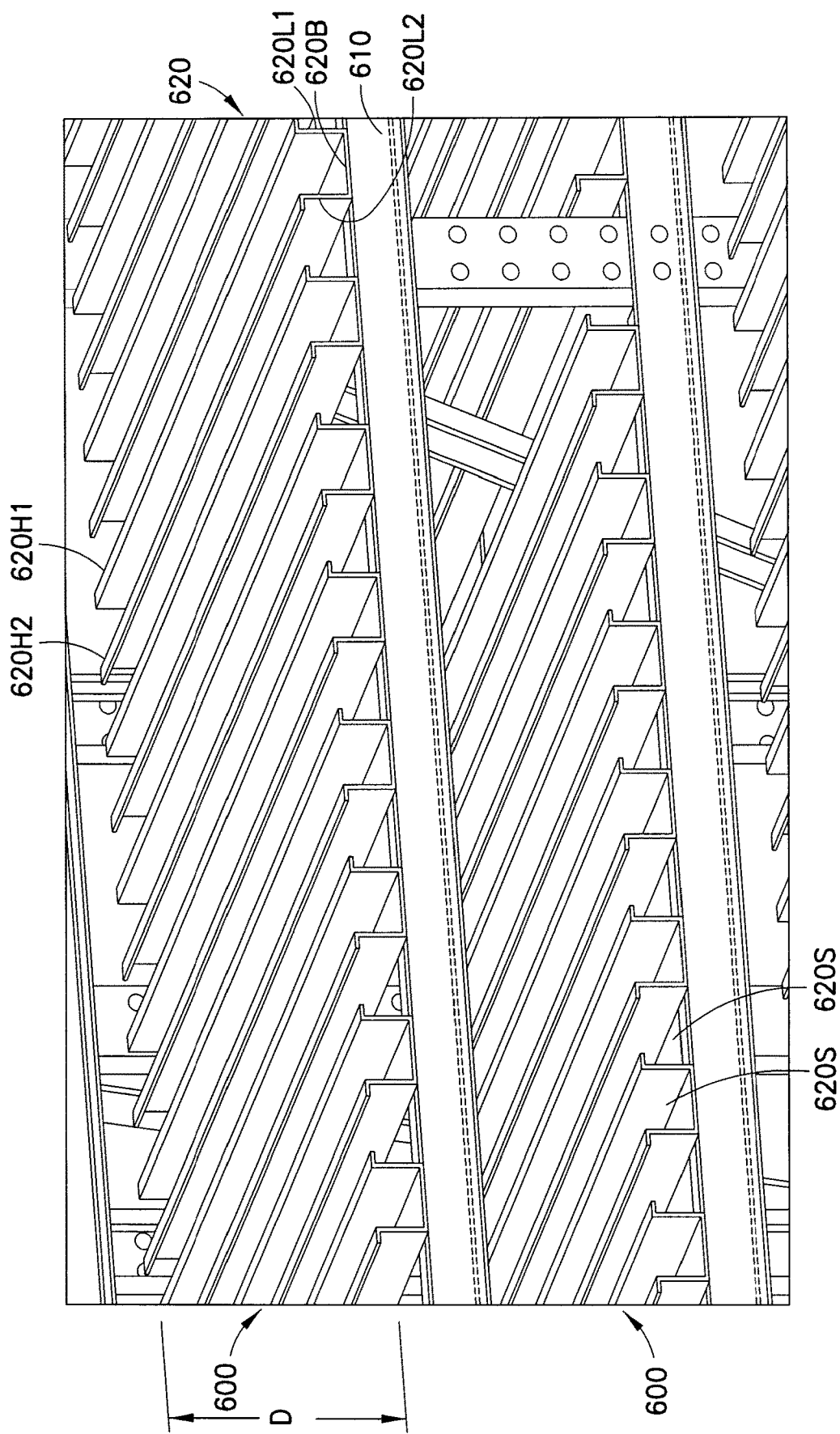
Figure 18:
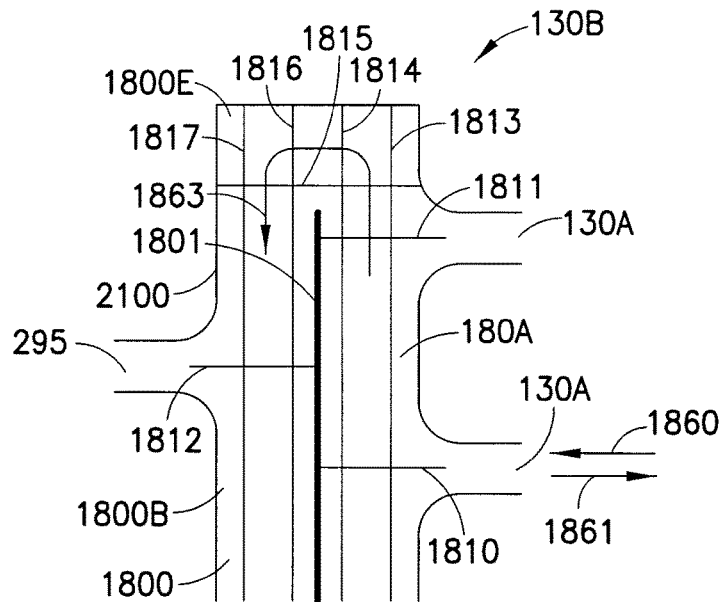
FIGS. 18, 19A and 19B schematically illustrate exemplary operational paths of a transport robot in accordance with the exemplary embodiments.

Referring also to FIGS. 16, 17A and 17B, the storage structure 130 will be described in greater detail. In accordance with an exemplary embodiment, the storage structure 130 includes, for example, any suitable number of vertical supports 612 and any suitable number of horizontal supports 610, 611, 613. It is noted that the terms vertical and horizontal are used for exemplary purposes only and that the supports of the storage structure 130 may have any suitable spatial orientation. In this exemplary embodiment, the vertical supports 612 and horizontal supports 610, 611, 613 may form an array of storage modules 501, 502, 503 having storage bays 510, 511. The horizontal supports 610, 611, 613 may be configured to support the storage shelves 600 (described below) as well as the floors 130F for the isle spaces 130A, which may include tracks for the bots 110. The horizontal supports 610, 611, 613 may be configured to minimize the number of splices between horizontal supports 610, 611, 613 and thus, the number of splices that, for example, tires of the bots 110 will encounter. For exemplary purposes only, the aisle floor 130F may be a solid floor constructed of plymetal panels having, for example, a wood core sandwiched between sheets of sheet metal. In alternate embodiments the floors 130F may have any suitable layered, laminated, solid or other construction and be constructed of any suitable material(s), including, but not limited to plastics, metals, woods and composites. In yet other alternate embodiments the aisle floors 130F may be constructed of a honeycomb structure or other suitable lightweight yet substantially rigid structure. The aisle floors 130F may be coated or treated with wear resistant materials or include replaceable sheets or panels that may be replaced when worn. Tracks 1300 (FIG. 15) for the bots 110 may be incorporated into or otherwise affixed to the aisle floors 130F for guiding the bots 110 in substantially straight lines or paths of travel while the bots 110 are traveling within the storage structure 130. Suitable examples of tracks 1300 are described in U.S. patent application Ser. No. 12/757,312, entitled "AUTONOMOUS TRANSPORTS FOR STORAGE AND RETRIEVAL SYSTEMS" (now U.S. Pat. No. 8,425,173), previously incorporated by reference. The floors 130F may be attached to, for example, one or more of the vertical and horizontal supports (or any other suitable support structure) in any suitable manner such as with any suitable fasteners including, but not limited to bolts and welds. In one exemplary embodiment, as can be seen in, for example, FIG. 8C, the tracks 1300 may be fixed to one or more vertical supports of the storage structure in any suitable manner such that the bot straddles adjacent tracks 1300 for traversing a picking aisle. As can be seen in FIG. 8C one or more of the picking aisles may be substantially vertically unobstructed by floors (e.g. the picking aisles do not have floors). The absence of floors on each picking level may allow maintenance personnel to walk down the picking aisles where the height between each storage level would otherwise substantially prevent the maintenance personnel from traversing the picking aisles.

Each of the storage bays 510, 511 may hold the picking stock on storage shelves 600 that are separated by the picking aisles 130A. It is noted that in one exemplary embodiment the vertical supports 612 and/or horizontal supports 610, 611, 613 may be configured to allow for adjusting the height or elevation of the storage shelves and/or aisle floors 130F relative to, for example, each other and a floor of the facility in which the storage and retrieval system is located. In alternate embodiments the storage shelves and floors may be fixed in elevation. As can be seen in FIG. 16, storage module 501 is configured as an end module having, for example, about half the width of the other storage modules 502, 503. As an example, the end module 501 may have a wall located on one side and the picking aisle 130A located on the opposite side. The depth Dl of end module 501 may be such that access to the storage shelves 600 on module 501 is achieved by the picking aisle 130A located on but one side of the storage module 501, whereas the storage shelves 600 of modules 502, 503 may be accessed by picking aisles 130A located on both sides of the modules 502, 503 allowing for, as an example, the storage modules 502, 503 having a depth substantially twice that of the depth Dl of storage module 501.

The storage shelves 600 may include one or more support legs 620L1, 620L2 extending from, for example, the horizontal supports 610, 611, 613. The support legs 620L1, 620L2 may have any suitable configuration and may be part of, for example, a substantially U-shaped channel 620 such that the legs are connected to each other through channel portion 620B. The channel portion 620B may provide an attachment point between the channel 620 and one or more horizontal supports 610, 611, 613. In alternate embodiments, each support leg 620L1, 620L2 may be configured to individually mount to the horizontal supports 610, 611, 613. In this exemplary embodiment, each support leg 620L1, 620L2 includes a bent portion 620H1, 620H2 having a suitable surface area configured to support case units stored on the shelves 600. The bent portions 620H1, 620H2 may be configured to substantially prevent deformation of the case units stored on the shelves. In alternate embodiments the leg portions 620H1, 620H2 may have a suitable thickness or have any other suitable shape and/or configuration for supporting case units stored on the shelves. As can be seen in FIGS. 17A and 17B, the support legs 620L1, 620L2 or channels 620 may form a slatted or corrugated shelf structure where spaces 620S between, for example, the support legs 620L1, 620L2 allow for arms or fingers of the bots 110 to reach into the shelving for transferring case units to and from the shelves. It is noted that the support legs 620L1, 620L2 of the shelves 600 may be configured for storing case units, where adjacent case units are spaced any suitable distance from each other. For example, a pitch or spacing between the support legs 620L1, 620L2 in the direction of arrow 698 may be such that the case units are placed on the shelves 600 with a distance of about one pitch between the case units to, for example, minimize contact between case units as the case units are placed and removed from the shelves b y the bots 110. For exemplary purposes only, case units located adjacent one another may be spaced apart, for example, in direction 698 a distance of about 2.54 cm. In alternate embodiments the spacing between the case units on the shelves may be any suitable spacing. It is also noted that transfer of case units to and from the multilevel vertical conveyors 150A, 150B (whether the transfer is made directly or indirectly by the bot 110) may occur in a substantially similar manner to that described above with respect to the storage shelves 600.

Referring again to FIGS. 13-15, at the end of each aisle in the storage structure 130 there may be a transition bay 290 (FIG. 13) that allows the bots 110 to transition onto the transfer decks 130B. As described above, the transfer decks 130 may be located at one or more ends of the aisles 130A. In one example, the transition bay 290 may be configured to allow the bots 110 to transition from travel along a rail(s) within the aisles 130A to travel that is free from being constrained by rails within the transfer decks 130B and to merge with bot traffic on the transfer decks 130B. The transfer decks 130B may include a stacked or vertical array of, for example, substantially looped decks, where each level of the storage structure 130 includes one or more respective transfer decks 130. In alternate embodiments the transfer decks may have any suitable shape and configuration. The transfer decks 130B may be unidirectional decks (i.e. bots 110 travel in a single predetermined direction around the transfer deck 130B) configured to connect all of the picking aisles 130A on a respective level to corresponding input and output multilevel vertical conveyors 150A, 150B on the respective level. In alternate embodiments the transfer decks may be bidirectional for allowing the bots to travel in substantially opposite directions around the transfer decks. To allow the bots 110 to access the multilevel vertical conveyors 150A, 150B without obstructing the travel lanes of the transfer decks 130B, each transfer deck 130B may be configured with spurs or transfer areas 295 which may extend from the transfer decks 130B. In one exemplary embodiment the transfer areas 295 may include tracks substantially similar to tracks 1300 (FIG. 15) for guiding the bots 110 to the multilevel vertical conveyors 150A, 150B and/or bot transfer stations 140. In alternate embodiments, the bots may travel and be guided within the spurs 295 in a manner substantially similar to that described herein with respect to the transfer decks.

The travel lanes of the transfer decks 130B may be wider than the travel lanes within the aisles of the storage structure 130. For exemplary purposes only, travel lanes of the transfer decks 130B may be configured to allow the bots 110 to make different types of turns when, for example, transitioning onto or off of the transfer decks 130B. The different types of turns may correspond to a desired orientation of the bot 110 within the picking aisles 130A or a lane of the transfer deck 130B on which the bot 110 is travelling. For exemplary purposes only, referring to FIGS. 18-19B, generally, on the transfer deck 130B, the bot 110 uses casters 1261, 1262 (or releases lockable casters 1260', 1261') while making substantially right angle turns when transitioning from/to the picking aisles 130A or transfer areas 295. For traveling long distances on, for example, the transfer deck 130B the bot 110 travels on wheels 1211-1214 (or lockable casters 1260', 1261' in lieu of idler wheels 1213, 1214 where the casters 1260', 1261' are rotationally locked as described above) using a "skid steering" algorithm (e.g. slowing down or stopping rotation of one drive wheel relative to the other drive wheel to induce a turning motion on the bot) to follow guidance lines 1813-1817 on the transfer deck 130B.

When traveling in the picking aisles 130A, the bot 110 travels in substantially straight lines. These substantially straight line moves within the picking aisles 130A can be in either direction 1860, 1861 and with either bot orientation (e.g. a forward orientation with the drive end 1298 trailing the direction of travel and a reverse orientation with the drive end 1298 leading the direction of travel). During straight line motion on the transfer deck 130B the bot 110 travels in, for exemplary purposes only, a counterclockwise direction 1863, with a forward bot orientation. In alternate embodiments the bot may travel in any suitable direction with any suitable bot orientation. In still other alternate embodiments, there may be multiple travel lanes allowing bots to travel in multiple directions (e.g. one travel lane has a clockwise direction of travel and another travel lane has a counter-clockwise direction of travel). In one example, the turns to and from the picking aisles 130A and/or transfer areas 295 are about 90 degrees where the center point of rotation P of the bot is located substantially midway between the drive wheels 1211, 1212 such that the bot can rotate clockwise or counterclockwise. In alternate embodiments the bot turns may be more or less than about 90 degrees. In another example, the bot may make a substantially 180 degree turn (i.e. two substantially 90 degree turns made in sequence without a stop).

As described above, the transfer deck 130B may include guidance lines 1810-1817 for guiding the bot 110. The guidance lines 1810-1817 may be any suitable lines adhered to, formed in or otherwise affixed to the transfer deck 130B. For exemplary purposes only, in one example the guidance lines may be a tape affixed to the surface of the transfer deck 130B. In this exemplary embodiment the, transfer deck 130B includes a track 1800 having a first side 1800A and a second side 1800B separated by a wall 1801. The first and second sides 1800A, 1800B of the track 1800 are joined by end track sections 1800E (only one of which is shown in FIG. 8). In alternate embodiments the track 1800 may have any suitable configuration. Each of the first and second sides 1800A, 1800B includes two travel lanes defined by, for example, guidance lines 1813, 1814 and 1816, 1817 respectively. The end track portions 1800E include, for example, one travel lane defined by, for example, guidance line 1815. In alternate embodiments the sections/sides of the track 1800 may have any suitable number of travel lanes defined in any suitable manner. In accordance with the exemplary embodiments each picking aisle 130A and/or transfer station, such as transfer station 140B (FIG. 1), includes a lead in/out guidance line 1810-1812. The lead in/out guidance lines 1810-1812 and the single guidance line 1815 of the end track portions 1800E may be detected by the bot 110 as index marks for bot localization during long line-following moves. The lead in/out guidance lines 1810-1812 and guidance line 1815 may also be detected by the bot 110 as reference marks for making turns.

When the bot 110 moves in substantially straight lines, such as in the picking aisles 130A and/or transfer areas 295, the drives for motors 1211M, 1212M may be configured as torque controllers as described in greater detail in U.S. patent application Ser. No. 12/757,312, entitled "AUTONOMOUS TRANSPORTS FOR STORAGE AND RETRIEVAL SYSTEMS," (now U.S. Pat. No. 8,425,173), previously incorporated by reference in its entirety. When travelling long distances on, for example, the transfer deck, the bot 110 travels on drive wheels 1211, 1212 and idler wheels 1213, 1214 (or locked casters 1260', 1261') so that the bot is deterred from veering off of the straight line trajectory through the fixed nature of the drive wheels 1211, 1212 and idler wheels 1213, 1214 (or locked casters 1260', 1261'). The computer 1701 may be configured with any suitable line following algorithm to substantially ensure that the bot 110 maintains travel in a straight line. The line following algorithm may also allow for correction of initial line following errors due to, for example, misalignment from turns. In one exemplary embodiment the bot 110 uses line sensors 1712 to estimate its heading and offset from a guidance line 1810-1817. The bot 110 may be configured to use, for example, any suitable algorithm such as a fuzzy logic algorithm to generate corrections in the travel path of the bot 110. The correction may be applied as a differential torque to the wheels as the bot is travelling (e.g. skid steering—rotating one drive wheel slower than the other drive wheel to produce increased drag on one side of the bot for inducing a turning moment on the bot).

For turns, such as for example, substantially right angle turns, the drives for motors 1211M, 1212M may be configured as position controllers. For example the drives may be commanded by the computer 1701 to rotate their respective wheels in opposite directions for a predetermined distance to generate a pivot turn of slightly more than about 90 degrees. When for example, line sensors 1712 detect a stopping guidance line, the turning move is terminated. In alternate embodiments the drives for the motors 1211M, 1212M may be operated in any suitable manner for driving the bot in substantially straight lines or during turns.

Figures 19A, 19B:
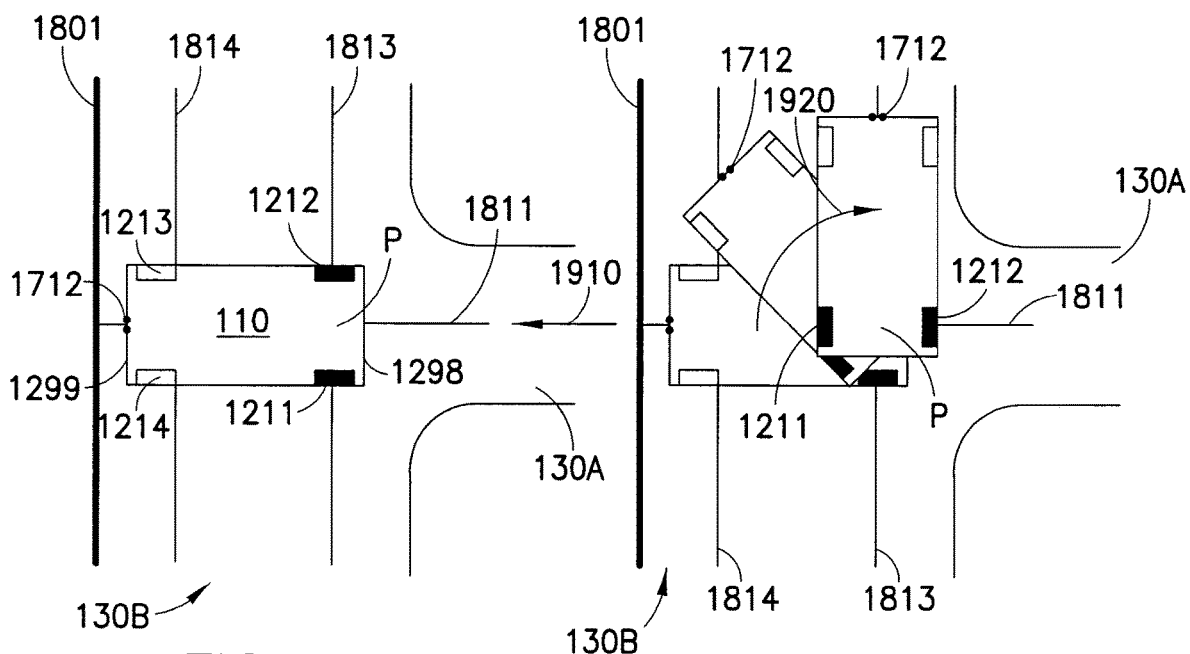

FIGS. 19A and 19B illustrate an exemplary turn sequence for a substantially 90 degree turn made by the bot 110 while transitioning onto the transfer deck 130B from a picking aisle 130A. In this example, the bot is traveling in a forward orientation in the direction of arrow 1910. As the bot 110 exits the picking aisle 130A, the bot 110 lowers the casters 1260, 1261 (FIG. 4A) so that the idler wheels 1213, 1214 are lifted off of the transfer deck 130B (or unlocks casters 1260', 1261'). Using line sensors 1712 located at for example the driven end 1299 of the bot 110, the bot 110 detects the inner travel lane guidance line 1814 and then using corrected wheel odometry, stops with its pivot point P at or close to the outer travel lane guidance line 1813. The bot 110 rotates about 90 degrees in the direction of arrow 1920 using a differential torque in the drive motors 1211M, 1212M to turn the drive wheels 1211, 1212 in opposite directions such that the bot 110 rotates about point P. The bot 110 detects the guidance line 1813 with the line sensors 1712 and terminates the turn. The bot 110 raises the casters 1260, 1260 so that the idler wheels 1213, 1214 contact the transfer deck 130B (or locks casters 1260', 1261') and proceeds to follow guidance line 1813 using, for example, line following. It is noted that turning of the bot to enter, for example, picking aisle 130A may occur in substantially the same manner as that described above for exiting the picking aisle 130A. Other examples of turn sequences of the bot are described in greater detail in U.S. patent application Ser. No. 12/757,312, entitled "AUTONOMOUS TRANSPORTS FOR STORAGE AND RETRIEVAL SYSTEMS," (now U.S. Pat. No. 8,425,173, previously incorporated by reference in its entirety.

Referring again to FIGS. 13-15, the floor 330F of the transfer decks may have any suitable construction configured to support the bots 110 as they traverse their respective transfer deck(s) 130B. For exemplary purposes only, the transfer deck floors 330F may be substantially similar to the aisle floors 130F described above. In alternate embodiments the transfer deck floors 330F may have any suitable configuration and/or construction. The transfer deck floors 330F may be supported by a lattice of frames and columns that may be connected to, for example, one or more of the vertical supports 612 and horizontal supports 610, 611, 613 in any suitable manner. For example, in one exemplary embodiment the transfer decks may include cantilevered arms that may be driven or otherwise inserted into corresponding slots, recesses or other openings in one or more of the vertical supports 612 and horizontal supports 610, 611, 613. In alternate embodiments the transfer deck floors 330F may be supported by a structure substantially similar to that described above with respect to FIGS. 16, 17A and 17B. As may be realized, the pitch of the transfer deck floors 330F may be substantially similar to the pitch of the respective aisle floors 130F.

In one exemplary embodiment, the storage structure 130 may include personnel floors 280 (which may include the maintenance access gateways 410A-410C) associated with each level of the storage structure. The personnel floors may be located, for example, within or adjacent to the aisles of the storage structure and/or the transfer decks 130B. In alternate embodiments, the personnel floors 280 may be suitably located to provided reach in access to one side of the transfer decks 130B from within the storage structure where the other opposite side of the transfer decks 130B is accessed through work platforms/scaffolding adjacent the workstations 210, 220 and/or multilevel vertical conveyors. In one exemplary embodiment, the personnel floors 280 may run the full length of each aisle 130A or transfer deck 130B. In alternate embodiments the personnel floors 280 may have any suitable length. The personnel floors 280 may be vertically spaced from each other at predetermined intervals where the space between the personnel floors 280 provides a personnel work zone for resolving problems with, as non-limiting examples, the bots 110, case units stored in the storage structure 130 and the storage structure 130 itself. The personnel floors 28 0 may be configured to provide walking surfaces for, as an example, maintenance technicians or other personnel where the walking zones are distinct from travel lanes of the bots 110. Access to the personnel floors may be provided through the maintenance access gateways 410A-410C or any other suitable access point. Movable barriers or other suitable structures may be provided along the aisles 130A and transfer decks 130B to further separate unintentional interaction between, for example the bots 110 and personnel. In one exemplary embodiment, in normal operation the movable barriers may be in a stowed or retracted position to allow, for example, the bot 110 to pass and access the storage shelves 600. The movable barriers may be placed in an extended position when personnel are located in a predetermined zone or location of the storage structure 130 to block bot 110 access to the aisle (s) or portions of the transfer decks where personnel are located. In one exemplary operation of storage structure maintenance for a predetermined zone of the storage structure 130, all active bots 110 may be removed from the predetermined zone. Bots 110 that require maintenance may be disabled and de-energized within the predetermined zone. The movable barriers may be extended to prevent active bots 110 from entering the predetermined zone and any locks preventing access to the personnel floors may be unlocked or removed. The extension and retraction of the movable barriers, disabling of the bots 110 and removal of bots 110 from the predetermined zone may be controlled in any suitable manner such as by, for example, any suitable control system such as a central controller server 120 and mechanical and/or electromechanical interlocks. It is noted that in alternate embodiments, the storage and retrieval system may include any suitable personnel access not limited to that described above.

The structure, such as structure 130, of the storage and retrieval systems described herein may be configured to sustain predetermined loads placed on the structure by normal service and events such as, for exemplary purposes only, earthquakes as defined by local and federal codes. As an example, these loads may include the dead weight of the structure, inventory stored in and transferred throughout the structure, the bots 110, seismic loads, thermal expansion and sufficient stiffness for bot control and positioning. The structure of the storage and retrieval systems 100 may also be configured for ease of assembly, maintenance access, modularity and efficient and economical material use. Non-limiting examples, of the codes to which the structure may be configured to comply include ASCE7, AISC Manual of Steel Construction, AISC Code of Standard Practice for Steel Buildings and Bridges, RMI (Rack Manufacturers Institute) and Materials Handling Industry of America. The structural components (e.g. vertical/horizontal supports, floors, etc.) of the storage and retrieval systems described herein may also include wear and/or corrosion resistant coatings including surface treatments such as, for example, paints and galvanization. In one example, the coating may include a base coating and a contrasting top coating such that any wearing of the top coating will be readily visible. In alternate embodiments the coatings and surface treatments may have any suitable configurations and colors so that wear is easily identifiable.

The storage structure 130 may be configured to be rapidly assembled and installed in the field in a "bottom up construction" (e.g. each level is constructed sequentially such that lower levels in the sequence are substantially completed before the upper levels in the sequence). For example, the vertical supports 612 and/or horizontal supports 610, 611, 613 (and/or any other components of the storage structure 130) may be predrilled, punched or otherwise preformed with assembly holes. Base plates for supporting each of the vertical supports 612 and for securing the vertical supports 612 to a floor may be preinstalled on the respective vertical supports 612. Templates may be provided for locating anchor bolts in the floor for securing the base plates. The vertical supports 612 may be configured with brackets for receiving and at least partially securing the horizontal supports 610, 611, 613. Preformed holes in the horizontal supports may also be used to, for example, bolt or otherwise fasten the horizontal supports to the vertical supports. The shelves 600 may be field assembled from prefinished components and affixed to, for example, the horizontal supports 610, 611, 613 in any suitable manner. Separate braces such as ties may be also provided for securing the horizontal supports 610, 611, 613. The transfer decks 130B may be installed in a manner substantially similar to that described above. The floors and decking of the storage structure 130 may be affixed to the horizontal supports in any suitable manner, such as for example through fasteners. The floors and decking may be preformed with installation holes to allow for securing the floors and decking to the horizontal supports. The tracking 1300 (FIG. 15) for the bots 110 may be preinstalled on or within the aisle flooring or installed in the field using for example, preformed holes or other installation guides such as templates. It is noted that in alternate embodiments, the storage structure 130 may be constructed and assembled in any suitable manner.

It should be understood that the exemplary embodiments described herein may be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An autonomous transport vehicle for transporting case units to and from predefined storage areas in an automated case unit storage system, the automated case unit storage system including an array of storage racks with picking aisles and at least one input/output transfer station, the at least input/output transfer station having at least one shelf and being connected to the picking aisles by a transfer floor, the autonomous transport vehicle comprising:
- a frame configured to traverse the picking aisles and an unconstrained transport surface of the transfer floor so as to pass along the storage racks and transfer floor for transporting case units between the predefined storage areas and the at least one input/output transfer station, where the picking aisles extend from the transfer floor, and the frame has wheels so that the frame is steerable along multiple axes, angled relative to each other, of the unconstrained transport surface so that the frame traverses freely the unconstrained transfer surface to each respective picking aisle;
- an underpick case unit support coupled to the frame and arranged to engage an underside of a case unit and pick up the case unit therefrom effecting transfer of the case unit, from at least one of, each predefined storage area of the storage racks and each of the input/output transfer station, to the vehicle; and
- a controller connected to the frame, the controller being configured to effect movement of the autonomous transport vehicle along the picking aisles for accessing each storage area of the array of storage racks and each shelf of the input/output transfer station.

2. The autonomous transport vehicle of claim 1, further comprising an effector connected to the frame, the effector being configured to hold the case units and being configured to transfer the case units between the autonomous transport vehicle and each storage area and between the autonomous transport vehicle and the at least one input/output transfer station.

3. The autonomous transport vehicle of claim 1, wherein the autonomous transport vehicle is configured to transport case units between each storage area of a respective level of the array of storage racks and the at least one input/output transfer station with one pick.

4. The autonomous transport vehicle of claim 1, wherein the storage racks are multilevel storage racks.

5. The autonomous transport vehicle of claim 1, wherein the at least one input/output transfer station includes at least one vertical lift.

6. The autonomous transport vehicle of claim 1, wherein the underpick case unit support is moveable relative to the frame between extended and retracted positions, the underpick case unit support being extended for picking and placing the case unit on the storage racks and for picking and placing the case unit for transfer to the input/output transfer station.

7. The autonomous transport vehicle of claim 1, wherein when the autonomous transport vehicle is configured to directly or indirectly transfer the case unit to or from the input/output transfer station, the array of storage racks further comprises an interface device configured for transferring the case unit between the input/output transfer station and the autonomous transport vehicle.

8. The autonomous transport vehicle of claim 7, wherein the interface device includes fingers that form a slatted transfer shelf, the underpick case unit support of the autonomous transport vehicle comprising vehicle fingers configured to pass through the slatted transfer shelf for transferring the case unit to or from the interface device.

9. A method for transporting case units to and from predefined storage areas in an automated case unit storage system with an autonomous transport vehicle, the automated case unit storage system including an array of storage racks with picking aisles and at least one input/output transfer station, the at least input/output transfer station having at least one shelf and being connected to the picking aisles by a transfer floor, the method comprising:
- providing a frame of the autonomous transport vehicle to traverse the picking aisles and an unconstrained transport surface of the transfer floor so as to pass along the storage racks and transfer floor for transporting case units between the predefined storage areas and the at least one input/output transfer station, where the picking aisles extend from the transfer floor, and the frame has wheels so that the frame is steerable along multiple axes, angled relative to each other, of the unconstrained transport surface so that the frame traverses freely the unconstrained transfer surface to each respective picking aisle;
- providing an underpick case unit support coupled to the frame and arranged to engage an underside of a case unit and pick up the case unit therefrom effecting transfer of the case unit, from at least one of, each predefined storage area of the storage racks and each of the input/output transfer station, to the vehicle; and
- effecting movement of the autonomous transport vehicle, with a controller connected to the frame, along the picking aisles for accessing each storage area of the array of storage racks and each shelf of the input/output transfer station.

10. The method of claim 9, further comprising providing an effector connected to the frame, the effector holding the case units and transferring the case units between the autonomous transport vehicle and each storage area and between the autonomous transport vehicle and the at least one input/output transfer station.

11. The method of claim 9, further comprising transporting case units between each storage area of a respective level of the array of storage racks and the at least one input/output transfer station with one pick.

12. The method of claim 9, wherein the storage racks are multilevel storage racks.

13. The method of claim 9, wherein the at least one input/output transfer station includes at least one vertical lift.

14. The method of claim 9, wherein the underpick case unit support is moveable relative to the frame between extended and retracted positions, the method further comprising extending the underpick case unit support to pick and place the case unit on the storage racks and pick and place the case unit transferring the case unit to the input/output transfer station.

15. The method of claim 9, wherein when the autonomous transport vehicle directly or indirectly transfers the case unit to or from the input/output transfer station, the array of storage racks include an interface device that transfers the case unit between the input/output transfer station and the autonomous transport vehicle.

16. The method of claim 15, wherein the interface device includes fingers that form a slatted transfer shelf, the underpick case unit support of the autonomous transport vehicle including vehicle fingers to pass through the slatted transfer shelf and transfer the case unit to or from the interface device.

* * * * *